United States Patent
Yoo et al.

(10) Patent No.: US 12,081,785 B2
(45) Date of Patent: *Sep. 3, 2024

(54) VIDEO DECODING METHOD USING RESIDUAL INFORMATION IN VIDEO CODING SYSTEM, AND APPARATUS THEREOF

(71) Applicant: LG Electronics Inc., Seoul (KR)

(72) Inventors: Sunmi Yoo, Seoul (KR); Jungah Choi, Seoul (KR); Seunghwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 43 days.

This patent is subject to a terminal disclaimer.

(21) Appl. No.: 17/891,425

(22) Filed: Aug. 19, 2022

(65) Prior Publication Data
US 2022/0400277 A1    Dec. 15, 2022

Related U.S. Application Data

(63) Continuation of application No. 17/400,718, filed on Aug. 12, 2021, now Pat. No. 11,463,719, which is a
(Continued)

(51) Int. Cl.
*H04N 19/46* (2014.01)
*H04N 19/103* (2014.01)
(Continued)

(52) U.S. Cl.
CPC ........... *H04N 19/46* (2014.11); *H04N 19/103* (2014.11); *H04N 19/136* (2014.11); *H04N 19/176* (2014.11)

(58) Field of Classification Search
CPC .... H04N 19/46; H04N 19/103; H04N 19/136; H04N 19/176
See application file for complete search history.

(56) References Cited

U.S. PATENT DOCUMENTS 8,520,732 B2    8/2013  Ye et al.
2014/0307801 A1   10/2014  Ikai et al.
(Continued)

FOREIGN PATENT DOCUMENTS

CN    105723714    6/2016
CN    107820079    3/2018
(Continued)

OTHER PUBLICATIONS

Bross et al., "Non-CE8: Unified Transform Type Signalling and Residual Coding for Transform Skip," JVET-M0464-v4, Presented at Joint Video Experts Team (JVET) of ITU-T SG 16 WP 3 and ISO/IEC JTC 1/SC 29/WG 11, 13th Meeting: Marrakech, MA, Jan. 9-18, 2019, 14 pages.
(Continued)

*Primary Examiner* — Nam D Pham
(74) *Attorney, Agent, or Firm* — Fish & Richardson P.C.

(57) ABSTRACT

A video decoding method performed by a decoding apparatus, according to the present document, comprises the steps of: receiving residual information for a current block; deriving a context model for a sine flag of a current residual coefficient in a current sub-block of the current block; decoding the sine flag on the basis of the context model; deriving the current residual coefficient on the basis of the sine flag; deriving a residual sample on the basis of the current residual coefficient; and generating a reconstructed picture on the basis of the residual sample, wherein the context model for the sine flag is derived on the basis of a sine flag of a residual coefficient decoded before the current residual coefficient in the current sub-block.

17 Claims, 12 Drawing Sheets

Related U.S. Application Data continuation of application No. PCT/KR2020/002402, filed on Feb. 19, 2020.

(60) Provisional application No. 62/807,745, filed on Feb. 19, 2019.

(51) Int. Cl.
  H04N 19/136 (2014.01)
  H04N 19/176 (2014.01)

(56) References Cited

U.S. PATENT DOCUMENTS

| | | | |
|---|---|---|---|
| 2015/0103918 A1 | 4/2015 | Wang et al. | |
| 2015/0181237 A1 | 6/2015 | Tsukuba et al. | |
| 2017/0142448 A1* | 5/2017 | Karczewicz | H04N 19/593 |

FOREIGN PATENT DOCUMENTS

| | | |
|---|---|---|
| CN | 108293111 | 7/2018 |
| CN | 108432248 | 8/2018 |
| WO | WO 2013/065702 | 5/2013 |
| WO | WO 2013/190990 | 12/2013 |
| WO | WO 2015/051459 | 4/2015 |
| WO | WO 2019/027074 | 2/2019 |

OTHER PUBLICATIONS

Extended European Search Report in European Application No. 20758856.7, dated Jun. 10, 2022, 7 pages.

Gao et al., "CE7-related: Reduced context models for transform coefficients coding," JVET-L0316-v2, Presented at Joint Video Experts Team (JVET), of ITU-T SG 16 WP 3 and ISO/IEC JTC 1/SC 29/WG 11, 12th Meeting: Macao, CN, Oct. 3-12, 2018, 7 pages.

Office Action in Indian Application No. 202117037689, dated Apr. 20, 2022, 6 pages.

Sole et al., "Transform Coefficient Coding in HEVC," IEEE Transactions on Circuits and Systems for Video Technology, Dec. 2012, 22(12):1765-1777.

Wang et al., "RExt: [non-RCE3] Sign coding for transform skipped blocks," Joint Collaborative Team on Video Coding (JCT-VC) of ITU-T SG16 WP3 and ISO/IEC JTC1/SC29/WG11, Document: JCTVC-O0238, 15th Meeting: Geneva, CH, Oct. 23-Nov. 1, 2013, 6 pages.

Xu et al., "CE8-related: BDPCM entropy coding with reduced number of context coded bins," JVET-M0449-v1, Presented at Joint Video Experts Team (JVET) of ITU-T SG 16 WP 3 and ISO/IEC JTC 1/SC 29/WG 11, 13th Meeting: Marrakech, MA, Jan. 9-18, 2019, 3 pages.

Yoo et al., "Non-CE7 : Sign coding for transform skip," JVET-M0279_v1, Presented at Joint Video Experts Team (JVET) of ITU-T SG 16 WP 3 and ISO/IEC JTC 1/SC 29/WG 11, 13th Meeting: Marrakech, MA, Jan. 9-18, 2019, 4 pages.

Office Action in Japanese Appln. No. 2021-547762, dated Nov. 1, 2022, 9 pages (with English translation).

Bross et al., "Non-CE8: Unified Transform Type Signalling and Residual Coding for Transform Skip," Joint Video Experts Team (JVET) of ITU-T SG 16 WP 3 and ISO/IEC JTC 1/SC 29/WG 11, Document: JVET-M0464-v1, 13th Meeting: Marrakech, MA, Jan. 9-18, 2019, 11 pages.

Office Action in Chinese Appln. No. 202080018152.8, mailed on Dec. 21, 2023, 36 pages (with English translation).

* cited by examiner

VIDEO DECODING METHOD USING RESIDUAL INFORMATION IN VIDEO CODING SYSTEM, AND APPARATUS THEREOF

CROSS-REFERENCE TO RELATED APPLICATIONS

This application is a continuation of U.S. application Ser. No. 17/400,718, filed on Aug. 12, 2021, which is a continuation pursuant to 35 U.S.C. § 119(e) of International Application PCT/KR2020/002402, with an international filing date of Feb. 19, 2020, which claims the benefit of U.S. Provisional Patent Application No. 62/807,745, filed on Feb. 19, 2019, the contents of which are hereby incorporated by reference herein in their entirety.

BACKGROUND OF THE DISCLOSURE

Field of the Disclosure

The present disclosure relates to an image coding technique, and more particularly, to an image decoding method in which a context model of a sign flag indicating a sign of a residual coefficient is derived in an image coding system and the sign flag is coded based on the derived context model, and an apparatus thereof.

Related Art

Recently, demand for high-resolution, high-quality images, such as High Definition (HD) images and Ultra High Definition (UHD) images, has been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high-resolution and high-quality images.

SUMMARY

The present disclosure provides a method and apparatus for improving image coding efficiency.

The present disclosure also provides a method and apparatus for improving residual coding efficiency.

The present disclosure also provides a method and apparatus for performing coding by deriving a context model of a sign flag indicating a sign of a residual coefficient, based on a sign flag of a previous residual coefficient coded prior to the residual coefficient, when residual information is coded.

According to an embodiment of the present disclosure, there is provided an image decoding method performed by a decoding apparatus. The method includes receiving residual information for a current block, deriving a context model for a sign flag of a current residual coefficient in a current sub-block of the current block, decoding the sign flag based on the context model, deriving the current residual coefficient based on the sign flag, deriving a residual sample based on the current residual coefficient, and generating a reconstructed picture based on the residual sample, wherein the context model for the sign flag is derived based on a sign flag of a residual coefficient decoded prior to the current residual coefficient in the current sub-block.

According to another embodiment of the present disclosure, there is provided a decoding apparatus for performing image decoding. The decoding apparatus includes an entropy decoder for receiving residual information for a current block, deriving a context model for a sign flag of a current residual coefficient in a current sub-block of the current block, decoding the sign flag based on the context model, and deriving the current residual coefficient based on the sign flag, a transformer for deriving a residual sample based on the current residual coefficient, and an adder for generating a reconstructed picture based on the residual sample, wherein the context model for the sign flag is derived based on a sign flag of a residual coefficient decoded prior to the current residual coefficient in the current sub-block.

According to another embodiment of the present disclosure, there is provided an image encoding method performed by an encoding apparatus. The method includes deriving a current residual coefficient in a current sub-block of a current block, deriving a context model for a sign flag of the current residual coefficient, encoding the sign flag based on the context model, and generating a bitstream including the sign flag, wherein the context model for the sign flag is derived based on a sign flag of a residual coefficient encoded prior to the current residual coefficient in the current sub-block.

According to another embodiment of the present disclosure, there is provided a video encoding apparatus. The encoding apparatus includes a transformer for deriving a current residual coefficient in a current sub-block of a current block, and an encoder for deriving a context model for a sign flag of the current residual coefficient, encoding the sign flag based on the context model, and generating a bitstream including the sign flag, wherein the context model for the sign flag is derived based on a sign flag of a residual coefficient encoded prior to the current residual coefficient in the current sub-block.

According to the present disclosure, overall image/video compression efficiency can be improved.

According to the present disclosure, residual coding efficiency can be improved.

According to the present disclosure, a sign flag indicating a sign of a residual coefficient can be coded based on a context model, thereby saving an amount of bits assigned to the sign flag for the residual coefficient and improving overall residual coding efficiency.

According to the present disclosure, a context model for a sign flag indicating a sign of a residual coefficient is derived based on a sign flag of a residual coefficient coded prior to the residual coefficient, and thus the sign flag is coded by considering correlation between adjacent residual coefficients, thereby saving an amount of bits assigned to the sign flag and improving overall residual coding efficiency.

DESCRIPTION OF EXEMPLARY EMBODIMENTS

Figure 1:
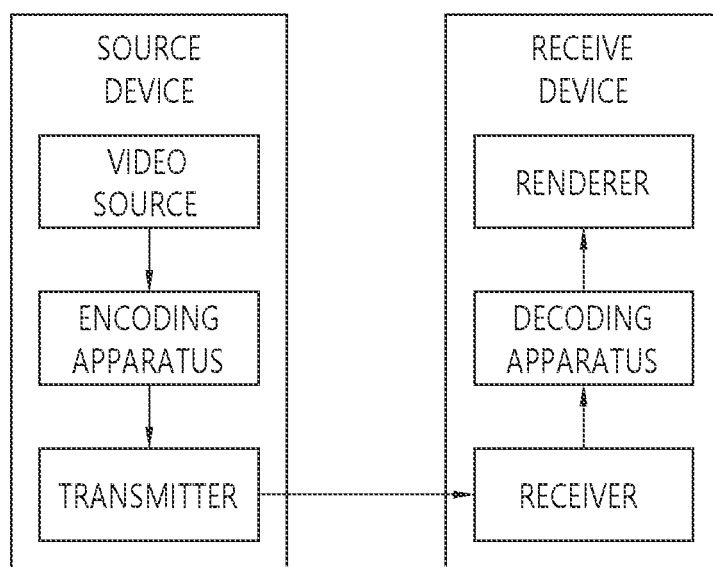
FIG. 1 briefly illustrates an example of a video/image coding device to which embodiments of the present disclosure are applicable.

The present disclosure may be modified in various forms, and specific embodiments thereof will be described and illustrated in the drawings. However, the embodiments are not intended for limiting the disclosure. The terms used in the following description are used to merely describe specific embodiments but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be partitioned into plural elements. The embodiments in which the elements are combined and/or partitioned belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

FIG. 1 briefly illustrates an example of a video/image coding device to which embodiments of the present disclosure are applicable.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input image/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Present disclosure relates to video/image coding. For example, the methods/embodiments disclosed in the present disclosure may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (ex. H.267 or H.268, etc.).

Present disclosure presents various embodiments of video/image coding, and the embodiments may be performed in combination with each other unless otherwise mentioned.

In the present disclosure, video may refer to a series of images over time. Picture generally refers to a unit representing one image in a specific time zone, and a slice/tile is a unit constituting part of a picture in coding. The slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consists of either a number of complete tiles or only a consecutive sequence of complete bricks of one tile. Tile groups and slices may be used interchangeably in the present disclosure. For example, in the present disclosure, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In the present disclosure, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in the present disclosure should be interpreted to indicate "additionally or alternatively."

Figure 2:
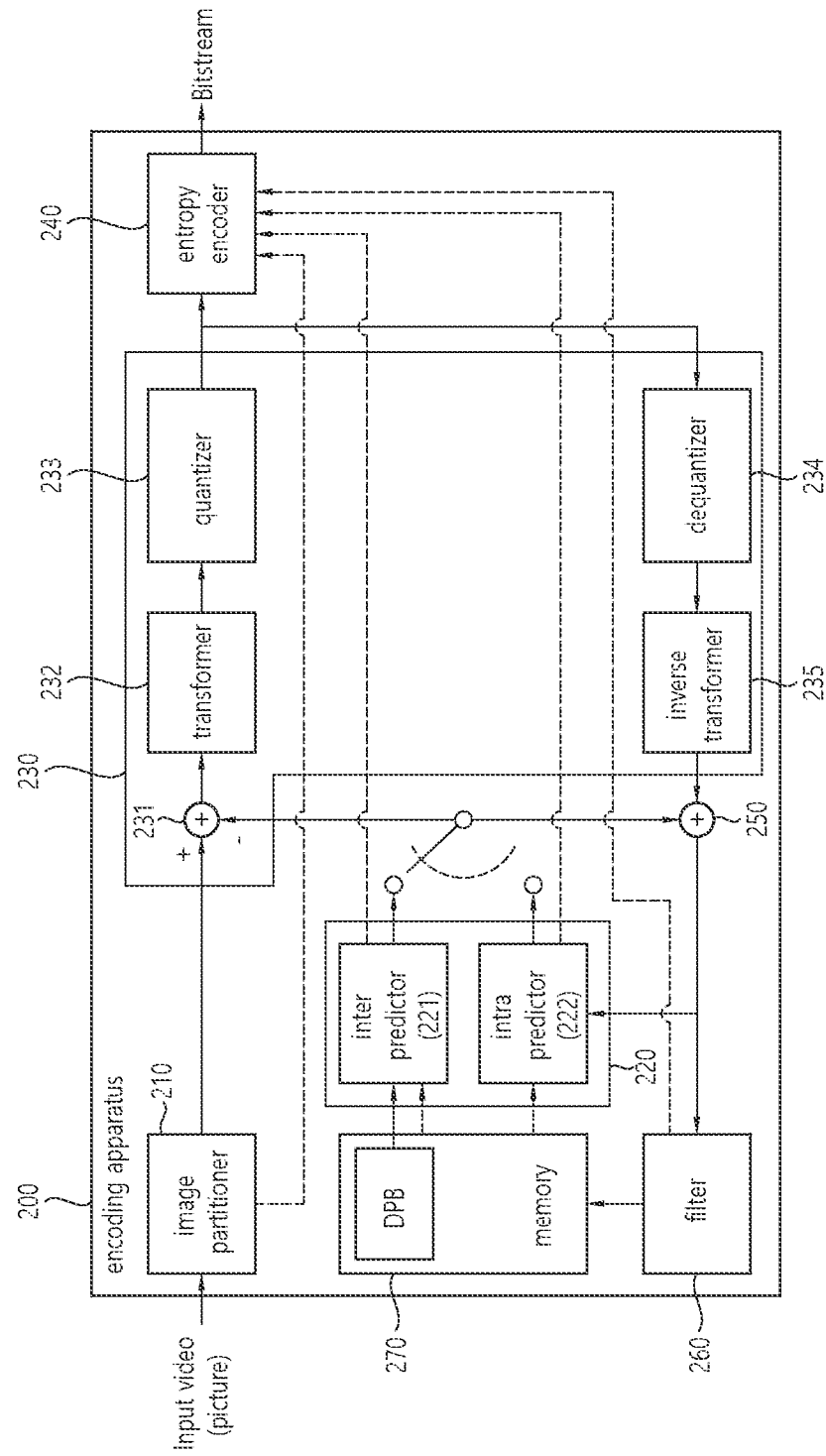
FIG. 2 is a schematic diagram illustrating a configuration of a video/image encoding apparatus to which the embodiment(s) of the present disclosure may be applied.

FIG. 2 is a schematic diagram illustrating a configuration of a video/image encoding apparatus to which the embodiment(s) of the present disclosure may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. An encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus 300 may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
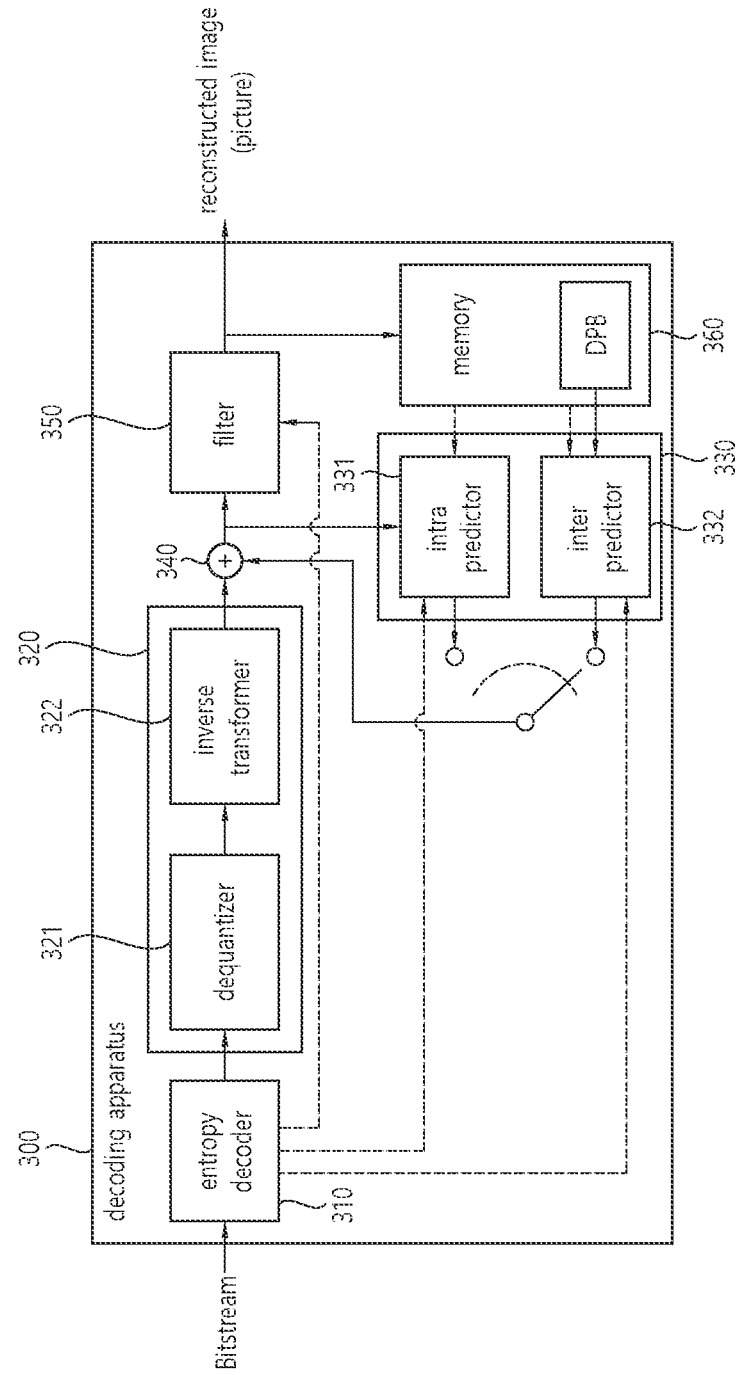
FIG. 3 is a schematic diagram illustrating a configuration of a video/image decoding apparatus to which the embodiment(s) of the present disclosure may be applied.

FIG. 3 is a schematic diagram illustrating a configuration of a video/image decoding apparatus to which the embodiment(s) of the present disclosure may be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350 may be configured by a hardware component (ex. A decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

As described above, the encoding apparatus may perform various encoding methods such as exponential Golomb, context-adaptive variable length coding (CAVLC), and context-adaptive binary arithmetic coding (CABAC). In addition, the decoding apparatus may decode information in a bitstream based on a coding method such as exponential Golomb coding, CAVLC or CABAC, and output a value of a syntax element required for image reconstruction and quantized values of transform coefficients related to residuals.

For example, the coding methods described above may be performed as described below.

Figure 4:
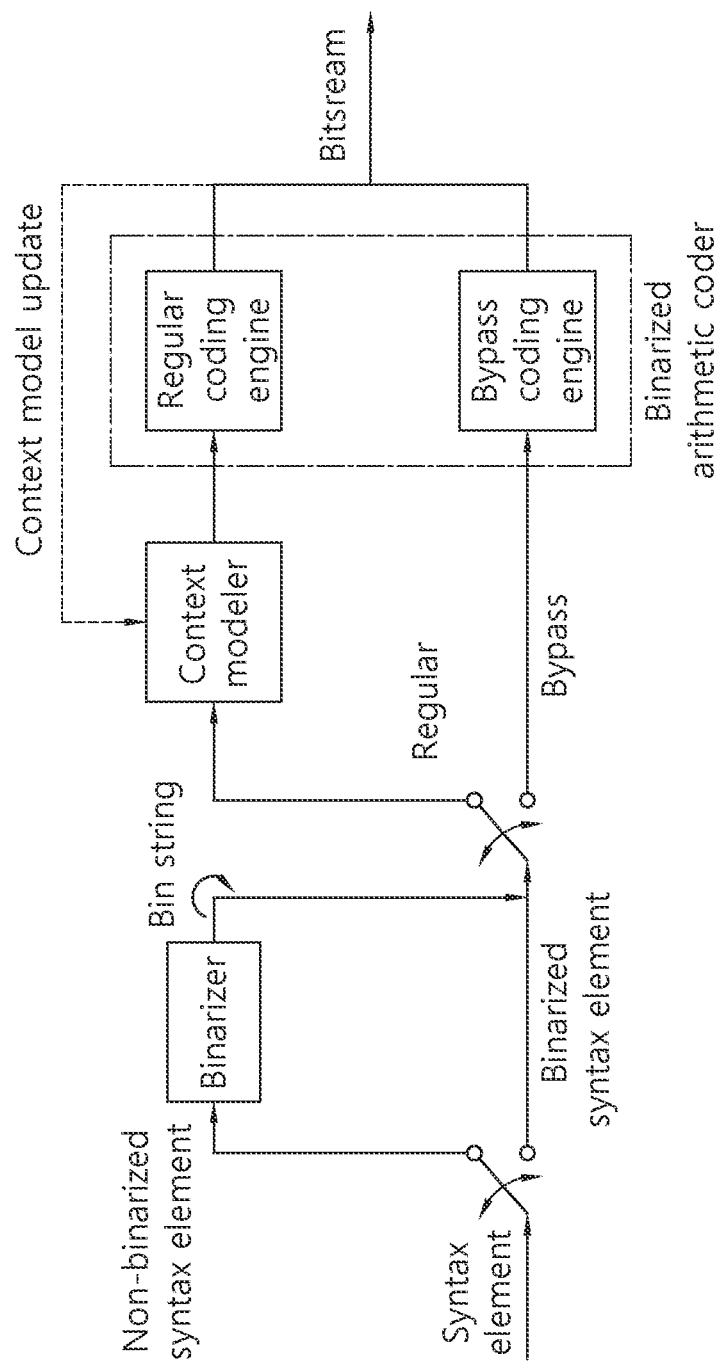
FIG. 4 exemplarily shows context-adaptive binary arithmetic coding (CABAC) for encoding a syntax element.

FIG. 4 exemplarily shows context-adaptive binary arithmetic coding (CABAC) for encoding a syntax element. For example, in the CABAC encoding process, when an input signal is a syntax element, rather than a binary value, the encoding apparatus may convert the input signal into a binary value by binarizing the value of the input signal. In addition, when the input signal is already a binary value (i.e., when the value of the input signal is a binary value), binarization may not be performed and may be bypassed. Here, each binary number 0 or 1 constituting a binary value may be referred to as a bin. For example, if a binary string after binarization is 110, each of 1, 1, and 0 is called one bin. The bin(s) for one syntax element may indicate a value of the syntax element.

Thereafter, the binarized bins of the syntax element may be input to a regular coding engine or a bypass coding engine. The regular coding engine of the encoding apparatus may allocate a context model reflecting a probability value to the corresponding bin, and may encode the corresponding bin based on the allocated context model. The regular coding engine of the encoding apparatus may update a context model for each bin after performing encoding on each bin. A bin encoded as described above may be referred to as a context-coded bin.

Meanwhile, when the binarized bins of the syntax element are input to the bypass coding engine, they may be coded as follows. For example, the bypass coding engine of the encoding apparatus omits a procedure of estimating a probability with respect to an input bin and a procedure of updating a probability model applied to the bin after encoding. When bypass encoding is applied, the encoding apparatus may encode the input bin by applying a uniform probability distribution instead of allocating a context model, thereby improving an encoding rate. The bin encoded as described above may be referred to as a bypass bin.

Entropy decoding may represent a process of performing the same process as the entropy encoding described above in reverse order.

For example, when a syntax element is decoded based on a context model, the decoding apparatus may receive a bin corresponding to the syntax element through a bitstream, determine a context model using the syntax element and decoding information of a decoding target block or a neighbor block or information of a symbol/bin decoded in a previous stage, predict an occurrence probability of the received bin according to the determined context model, and perform an arithmetic decoding on the bin to derive a value of the syntax element. Thereafter, a context model of a bin which is decoded next may be updated with the determined context model.

Also, for example, when a syntax element is bypass-decoded, the decoding apparatus may receive a bin corresponding to the syntax element through a bitstream, and decode the input bin by applying a uniform probability distribution. In this case, the procedure of the decoding apparatus for deriving the context model of the syntax element and the procedure of updating the context model applied to the bin after decoding may be omitted.

As described above, residual samples may be derived as quantized transform coefficients through transform and quantization processes. The quantized transform coefficients may also be referred to as transform coefficients. In this case, the transform coefficients in a block may be signaled in the form of residual information. The residual information may include a residual coding syntax. That is, the encoding apparatus may configure a residual coding syntax with residual information, encode the same, and output it in the form of a bitstream, and the decoding apparatus may decode the residual coding syntax from the bitstream and derive residual (quantized) transform coefficients. The residual coding syntax may include syntax elements representing whether transform was applied to the corresponding block, a location of a last effective transform coefficient in the block, whether an effective transform coefficient exists in the subblock, a size/sign of the effective transform coefficient, and the like, as will be described later.

For example, the (quantized) transformation coefficients (i.e., the residual information) may be encoded and/or decoded based on syntax elements such as transform_skip_flag, last_sig_coeff_x_prefix, last_sig_coeff_y_prefix, last_sig_coeff_x_suffix, last_sig_coeff_y_suffix, coded_sub_block_flag, sig_coeff_flag, par_level_flag, abs_level_gt1_flag, abs_level_gt3_flag, abs_remainder, coeff_sign_flag, dec_abs_level, mts_idx. Syntax elements related to residual data encoding/decoding may be represented as shown in the following table.

TABLE 1

| | Descriptor |
|---|---|
| residual coding( x0, y0, log2TbWidth, log2TbHeight, cIdx ) { | |
|   if( transform_skip_enabled flag && (cIdx != 0 \|\| tu_mts_flag[ x0 ] [ y0 ] == 0 ) && | |
|     (log2Tb Width <= 2 ) && ( log2TbHeight <= 2 ) ) | |
|     transform_skip_flag[ x0 ][ y0 ][ cIdx ] | ae(v) |
|   last_sig_coeff_x_prefix | ae(v) |
|     last_sig_coeff_y_prefix | ae(y) |
|   if( last sig coeff x prefix > 3 ) | |
|     last sig_coeff_x_suffix | ae(v) |
|   if( last sig coeff y prefix > 3 ) | |

TABLE 1-continued

| | Descriptor |
|---|---|
| last_sig_coeff_y_suffix | ae(v) |

```
log2SbSize = ( Min( log2TbWidth, log2TbHeight ) < 2 ? 1 : 2 )
numSbCoeff = 1 << ( log2SbSize << 1)
lastScanPos = numSbCoeff
lastSubBlock = ( 1 << ( log2TbWidth + log2TbHeight − 2 * log2SbSize) ) − 1
do {
   if( lastScanPos = = 0 ) {
      lastScanPos = numSbCoeff
      lastSubBlock− −
   }
   lastScanPos− −
   xS = DiagScanOrder[ log2TbWidth − log2SbSize ] [ log2TbHeight − log2SbSize ]
                     [ lastSubBlock ][ 0 ]
   yS = DiagScanOrder[ log2TbWidth − log2SbSize ] [ log2TbHeight − log2SbSize ]
                     [ lastSubBlock ][ 1 ]
   xC = ( xS << log2SbSize) +
         DiagScanOrder[ log2SbSize ][ log2SbSize ][ lastScanPos ][ 0 ]
   yC = ( yS << log2SbSize) +
         DiagScanOrder[ log2SbSize ][ log2SbSize ][ lastScanPos ][ 1 ]
} while( (xC != LastSignificantCoeffX ) | | ( yC != LastSignificantCoeffY ) )
numSigCoeff = 0
QState = 0
for( i = lastSubBlock; i >= 0; i− − ) {
   startQStateSb = QState
   xS = DiagScanOrder[ log2TbWidth − log2SbSize ][ log2TbHeight − log2SbSize ]
                     [ lastSubBlock ][ 0 ]
   yS = DiagScanOrder[ log2TbWidth − log2SbSize ][ log2TbHeight − log2SbSize ]
                     [ lastSubBlock ][ 1 ]
   inferSbDcSigCoeffFlag = 0
   if( ( i < lastSubBlock) && ( i > 0 ) ) {
      coded_sub_block_flag[ xS ] [ yS ]                                        ae(v)
      inferSbDcSigCoeffFlag = 1
   }
   firstSigScanPosSb = numSbCoef
   lastSigScanPosSb = −1
   remBinsPass1 = (log2SbSize < 2 ? 6 : 28 )
   remBinsPass2 = (log2SbSize < 2 ? 2 : 4 )
   firstPosMode0 = (i = = lastSubBlock ? lastScanPos − 1 : numSbCoef − 1 )
   firstPosMode1 = −1
   firstPosMode2 = −1
   for(n = ( i = = firstPosMode0; n >= 0 && remBinsPass1 >= 3; n− − ) {
      xC = ( xS << log2SbSize ) + DiagScanOrder[ log2SbSize ][ log2SbSize ][ n ][ 0 ]
      yC = ( yS << log2SbSize ) + DiagScanOrder[ log2SbSize ][ log2SbSize ][ n ][ 1 ]
      if coded_sub_block_flag[ xS ][ yS ] && ( n > 0 | | inferSbDcSigCoeffFlag ) ) {
         sig_coeff_flag[ xC ] [ yC ]                                           ae(v)
         remBinsPass1− −
         if( sig_coeff_flag[ xC ] [ yC ])
            inferSbDcSigCoeffFlag = 0
      }
      if( sig_coeff_flag[ xC ] [ yC ] ) {
         numSigCoeff++
         abs_level_gt1_flag[ n ]                                               ae(v)
         remBinsPass1− −
         if( abs_level_gt1_flag[ n ] ) {
            par_level_flag[ n ]                                                ae(v)
            remBinsPass1
            if( remBinsPass2 > 0 ) {
               remBinsPass2− −
               if( remBinsPass2 = = 0 )
                  firstPosMode1 = n − 1
            }
         }
         if( lastSigScanPosSb = = −1 )
            lastSigScanPosSb = n
         firstSigScanPosSb = n
      }
      AbsLevelPass1[ xC ][ yC ] =
         sig_coeff_flag[ xC ][ yC ] + par_level_flag[n] + abs_level_gt1_flag[ n ]
      if( dep_quant_enabled_flag )
         QState = QStateTransTable[ QState ][ AbsLevelPass1[ xC ][ yC ] & 1 ]
      if( remBinsPass1 < 3 )
         firstPosMode2 = n − 1
   }
   if( firstPosMode1 < firstPosMode2 )
      firstPosMode1 = firstPosMode2
   for( n = numSbCoeff − 1; n >= firstPosMode2; n− − )
```

TABLE 1-continued

|  | Descriptor |
|---|---|
| ```
        if( abs level gt1 flag[ n ] )
            abs level gt3 flag[ n ]
    for( n = numSbCoeff - 1; n >= firstPosMode1; n- - )
        xC = ( xS << log2SbSize ) + DiagScanOrder[ log2SbSize ][ log2SbSize ][ n ][ 0 ]
        yC = ( yS << log2SbSize ) + DiagScanOrder[ log2SbSize ][ log2SbSize ][ n ][ 1 ]
        if( abs level gt3 flag[ n ] )
            abs remainder[ n ]
        AbsLevel[ xC ][yC ] = AbsLevelPass[ xC ][ yC ] -
                    2 * ( abs level gt3 flag[ n ] + abs remainder[ n ] )
    }
    for( n = firstPosMode1; n > firstPosMode2; n- - ) {
        xC = ( xS << log2SbSize ) + DiagScanOrder[ log2SbSize ][ log2SbSize ][ n ][ 0 ]
        yC = ( yS << log2SbSize ) + DiagScanOrder[ log2SbSize ][ log2SbSize ][ n ][ 1 ]
        if( abs level gt1 flag[ n ] )
            abs remainder[ n ]
        AbsLevel[ xC ][ yC ] = AbsLevelPass1[ xC ][ yC ] - 2 * abs remainder[ n ]
    }
    for( n = firstPosMode2; n >= 0; n- - ) {
        xC = ( xS << log2SbSize ) + DiagScanOrder[ log2SbSize ][ log2SbSize ][ n ][ 0 ]
        yC = ( yS << log2SbSize ) + DiagScanOrder[ log2SbSize ][ log2SbSize ][ n ][ 1 ]
        dec abs level[ n ]
            if( AbsLevel[ xC ][ yC ] > 0 )
        firstSigScanPosSb = n
        if( dep quant enabled flag)
            QState = QStateTransTable[ QState ][ AbsLevel[ xC ][ yC ] & 1 ]
    }
    if( dep quant enabled flag || !sign data hiding enabled flag )
        signHidden = 0
    else
        signHidden = ( lastSigScanPosSb - firstSigScanPosSb > 3 ? 1 : 0 )
    for( n = numSbCoeff - 1; n >= 0; n- - )
        xC = ( xS << log2SbSize ) + DiagScanOrder[ log2SbSize ][ log2SbSize ][ n ][ 0 ]
        yC = ( yS << log2SbSize ) + DiagScanOrder[ log2SbSize ][ log2SbSize ][ n ][ 1 ]
        if( sig_coeff_flag[ xC ] [ yC ] &&
            ( !signHidden || ( n != firstSigScanPosSb ) ) )
            coeff sign flag[ n ]
    }
    if( dep quant enabled flag ) {
        QState = startQStateSb
        for( n = numSbCoef - 1; n >= 0; n- - )
            xC = ( xS << log2SbSize) +
                    DiagScanOrder[ log2SbSize ][ log2SbSize ][ n ][ 0 ]
            yC = ( yS << log2SbSize) +
                    DiagScanOrder[ log2SbSize ][ log2SbSize ][ n ][ 1 ]
            if sig coeff flag[ xC ][ yC ] )
                TransCoeffLevel[ x0 ][ y0 ][ cIdx ][ xC ][ yC ] =
                    ( 2 * AbsLevel[ xC ][ yC ] - (QState 1 ? 1 : 0))*
                    ( 1 - 2 * coeff_sign_flag[ n ])
            QState = QStateTransTableQState ][ par level flag[ n ] )
    } else {
        sumAbsLevel = 0
        for(n = numSbCoeff 1; n >= 0;n  ) {
            xC = (xS << log2SbSize) +
                    DiagScanOrder[ log2SbSize ][ log2SbSize ][ n ][ 0 ]
            yC = ( yS << log2SbSize) +
                    DiagScanOrder[ log2SbSize ][ log2SbSize ][ n ][ 1 ]
            if sig coeff flag[ xC ][ yC ] ) {
                TransCoeffLevel[ x0 ][ y0 ][ cIdx ][ xC ][ yC ] =
                    AbsLevel[ xC ][ yC ] * ( 1 - 2 * coeff_sign_flag[ n ] )
                if( signHidden ) {
                    sumAbsLevel += AbsLevel[ xC ][ yC ]
                    if( ( n = = firstSigScanPosSb ) && ( sumAbsLevel % 2 ) = = 1 ) )
TransCoeffLevel[ x0 ][ y0 ][ cIdx ][ xC ][ yC ] =
-TransCoeffLevel[ x0 ][ y0 ][ cIdx ][ xC ][ yC ]
                }
            }
        }
    }
    iff tu mts flag[ x0 ][ y0 ] && ( cIdx = = 0 ) )
        mts_idx[ x0 ][ y0 ][ cIdx ]
}
``` | ae(v)<br><br><br><br><br>ae(v)<br><br><br><br><br><br>ae(v)<br><br><br><br><br>ae(v)<br><br><br><br><br><br><br><br>ae(v)<br><br><br><br><br><br><br><br><br><br><br><br><br><br><br><br><br><br><br><br><br><br><br><br><br><br>ae(v) | transform_skip_flag indicates whether transform is skipped in an associated block. The transform_skip_flag may be a syntax element of a transform skip flag. The associated block may be a coding block (CB) or a transform block (TB). Regarding transform (and quantization) and residual coding procedures, CB and TB may be used interchangeably. For example, as described above, residual samples may be derived for CB, and (quantized) transform coefficients may be derived through transform and quantization for the residual samples, and through the residual coding procedure, information (e.g., syntax elements) efficiently indicating a position, magnitude, sign, etc. of the (quantized) transform coefficients may be generated and signaled. The quantized transform coefficients may simply be called transform coefficients. In general, when the CB is not larger than a maximum TB, a size of the CB may be the same as a size of the TB, and in this case, a target block to be transformed (and quantized) and residual coded may be called a CB or a TB. Meanwhile, when the CB is greater than the maximum TB, a target block to be transformed (and quantized) and residual coded may be called a TB. Hereinafter, it will be described that syntax elements related to residual coding are signaled in units of transform blocks (TBs) but this is an example and the TB may be used interchangeably with coding blocks (CBs as described above.

Meanwhile, syntax elements which are signaled after the transform skip flag is signaled may be the same as the syntax elements disclosed in Table 6 below, and detailed descriptions on the syntax elements are described below.

Meanwhile, a method of signaling tu_mts_idx may be proposed, unlike in the aforementioned embodiments in which the syntax elements are transmitted.

Specifically, the method of signaling tu_mts_idx in the conventional VVC Draft 3 may be compared with the proposed method of signaling tu_mts_idx as follows.

TABLE 2

| VVC Draft 3 | Proposed |
| --- | --- |
| transform_unit( ) | transform_unit( ) |
| tu_cbf_luma<br>...<br>if( ... tu_cbf_luma &&<br>  ( tbWidth <= 32 ) &&<br>  ( tbHeight < = 32 ) ... )<br>  tu_mts_flag | tu_cbf_luma<br>if( ... tu_cbf_luma &&<br>  ( tbWidth <= 32 ) &&<br>  ( tbHeight < = 32 ) ... )<br>  tu_mts_idx |
| residual_codinq( cIdx ) | |
| if ( cIdx ! = 0 \|\| !tu_mts_flag ) &&<br>  ( log2TbWidth <= 2 ) &&<br>  ( log2TbHeight <= 2 ) )<br>  transform_skip_flag[ cIdx ]<br>... /* coefficient parsing */ ...<br>if( tu_mts_flag && cIdx = = 0 )<br>  mts_idx | |

As shown in Table 2, according to the conventional method, a transform skip flag may be parsed after an MTS flag for a current block is parsed, and then an MTS index may be coded. Herein, the coding on the MTS index may be performed through fixed-length binarization, and a fixed bit length for the MTS index may be 2.

On the other hand, according to the proposed method, the MTS index may be coded without having to additionally parse the transform skip flag and the MTS flag, and truncated unary binarization may be used in the coding for the MTS index. Herein, the MTS index may indicate whether a transform is applied to residual information of a current block, and may indicate whether the MTS is applied. That is, the proposed method may be a method in which the transform skip flag, the MTS flag, and the MTS index are signaled as one syntax element. In the proposed method, a first bin of the MTS index may indicate whether the transform is applied to residual information of a current block, and a second bin of the MTS index may indicate whether the MTS is applied or may indicate a transform kernel to be applied.

In the proposed method, a meaning indicated by a value of the MTS index and a binarization value thereof may be as shown in the following table.

TABLE 3

| | transform type | | binarization | | |
| --- | --- | --- | --- | --- | --- |
| tu_mts_idx | horizontal | vertical | MTS &<br>TS enabled | MTS<br>enabled | TS<br>enabled |
| 0 | DCT-II | DCT-II | 0 | 0 | 0 |
| 1 | SKIP | SKIP | 10 | — | 1 |
| 2 | DST-VII | DST-VII | 110 | 10 | — |
| 3 | DCT-VIII | DST-VII | 1110 | 110 | — |
| 4 | DST-VII | DCT-VIII | 11110 | 1110 | — |
| 5 | DCT-VIII | DCT-VIII | 11111 | 1111 | — |

For example, if the value of the MTS index is 0, the MTS index may indicate that the transform for the current block is applied, the MTS is not applied, and a horizontal transform kernel type and a vertical transform kernel type are DCT-2. In addition, if the value of the MTS index is 1, the MTS index may indicate that the transform for the current block is not applied (i.e., the MTS is not applied, and the transform kernel type is not indicated). In addition, if the value of the MTS index is 2, the MTS index may indicate that the transform for the current block and the MTS are applied, and the horizontal transform kernel type and the vertical transform kernel type are DST-7. In addition, if the value of the MTS index is 3, the MTS index may indicate that the transform for the current block and the MTS are applied, the horizontal transform kernel type is DCT-8, and the vertical transform kernel type is DST-7. In addition, if the value of the MTS index is 4, the MTS index may indicate that the transform for the current block and the MTS are applied, the horizontal transform kernel type is DST-7, and the vertical transform kernel type is DCT-8. In addition, if the value of the MTS index is 5, the MTS index may indicate that the transform for the current block and the MTS are applied, and the horizontal transform kernel type and the vertical transform kernel type are DCT-8.

Alternatively, another example of the meaning indicated by the value of the MTS index and the binarization value thereof may be as shown in the following table.

TABLE 4

| | transform type | | binarization | | |
| --- | --- | --- | --- | --- | --- |
| tu_mts_idx | horizontal | vertical | MTS &<br>TS enabled | MTS<br>enabled | TS<br>enabled |
| 0 | SKIP | SKIP | 0 | — | 0 |
| 1 | DCT-II | DCT-II | 10 | 0 | 1 |
| 2 | DST-VII | DST-VII | 110 | 10 | — |
| 3 | DCT-VIII | DST-VII | 1110 | 110 | — |

TABLE 4-continued

| | transform type | | binarization | | |
|---|---|---|---|---|---|
| tu_mts_idx | horizontal | vertical | MTS & TS enabled | MTS enabled | TS enabled |
| 4 | DST-VII | DCT-VIII | 11110 | 1110 | — |
| 5 | DCT-VIII | DCT-VIII | 11111 | 1111 | — |

For example, if the value of the MTS index is 0, the MTS index may indicate that the transform for the current block is not applied (i.e., the MTS is not applied, and the transform kernel type is not indicated). In addition, if the value of the MTS index is 1, the MTS index may indicate that the transform for the current block is applied, the MTS is not applied, and the horizontal transform kernel type and the vertical transform kernel type are DCT-2. In addition, if the value of the MTS index is 2, the MTS index may indicate that the transform for the current block and the MTS are applied, and the horizontal transform kernel type and the vertical transform kernel type are DST-7. In addition, if the value of the MTS index is 3, the MTS index may indicate that the transform for the current block and the MTS are applied, the horizontal transform kernel type is DCT-8, and the vertical transform kernel type is DST-7. In addition, if the value of the MTS index is 4, the MTS index may indicate that the transform for the current block and the MTS are applied, the horizontal transform kernel type is DST-7, and the vertical transform kernel type is DCT-8. In addition, if the value of the MTS index is 5, the MTS index may indicate that the transform for the current block and the MTS are applied, and the horizontal transform kernel type and the vertical transform kernel type are DCT-8.

Meanwhile, the number of context models may not be changed, and a method of specifying a context index increment ctxInc for each bin of the tu_mts_idx may be as shown in the following table.

TABLE 5

| Syntax element | binIdx | | | | | |
|---|---|---|---|---|---|---|
| | 0 | 1 | 2 | 3 | 4 | >= 5 |
| tu_mts_idx (MTS & TS) | 0 | 1...6 (1 + cqtDepth) | 7 | 8 | 9 | na |
| tu_mts_idx (MTS) | 1...6 (1 + cqtDepth) | 7 | 8 | 9 | na | na |
| tu_mts_idx (TS) | 0 | na | na | na | na | na |

The proposed MTS index may also be represented by a unified MTS index.

Syntax elements related to residual data encoding/decoding including the unified MTS index may be as shown in the following table.

TABLE 6

| residual coding( x0, y0, log2Tb Width, log2TbHeight, cIdx ) { | Descriptor |
|---|---|
| if( ( mts idx[ x0 ][ y0 ] > 0 \| \| (cu sbt flag && log2Tb Width < 6 && log2TbHeight < 6 ) ) && cIdx = = 0 && log2TbWidth > 4 ) | |
|  log2Tb Width = 4 | |
| else | |
|  log2TbWidth = Min( log2TbWidth, 5 ) | |
| if( mts_idx[ x0 ][ y0 ] > 0 \| \| ( cu_sbt_flag && log2Tb Width < 6 && log2Tb Height < 6 ) ) && cIdx = = 0 && log2TbHeight > 4 ) | |
|  log2TbHeight – 4 | |
| else | |
|  log2TbHeight = Min( log2TbHeight, 5 ) | |
| last sig coeff x prefix | aefv) |
| last sig coeff y prefix | acfv) |
| iff last sig coeff x prefix> 3 ) | |
|  last sig coeff x suffix | aefv) |
| if( last sis coeff y prefix > 3 ) | |
|  last sig coeff y suffix | aefv) |
| log2SbSize = ( Min( log2TbWidth, log2TbHeight )< 2 ? 1 : 2 ) | |
| numSbCoeff = 1 << (log2SbSize « 1) | |
| lastScanPos = numSbCoeff | |
| lastSubBlock – ( 1 << ( log2TbWidth + log2TbHeight – 2 * log2SbSize ) ) – 1 | |
| do { | |
|  if( lastScanPos = = 0 ) { | |
|   lastScanPos = numSbCoeff | |
|   lastSubBlock– – | |
|  } | |
|  lastScanPos– – | |
|  xS = DiagScanOrder[ log2TbWidth – log2SbSize ] [ log2TbHeight – log2SbSize ] [ lastSubBlock ][ 0 ] | |
|  yS = DiagScanOrder log2TbWidth – log2SbSize ] [ log2TbHeight – log2SbSize ] [ lastSubBlock ][ 1 ] | |
|  xC – (xS << log2SbSize ) + DiagScanOrder[ log2SbSize ][ log2SbSize ][ lastScanPos ][ 0 ] | |
|  yC – ( yS << log2SbSize) + DiagScanOrder[ log2SbSize ][ log2SbSize ][ lastScanPos ][ 1 ] | |
| } while (xC != LastSignificantCoeffX ) \| \| ( yC != LastSignificantCoeffY ) ) | |
| numSigCoef= 0 | |
| QState = 0 | |
| for( i = lastSubBlock; i >= 0; i– – ) { | |
|  startQStateSb = QState | |
|  xS = DiagScanOrder[ log2TbWidth – log2SbSize ][ log2TbHeight – log2SbSize ] | |

TABLE 6-continued

| residual coding( x0, y0, log2Tb Width, log2TbHeight, cIdx ) { | Descriptor |
|---|---|
|             [ lastSubBlock ][ 0 ] <br>     yS = DiagScanOrder[ log2TbWidth − log2SbSize ][ log2TbHeight − log2SbSize ] <br>            [ lastSubBlock ][ 1 ] <br>     inferSbDcSigCoeffFlag = 0 <br>     if( (i < lastSubBlock) && ( i > 0 ) ) { <br>         coded sub block flag[ xS ][ yS ] <br>         inferSbDcSigCoeffFlag = 1 <br>     } <br>     firstSigScanPosSb = numSbCoeff <br>     lastSigScanPosSb = −1 <br>     remBinsPass1 = ( log2SbSize < 2 ? 6 : 28) <br>     remBinsPass2 = ( log2SbSize < 2 ? 2 : 4) <br>     firstPosMode0 = ( i = = lastSubBlock ? lastScanPos − 1 : numSbCoeff − 1 ) <br>     firstPosMode1 = −1 <br>     firstPosMode2 = −1 <br>     for(n = (i = = firstPosMode0; n >= 0 && remBinsPass1 >= 3; n− − ) { <br>         xC = ( xS << log2SbSize ) + DiagScanOrder[ log2SbSize ][ log2SbSize ][ n ][ 0 ] <br>         yC = ( yS << log2SbSize ) + DiagScanOrder[ log2SbSize ][ log2SbSize ][ n ][ 1 ] <br>         if coded sub block flag[ xS ][ yS ] && ( n > 0 \|\| !inferSbDcSigCoeffFlag ) ) { <br>            sig_coeff_flag[ xC ][ yC ] <br>            remBinsPass1− − <br>            if( sig coeff flag[ xC ][ yC ] ) <br>                inferSbDcSigCoeffFlag = 0 <br>         if( sig coeff flag[ xC ] [ yC ] ) { <br>            numSigCoeff++ <br>            abs level gt1 flag[ n ] <br>            remBinsPass1 <br>            if( abs level gt1 flag[ n ] ) { <br>                par level flag[ n ] <br>                remBinsPass1− − <br> abs level gt3 flag[ n ] <br> remBinsPass1− − <br>         } <br>         if( lastSigScanPosSb = = −1) <br>            lastSigScanPosSb = n <br>         firstSigScanPosSb = n <br>     } <br>     AbsLevelPass1 [ xC ][ xC ] = <br>         sig_coef_flag[ xC ][ yC ] − par_level_flag[ n ] + abs_level_gt1_flag[ n ] + 2 * <br> abs level gt3 flag[ n ] <br>     if( dep quant enabled flag ) <br>         QState = QStateTransTable[ QState ][ AbsLevelPass1[ xC ][ yC ] & 1 ] <br>     if( remBinsPass1 < 3 ) <br>         firstPosMode2 = n − 1 <br>     } <br>     for( n = numSbCoeff− 1; n >= firstPosMode2; n− − ) { <br>         xC = ( xS << log2SbSize ) + DiagScanOrder[ log2SbSize ][ log2SbSize ][ n ][ 0 ] <br>         yC = ( yS << log2SbSize ) + DiagScanOrder[ log2SbSize ][ log2SbSize ][ n ][ 1 ] <br>         if( abs level gt3 flag[ n ] ) <br>            abs remainder[ n ] <br>         AbsLevel[ xC ][ yC ] = AbsLevelPass1[ xC ][ yC ] + <br>                2 * abs remainder[ n ] <br>     } <br>     for( n = firstPosMode2; n >= 0; n− − ) { <br>         xC = ( xS << log2SbSize ) + DiagScanOrder[ log2SbSize ][ log2SbSize ][ n ][ 0 ] <br>         yC = ( yS << log2SbSize ) + DiagScanOrder[ log2SbSize ][ log2SbSize ][ n ][ 1 ] <br>         dec abs level[ n ] <br>         if( AbsLevel[ xC ][ yC ] > 0) <br>            firstSigScanPosSb = n <br>         if( dep quant enabled flag ) <br>            QState = QStateTransTable[ QState ][ AbsLevel[ xC ][ yC ] & 1 ] <br>     } <br>     if( dep quant enabled flag \|\| !sign data hiding enabled flag ) <br>         signHidden = 0 <br>     else <br>         signHidden = ( lastSigScanPosSb − firstSigScanPosSb > 3 ? 1 : 0 ) <br>     for( n = numSbCoeff − 1; n >= 0; n− − ) { <br>         xC = ( xS << log2SbSize ) + DiagScanOrder[ log2SbSize ][ log2SbSize ][ n ][ 0 ] <br>         yC = ( yS << log2SbSize ) + DiagScanOrder[ log2SbSize ][ log2SbSize ][ n ][ 1 ] <br>         if( sig_coeff_flag[ xC ][ yC ] && <br>           (!signHidden \|\| ( n != firstSigScanPosSb ) ) ) <br>            coeff sign flag[ n ] <br>     } <br>     if( dep quant enabled flag ) { <br>         QState = startQStateSb <br>         for( n = numSbCoeff − 1; n >= 0; n− − ) { <br>            xC = (xS << log2SbSize ) + <br>                DiagScanOrder[ log2SbSize ][ log2SbSize ][ n ][ 1 ] | ae(v) <br><br> ae(v) <br><br><br> ae(v) <br><br><br> ae(v) <br><br><br><br><br><br><br><br><br><br><br><br><br><br><br><br> aefv) <br><br><br><br><br><br><br><br><br><br> aefv) <br><br><br><br><br><br><br><br><br><br><br><br><br> aefv) |

TABLE 6-continued

| residual coding( x0, y0, log2Tb Width, log2TbHeight, cIdx ) { | Descriptor |
|---|---|

```
            yC = ( yS << log2SbSize ) +
                DiagScanOrder[ log2SbSize ][ log2SbSize ][ n ][ 1 ]
            if( sig_coeff_flag[ xC ][ yC ] )
              TransCoeffLevel[ x0 ] [ y0 ] [ cIdx ] [ xC ] [ yC ] =
                  ( 2 * AbsLevel[ xC ][ yC ] - ( QState > 1 ? 1 : 0 ) ) *
                  ( 1 - 2 * coeff_sign_flag[ n ] )
            QState = QStateTransTable[ QState ][ par_level_flag[ n ] ]
        } else {
          sumAbsLevel = 0
          for( n = numSbCoeff - 1; n >= 0; n- - ) {
            xC = ( xS << log2SbSize ) +
                DiagScanOrder[ log2SbSize ][ log2SbSize ][ n ][ 0 ]
            yC = ( yS << log2SbSize ) +
                DiagScanOrder[ log2SbSize ][ log2SbSize ][ n ][ 1 ]
            if( sig_coeff_flag[ xC ][ yC ] ) {
              TransCoeffLevel[ x0 ] [ y0 ] [ cIdx ] [ xC ] [ yC ] =
                  AbsLevel[ xC ][ yC ] * ( 1 - 2 * coeff_sign_flag[ n ] )
              if( signHidden ) {
                sumAbsLevel += AbsLevel[ xC ][ yC ]
                if( (n = = firstSigScanPosSb) && ( sumAbsLevel % 2 ) = =
1 ) )
                  TransCoeffLevel[ x0 ][ y0 ][ cIdx ][ xC ][ yC ] =
                      -TransCoeffLevel[ x0 ][ y0 ][ cIdx ][ xC ][ yC ]
              }
            }
          }
        }
      }
    }
}
```

Referring to the Table 6 above, last_sig_coeff_x_prefix, last_sig_coeff_y_prefix, last_sig_coeff_x_suffix, last_sig_coeff_y_suffix, coded_sub_block_flag, sig_coeff_flag, abs_level_gt1_flag, par_level_flag, abs_level_gt3_flag, abs_remainder, dec_abs_level, and/or coeff_sign_flag may be encoded/decoded.

In an embodiment, the encoding apparatus may encode (x, y) position information of the last non-zero transform coefficient in a transform block based on the syntax elements last_sig_coeff_x_prefix, last_sig_coeff_y_prefix, last_sig_coeff_x_suffix, and last_sig_coeff_y_suffix. More specifically, the last_sig_coeff_x_prefix represents a prefix of a column position of a last significant coefficient in a scanning order within the transform block, the last_sig_coeff_y_prefix represents a prefix of a row position of the last significant coefficient in the scanning order within the transform block, the last_sig_coeff_x_suffix represents a suffix of a column position of the last significant coefficient in the scanning order within the transform block, and the last_sig_coeff_y_suffix represents a suffix of a row position of the last significant coefficient in the scanning order within the transform block. Here, the significant coefficient may represent a non-zero coefficient. In addition, the scanning order may be a right diagonal scanning order. Alternatively, the scanning order may be a horizontal scanning order or a vertical scanning order. The scanning order may be determined based on whether intra/inter prediction is applied to a target block (a CB or a CB including a TB) and/or a specific intra/inter prediction mode.

Thereafter, the encoding apparatus may divide the transform block into 4×4 sub-blocks, and then indicate whether there is a non-zero coefficient in the current sub-block using a 1-bit syntax element coded_sub_block_flag for each 4×4 sub-block.

If a value of coded_sub_block_flag is 0, there is no more information to be transmitted, and thus, the encoding apparatus may terminate the encoding process on the current sub-block. Conversely, if the value of coded_sub_block_flag is 1, the encoding apparatus may continuously perform the encoding process on sig_coeff_flag. Since the sub-block including the last non-zero coefficient does not require encoding for the coded_sub_block_flag and the sub-block including the DC information of the transform block has a high probability of including the non-zero coefficient, coded_sub_block_flag may not be coded and a value thereof may be assumed as 1.

If the value of coded_sub_block_flag is 1 and thus it is determined that a non-zero coefficient exists in the current sub-block, the encoding apparatus may encode sig_coeff_flag having a binary value according to a reverse scanning order. The encoding apparatus may encode the 1-bit syntax element sig_coeff_flag for each transform coefficient according to the scanning order. If the value of the transform coefficient at the current scan position is not 0, the value of sig_coeff_flag may be 1. Here, in the case of a subblock including the last non-zero coefficient, sig_coeff_flag does not need to be encoded for the last non-zero coefficient, so the coding process for the sub-block may be omitted. Level information coding may be performed only when sig_coeff_flag is 1, and four syntax elements may be used in the level information encoding process. More specifically, each sig_coeff_flag[xC][yC] may indicate whether a level (value) of a corresponding transform coefficient at each transform coefficient position (xC, yC) in the current TB is non-zero. In an embodiment, the sig_coeff_flag may correspond to an example of a syntax element of a significant coefficient flag indicating whether a quantized transform coefficient is a non-zero significant coefficient.

A level value remaining after encoding for sig_coeff_flag may be derived as shown in the following equation. That is, the syntax element remAbsLevel indicating a level value to be encoded may be derived from the following equation.

$$remAbsLevel=|coeff|-1 \qquad \text{[Equation 1]}$$

Herein, coeff means an actual transform coefficient value.

Additionally, abs_level_gt1_flag may indicate whether or not remAbsLevel' of the corresponding scanning position (n) is greater than 1. For example, when the value of abs_level_gt1_flag is 0, the absolute value of the transform coefficient of the corresponding position may be 1. In addition, when the value of the abs_level_gt1_flag is 1, the remAbsLevel indicating the level value to be encoded later may be derived as shown in the following equation.

remAbsLevel=remAbsLevel−1    [Equation 2]

In addition, the least significant coefficient (LSB) value of remAbsLevel described in Equation 2 described above may be encoded as in Equation 3 below through par_level_flag.

par_level_flag=|coeff|& 1    [Equation 3]

Herein, par_level_flag[n] may indicate a parity of a transform coefficient level (value) at a scanning position n.

A transform coefficient level value remAbsLevel that is to be encoded after performing par_level_flag encoding may be updated as shown below in the following equation.

remAbsLevel=remAbsLevel>>1    [Equation 4]

abs_level_gt3_flag may indicate whether or not remAbsLevel' of the corresponding scanning position (n) is greater than 3. Encoding for abs_remainder may be performed only in a case where rem_abs_gt3_flag is equal to 1. A relationship between the actual transform coefficient value coeff and each syntax element may be as shown below in the following equation.

|coeff|=sig_coeff_flag+abs_level_gt1_flag+par_level_flag+2*(abs_level_gt3_flag+abs_remainder)    [Equation 5]

Additionally, the following table indicates examples related to the above-described Equation 5.

TABLE 7

| \|coeff\| | sig_coeff_flag | abs_level_gt1_flag | par_level_flag | abs_level_gt3_flag | abs_remainder |
|---|---|---|---|---|---|
| 0 | 0 | | | | |
| 1 | 1 | 0 | | | |
| 2 | 1 | 1 | 0 | | |
| 3 | 1 | 1 | 1 | 0 | |
| 4 | 1 | 1 | 0 | 1 | 0 |
| 5 | 1 | 1 | 1 | 1 | 0 |
| 6 | 1 | 1 | 0 | 1 | 1 |
| 7 | 1 | 1 | 1 | 1 | 1 |
| 8 | 1 | 1 | 0 | 1 | 2 |
| 9 | 1 | 1 | 1 | 1 | 2 |
| 10 | 1 | 1 | 0 | 1 | 3 |
| 11 | 1 | 1 | 1 | 1 | 3 |
| ... | ... | ... | ... | ... | |

Herein, |coeff| indicates a transform coefficient level (value) and may also be indicates as an AbsLevel for a transform coefficient. Additionally, a sign of each coefficient may be encoded by using coeff_sign_flag, which is a 1-bit symbol.

Meanwhile, as an example different from that in the aforementioned embodiment of transmitting the syntax elements, a scheme of coding different residuals according to whether a transform skip is applied for residual coding, that is, an embodiment of transmitting different residual syntax elements according to whether the transform skip is applied may be proposed.

The syntax elements for residual coding according to the aforementioned example may be as shown in the following tables.

TABLE 8

| | Descriptor |
|---|---|
| transform unit( x0, y0, tbWidth, tbHeight, treeType, subTuIndex, chType ) { | |
|     transform_skip_flag[ x0 ][ y0 ][ 0 ] | ae(v) |
|     if( !transform skip flag[ x0 ][ y0 ][ 0 ] \| \| slice ts residual coding disabled flag ) | |
|         residual coding( x0, y0, Log2( tbWidth ) Log2( tbHeight ), 0 ) | |
|     else | |
|         residual ts coding( x0, y0, Log2( tbWidth ), Log2( tbHeight ), 0 ) | |
| } | |
| if( tu cbf cb[ xC ][ yC ] && treeType != DUAL TREE LUMA ) { | |
|     if( sps_transform_skip_enabled_flag && !BdpcmFlag[ x0 ][ y0 ][ 1 ] && | |
|         wC <= MaxTsSize && hC <= MaxTsSize && !cu sbt flag ) | |
|         transform_skip_flag[ xC ][ yC ][ 1 ] | ae(v) |
|     if(! transform skip flag[ xC ][ yC ][ 1 ] \| \| slice ts residual coding disabled flag ) | |
|         residual coding( xC, yC, Log2( wC ), Log2( hC ), 1 ) | |
|     else | |
|         residual ts coding( xC, yC, Log2( wC ), Log2( hC ), 1 ) | |
| } | |
| if( tu_cbf_cr[xC][yC] && treeType != DUAL_TREE_LUMA && | |
|     !( tu_cbf_cb[ xC ][ yC ] && tu_joint_cbcr_residual_flag[ xC ][ yC ] ) ) { | |
|     if( sps_transform_skip_enabled_flag && !BdpcmFlag[ x0 ][ y0 ][ 2 ] && | |
|         wC <= MaxTsSize && hC <= MaxTsSize && !cu_sbt_flag ) | |
|         transform_skip_flag[ xC ][ yC ][ 2 ] | ae(v) |
|     if( !transform skip flag{ xC ][ yC ][ 2 ] \| \| slice ts residual coding disabled flag ) | |
|         residual coding( xC, yC, Log2( wC ), Log2( hC ), 2 ) | |
|     else | |
|         residual ts coding( xC, yC, Log2f wC ), Log2( hC ) 2 ) | |
|     } | |
| } | |

TABLE 9

| | Descriptor |
|---|---|
| residual coding( x0, y0, log2TbWidth, log2TbHeight cIdx ) { | |
|   if( sps_mts_enabled_flag && cu_sbt_flag && cIdx = = 0 && | |
|     log2TbWidth = = 5 && log2TbHeight < 6 ) | |
|     log2ZoTbWidth = 4 | |
|   else | |
|     log2ZoTbWidth = Min( log2TbWidth, 5 ) | |
|   if( sps_mts_enabled_flag && cu_sbt_flag && cIdx = = 0 && | |
|     log2TbWidth < 6 && log2TbHeight = = 5 ) | |
|     log2ZoTbHeight = 4 | |
|   else | |
|     log2ZoTbHeight = Min( log2TbHeight, 5 ) | |
|   if( log2TbWidth > 0 ) | |
|     last_sig_coeff_x_prefix | ae(v) |
|   if( log2TbHeight > 0 ) | |
|     last_sig_coeff_y_prefix | ae(v) |
|   if( last_sig_coeff_x_prefix > 3 ) | |
|     last_sig_coeff_x_suffix | ae(v) |
|   if( last_sig_coeff_y_prefix > 3 ) | |
|     last_sig_coeff_y_suffix | ae(v) |
|   log2TbWidth = log2ZoTbWidth | |
|   log2TbHeight = log2ZoTbHeight | |
|   remBinsPass1 = ( ( 1 << (log2TbWidth + log2TbHeight ) ) * 7 ) >> 2 | |
|   log2SbW = ( Min( log2TbWidth, log2TbHeight ) < 2 ? 1 : 2 ) | |
|   log2SbH = log2SbW | |
|   if( log2TbWidth + log2TbHeight > 3 ) | |
|     if(log2TbWidth < 2 ) { | |
|       log2SbW = log2TbWidth | |
|       log2SbH = 4 − log2SbW | |
|     } else if( log2TbHeight < 2 ) { | |
|       log2SbH = log2TbHeight | |
|       log2SbW = 4 − log2SbH | |
|     } | |
|   numSbCoeff = 1 << ( log2SbW + log2SbH ) | |
|   lastScanPos = numSbCoeff | |
|   lastSubBlock = ( 1 << ( log2TbWidth + log2TbHeight − ( log2SbW + log2SbH ) ) ) − 1 | |
|   do { | |
|     if( lastScanPos = = 0 ) { | |
|       lastScanPos = numSbCoeff | |
|       lastSubBlock− − | |
|     } | |
|     lastScanPos− − | |
|     xS = DiagScanOrder log2TbWidth − log2SbW ][ log2TbHeight − log2SbH ] [ lastSubBlock ][ 0 ] | |
|     yS = DiagScanOrder log2TbWidth − log2SbW ][ log2TbHeight − log2SbH ] [ lastSubBlock ][ 1 ] | |
|     xC = ( xS << log2SbW ) + DiagScanOrder[ log2SbW ][ log2SbH ][ lastScanPos ][ 0 ] | |
|     yC = ( yS << log2SbH ) + DiagScanOrder[ log2SbW ][ log2SbH ][ lastScanPos ][ 1 ] | |
|   } while ( xC != LastSignificantCoeffX ) | | ( yC != LastSignificantCoeffY ) ) | |
|   if( lastSubBlock = = 0 && log2TbWidth >= 2 && log2TbHeight >= 2 && | |
|     !transform skip flag[ x0 ][ y0 ][ cIdx ] && lastScanPos > 0 ) | |
|     LfnstDcOnly = 0 | |
|   if( ( lastSubBlock > 0 && log2TbWidth >= 2 && log2TbHeight >= 2 ) | | | |
|     (lastScanPos > 7 && (log2TbWidth = = 2 | | log2TbWidth = = 3 ) && | |
|     log2TbWidth = = log2TbHeight ) ) | |
|     LfnstZeroOutSigCoeffFlag = 0 | |
|   if( ( lastSubBlock > 0 | | lastScanPos > 0 ) && cIdx = = 0 ) | |
|     MtsDcOnly = 0 | |
|   QState = 0 | |
|   for( i = lastSubBlock; i >= 0; i− − ) { | |
|     startQStateSb = QState | |
|     xS = DiagScanOrder[ log2TbWidth − log2SbW ][ log2TbHeight − log2SbH ] [ i ][ 0 ] | |
|     yS = DiagScanOrder[ log2TbWidth − log2SbW ][ log2TbHeight − log2SbH ] [ i ][ 1 ] | |
|     inferSbDcSigCoeffFlag = 0 | |
|     if( i < lastSubBlock && i > 0 ) { | |
|       coded_sub_block_flag[ xS ][ yS ] | ae(v) |
|       inferSbDcSigCoeffFlag = 1 | |
|     } | |
|     if( coded sub block flag[ xS ][ yS ] && ( xS > 3 | | yS > 3 ) && cIdx = = 0 ) | |
|       MtsZeroOutSigCoeffFlag = 0 | |
|     firstSigScanPosSb = numSbCoeff | |
|     lastSigScanPosSb = −1 | |
|     firstPosMode0 = ( i = = lastSubBlock ? lastScanPos : numSbCoeff − 1 ) | |
|     firstPosMode1 = firstPosMode0 | |

TABLE 9-continued

| | Descriptor |
|---|---|
| ```
        for( n = firstPosMode0; n >= 0 && remBinsPass1 >= 4; n- - ) {
          xC = ( xS << log2SbW ) + DiagScanOrder[ log2SbW ][ log2SbH ][ n ][ 0 ]
          yC = ( yS << log2SbH ) + DiagScanOrder[ log2SbW ][ log2SbH ][ n ][ 1 ]
          if( coded_sub_block_flag[ xS ][ yS ] && ( n > 0 | | InferSbDcSigCoeffFlag) &&
            ( xC != LastSignificantCoeffX | | yC != LastSignificantCoeffY ) ) {
            sig_coeff_flag[ xC ][ yC ]
            remBinsPass1- -
            if( sig coeff flag[ xC ][ yC] )
              inferSbDcSigCoeffFlag = 0
          }
          if( sig coeff flag[ xC ][ yC ] ) {
            abs level gtx flag[ n ][ 0 ]
            remBinsPass1- -
            if( abs level gtx flag[ n ][ 0 ] ) {
              par_level_flag[ n ]
              remBinsPass1- -
              abs_level_gtx_flag[ n ][ 1 ]
              remBinsPass1- -
            }
            if( lastSigScanPosSb = = −1 )
              lastSigScanPosSb = n
            firstSigScanPosSb = n
          }
          AbsLevelPass1[ xC ][ yC ] = sig_coeff_flag[ xC ][ yC ] + par_level_flag[ n ] +
                       abs level gtx flag[ n ][ 0 ] + 2 * abs level gtx flag[ n ][ 1 ]
          if( ph dep quant enabled flag )
            QState = QStateTransTable[ QState ][ AbsLevelPass1[ xC ][ yC ] & 1 ]
          firstPosMode1 = n − 1
        }
        for( n = firstPosMode0; n > firstPosMode1; n- - ) {
          xC = ( xS << log2SbW ) + DiagScanOrder[ log2SbW ][ log2SbH ][ n ][ 0 ]
          yC = ( yS << log2SbH ) + DiagScanOrder[ log2SbW ][ log2SbH ][ n ][ 1 ]
          iff abs level gtx flag[ n ][ 1 ] )
            abs_remainder[ n ]
          AbsLevel[ xC ][ yC ] = AbsLevelPass1[ xC ][ yC ] + 2 * abs remainder[ n ]
        }
        for( n = firstPosMode1; n >= 0; n- - ) {
          xC = ( xS << log2SbW ) + DiagScanOrder[ log2SbW ][ log2SbH ][ n ][ 0 ]
          yC = ( yS << log2SbH ) + DiagScanOrder[ log2SbW ][ log2SbH ][ n ][ 1 ]
          if( coded sub block flag[ xS ][ yS ] )
            dec_abs_level[ n ]
          if( AbsLevel[ xC ][ yC ] > 0 ) {
            if( lastSigScanPosSb = = −1 )
              lastSigScanPosSb = n
            firstSigScanPosSb = n
          }
          if( ph_dep_quant_enabled_flag )
            QState = QStateTransTable[ QState ][ AbsLevel[ xC ][ yC ] & 1 ]
        }
        if( ph_dep_quant_enabled_flag | | !pic_sign_data_hiding_enabled_flag )
          signHidden = 0
        else
          signHidden = ( lastSigScanPosSb − firstSigScanPosSb > 3 ? 1 : 0 )
        for( n = numSbCoeff− 1; n >= 0; n- - )
          xC = ( xS << log2SbW ) + DiagScanOrder[ log2SbW ][ log2SbH ][ n ][ 0 ]
          yC = ( yS << log2SbH ) + DiagScanOrder[ log2SbW ][ log2SbH ][ n ][ 1 ]
          if( (AbsLevel[ xC ][ yC ] > 0 ) &&
            ( !signHidden | | ( n != firstSigScanPosSb ) ) )
            coeff_sign_flag[ n ]
        }
        if( ph dep quant enabled flag ) {
          QState = startQStateSb
          for( n = numSbCoeff − 1; n >= 0; n- - )
            xC = ( xS << log2SbW ) + DiagScanOrder] log2SbW ][ log2SbH ][ n ][ 0 ]
            yC = ( yS << log2SbH ) + DiagScanOrder] log2SbW ][ log2SbH ][ n ][ 1 ]
            if( AbsLevel[ xC ][ yC ] > 0 )
              TransCoeffLevel[ x0 ][ y0 ][ cIdx ][ xC ][ yC ] =
                ( 2 * AbsLevel[ xC ][ yC ] − ( QState > 1 ? 1 : 0 ) ) *
                ( 1 − 2 * coeff sign flag[ n ] )
            QState = QStateTransTable[ QState ][ AbsLevel[ xC ][ yC ] & 1 ]
        } else {
          sumAbsLevel = 0
          for( n = numSbCoeff− 1; n >= 0; n- - ) {
            xC = ( xS << log2SbW ) + DiagScanOrder[ log2SbW ][ log2SbH ][ n ][ 0 ]
            yC = ( yS << log2SbH ) + DiagScanOrder[ log2SbW ][ log2SbH ][ n ][ 1 ]
            if AbsLevel[ xC ][ yC ] > 0 ) {
              TransCoeffLevel[ x0 ][ y0 ][ cIdx ][ xC ][ yC ] =
``` | ae(v)<br><br><br><br><br><br>ae(v)<br><br>ae(v)<br>ae(v)<br><br><br><br><br><br><br><br><br>ae(v)<br><br><br><br><br>ae(v)<br><br><br><br><br><br><br><br><br><br><br>ae(v) |

TABLE 9-continued

| | Descriptor |
|---|---|
| ```
          AbsLevel[ xC ][ yC ] * ( 1 − 2 * coeff sign flag[ n ] )
        if( signHidden ) {
          sumAbsLevel += AbsLevel[ xC ][ yC ]
          if( ( n = = firstSigScanPosSb ) && ( sumAbsLevel % 2 ) = = 1 ) )
            TransCoeffLevel[ x0 ][ y0 ][ cIdx ][ xC ][ yC ] =
                −TransCoeffLevels[ x0 ][ y0 ][ cIdx ][ xC ][ yC ]
        }
      }
    }
  }
}
``` | |

TABLE 10

| | Descriptor |
|---|---|
| ```
residual_ts_coding( x0, y0, log2TbWidth, log2TbHeight, cIdx ) {
  log2SbW = (Min( log2TbWidth, log2TbHeight ) < 2 ? 1 : 2 )
  log2SbH = log2SbW
  if log2TbWidth+ log2TbHeight > 3 )
    if( log2TbWidth < 2 ) {
      log2SbW = log2TbWidth
      log2SbH = 4 − log2SbW
    } else if( log2TbHeight < 2 ) {
      log2SbH = log2TbHeight
      log2SbW = 4 − log2SbH
    }
  numSbCoef = 1 << (log2SbW + log2SbH )
  lastSubBlock = ( 1 << ( log2TbWidth + log2TbHeight − ( log2SbW + log2SbH ) ) ) −
1
  inferSbCbf = 1
  RemCcbs = (( 1 << ( log2TbWidth + log2TbHeight ) ) * 7 ) >> 2
  for( i =0; i <= lastSubBlock; i++ ) {
    xS = DiagScanOrder[ log2TbWidth − log2SbW ][ log2TbHeight − log2SbH ][ i ][ 0
]
    yS = DiagScanOrder[ log2TbWidth − log2SbW ][ log2TbHeight − log2SbH ][ i ][ 1
]
    if( i != lastSubBlock | | !inferSbCbf )
      coded_sub_block_flag[ xS ][ yS ]
    if( coded_sub_block_flag[ xS ][ yS ] && i < lastSubBlock )
      inferSbCbf = 0
    /* First scan pass */
    inferSbSigCoeFlag = 1
    lastScanPosPass1 = −1
    for( n = 0; n <= numSbCoef − 1 && RemCcbs >= 4: n++ ) {
      xC = ( xS << log2SbW ) + DiagScanOrder[ log2SbW ][ log2SbH ][ n ][ 0 ]
      yC = ( yS << log2SbH ) + DiagScanOrder[ log2SbW ][ log2SbH ][ n ][ 1 ]
      if( coded_sub_block_flag[ xS ][ yS ] &&
        (n != numSbCoeff − 1 | | !inferSbSigCoeffFlag ) ) {
        sig_coeff_flag[ xC ][ yC ]
        RemCcbs− −
        if( sig coef[ flag[ xC ][ yC ] )
          inferSbSigCoeffFlag = 0
      }
      CoefSignLevel[ xC ][ yC ] = 0
      if( sig coeff flag [xC ][ yC ] {
        coeff_sign_flag[ n ]
        RemCcbs− −
        CoeffSinLevel[ xC ][ yC ] = ( coeff sign flag n ] > 0 ? −1 : 1 )
        abs_level_gtx_flag[ n ][ 0 ]
        RemCcbs− −
        if( abs level gtx flag[ n ][ 0 ] ) {
          par_level_flag[ n ]
          RemCcbs− −
        }
      }
      AbsLevelPass1[ xC ][ yC ] =
        sig coeff flag[ xC ][ yC ] + par level flag[ n ] + abs level gtx flag[ n ][ 0 ]
      lastScanPosPass1 = n
    }
    /* Greater than X scan pass (numGtXFlags=5) */
    lastScanPosPass2 = −1
    forf n = 0; n <= numSbCoeff − 1 && RemCcbs >= 4; n++ ) {
      xC = ( xS << log2SbW ) + DiagScanOrder[ log2SbW ][ log2SbH ][ n ][ 0 ]
      yC = ( yS << log2SbH ) + DiagScanOrder[ log2SbW ][ log2SbH ][ n ][ 1 ]
``` | ae(v)<br><br><br><br><br><br><br><br><br><br><br><br><br>ae(v)<br><br><br><br>ae(v)<br><br><br><br>ae(v) |

TABLE 10-continued

Descriptor

```
        AbsLevelPass2[ xC ][ yC ] = AbsLevelPass1[ xC ][ yC ]
        for( j = 1; j < 5; j++ ) {
            if( abs_level_gtx_flag[ n ][ j - 1 ] ) {
                abs_evel_gtx_flag[ n ][ i ]                                              ae(v)
                RemCcbs- -
            }
            AbsLevelPass2[ xC ][ yC ] + = 2 * abs_level_gtx_flag[ n ][ j ]
        }
        lastScanPosPass2 = n
    }
    /* remainder scan pass */
    for( n = 0; n <= numSbCoeff - 1; n++ ) {
        xC = ( xS << log2SbW ) + DiagScanOrder[ log2SbW ][ log2SbH ][ n ][ 0 ]
        yC = ( yS << log2SbH ) + DiagScanOrder[ log2SbW ][ log2SbH ][ n ][1 ]
        if( ( n <= lastScanPosPass2 && AbsLevelPass2[ xC ][ yC ] >= 10 ) ||
            ( n > lastScanPosPass2 && n <= lastScanPosPass1 &&
                AbsLevelPass1 [ xC ][ yC ] >= 2 ) ||
            ( n > lastScanPosPass1 && coded_sub_block_flag[ xS ][ yS ] ) )
            abs_remainder[ n ]                                                           ae(v)
        if( n <= lastScanPosPass2 )
            AbsLevel[ xC ][ yC ] = AbsLevelPass2[ xC ][ yC ] + 2 * abs_remainder[ n ]
        else if( n <= lastScanPosPass1 )
            AbsLevel[ xC ][ yC ] = AbsLevelPass1[ xC ][ yC ] + 2 * abs_remainder[ n ]
        else { /* bypass */
            AbsLevel[ xC ][ yC ] = abs_remainder[ n ]
        if( abs_remainder[ n ] )
            coeff_sign_flag[ n ]                                                         ae(v)
        }
        if( BdpcmFlag[ x0 ][ y0 ][ cIdx ] = = 0 && n <= lastScanPosPass1 ) {
            absLeftCoeff = xC > 0 ? AbsLevel[ xC - 1 ][ yC ] ) : 0
            absAboveCoef = yC > 0 ? AbsLevel[ xC ][ yC - 1 ] ) : 0
            predCoeff = Max( absLeftCoeff, absAboveCoeff )
            if( AbsLevel[ xC ][ yC ] = = 1 && predCoeff > 0 )
                AbsLevel[ xC ][ yC ] = predCoeff
            else if( AbsLevel[ xC ][ yC ] > 0 && AbsLevel[ xC ][ yC ] <= predCoeff )
                AbsLevel[ xC ][ yC ]- -
        }
    }
    TransCoeffLevel[ x0 ][ y0 ][ cIdx ][ xC ][ yC ] = ( 1 - 2 * coeff_sign_flag[ n ] ) *
                    AbsLevel[ xC ][ yC ]
    }
}
```

According to the present embodiment, as shown in Table 8, residual coding may be divided according to a value of the syntax element transform_skip_flag of the transform skip flag. That is, a different syntax element may be used for residual coding based on the value of the transform skip flag (based on whether the transform is skipped). Residual coding used when the transform skip is not applied (that is, when the transform is applied) may be called regular residual coding (RRC), and residual coding used when the transform skip is not applied (that is, when the transform is not applied) may be called transform skip residual coding (TSRC). Table 9 above may show a syntax element of residual coding when a value of transform skip flag is 0, that is, when the transform is applied, and Table 20 above may show a syntax element of residual coding when the value of transform_skip_flag is 1, that is, when the transform is not applied.

Specifically, for example, the transform skip flag indicating whether to skip the transform of the transform block may be parsed, and whether the transform skip flag is 1 may be determined. If the value of the transform skip flag is 1, as shown in Table 10, syntax elements sig_coeff_flag, coeff_sign_flag, abs_level_gtx_flag, and/or abs_remainder for a residual coefficient of the transform block may be parsed, and the residual coefficient may be derived based on the syntax elements. In this case, the syntax elements may be sequentially parsed, and a parsing order may be changed. In addition, the abs_level_gtx_flag may represent abs_level_gt1_flag, abs_level_gt3_flag, abs_level_gt5_flag, abs_level_gt7_flag, and/or abs_level_gt9_flag. For example, abs_level_gtx_flag[n][j] may be a flag indicating whether an absolute value of a transform coefficient level (or a value obtained by shifting the transform coefficient level to the right by 1) at a scanning position n is greater than (j<<1)+1. The condition (j<<1)+1 may be optionally replaced with a specific threshold such as a first threshold, a second threshold, or the like.

In addition, if the value of the transform skip flag is 0, as shown in Table 9, syntax elements for the residual coefficient of the transform block, i.e., sig_coeff_flag, abs_level_gtx_flag, par_level_flag, abs_remainder, dec_abs_level, and coeff_sign_flag, may be parsed, and the residual coefficient may be derived based on the syntax elements. In this case, the syntax elements may be sequentially parsed, and a parsing order may be changed. In addition, the abs_level_gtx_flag may represent abs_level_gt1_flag and/or abs_level_gt3_flag. For example, abs_level_gtx_flag[n][0] may be an example of a first transform coefficient level flag abs_level_gt1_flag, and abs_level_gtx_flag[n][1] may be an example of a second transform coefficient level flag abs_level_gt3_flag.

As described above, comparing syntax elements for a residual coefficient when the transform is not applied and syntax elements for a residual coefficient when the transform is applied, the syntax element par_level_flag may not be encoded and decoded. When the residual coefficient has a great level value, there is a high possibility that information is transmitted in a duplicated manner when syntax elements such as sig_coeff_flag, par_level_flag, abs_level_gtx_flag, or the like for all residual coefficients are coded, compared to transmission in which the level value of the residual coefficient is directly subjected to binarization. Therefore, in the present embodiment, coding efficiency can be improved by omitting a syntax element par_level_flag when applying a transform skip having a possibility that the level value of the residual coefficient is high.

Meanwhile, CABAC provides high performance, but disadvantageously has poor throughput performance. This is caused by a regular coding engine of the CABAC. Regular encoding (i.e., coding through the regular coding engine of the CABAC) shows high data dependence since it uses a probability state and range updated through coding of a previous bin, and it may take a lot of time to read a probability interval and determine a current state. The throughput problem of the CABAC may be solved by limiting the number of context-coded bins. For example, as shown in Table 1, Table 6, Table 9, or Table 10 described above, a sum of bins used to express sig_coeff_flag, abs_level_gt1_flag, par_level_flag, and abs_level_gt3_flag may be limited to the number of bins depending on a size of a corresponding block. For example, if the corresponding block is a block of a 4×4 size, the sum of bins for the sig_coeff_flag, abs_level_gt1_flag, par_level_flag, and abs_level_gt3_flag may be limited to 32, and if the corresponding block is a block of a 2×2 size, the sum of bins for the sig_coeff_flag, abs_level_gt1_flag, par_level_flag, abs_level_gt3_flag may be limited to 8. The limited number of bins may be represented by remBinsPass1.

In this case, if all context-coded bins of which the number is limited are used when a context element is coded, the encoding apparatus may binarize the remaining coefficients through a method of binarizing the coefficient as described below, instead of using the CABAC, and may perform bypass encoding. In other words, for example, if the number of context-coded bins which are coded for 4×4 CG is 32, or if the number of context-coded bins which are coded for 2×2 CG is 8, sig_coeff_flag, abs_level_gt1_flag, par_level_flag, and abs_level_gt3_flag which are coded with the context-coded bin may no longer be encoded, and may be encoded directly to dec_abs_level as shown in Table 8 described below.

TABLE 11

| |coeff| | dec_abs_level |
|---|---|
| 0 | 0 |
| 1 | 1 |
| 2 | 1 |
| 3 | 1 |
| 4 | 1 |
| 5 | 1 |
| 6 | 1 |
| 7 | 1 |
| 8 | 1 |
| 9 | 1 |
| 10 | 1 |
| 11 | 1 |
| ... | ... |

A value |coeff| may be derived based on dec_abs_level. In this case, a transform coefficient value, i.e., |coeff|, may be derived as shown in the following equation.

$$|coeff|=dec\_abs\_level \quad \text{[Equation 6]}$$

In addition, the coeff_sign_flag may indicate a sign of a transform coefficient level at a corresponding scanning position n. That is, the coeff_sign_flag may indicate the sign of the transform coefficient at the corresponding scanning position n. In addition, the mts_idx may indicate transform kernels applied in a horizontal direction and a vertical direction to residual samples in a current transform block.

Figure 5:
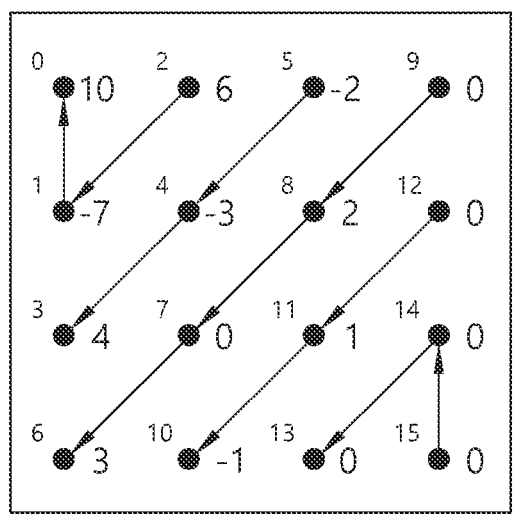
FIG. 5 is a diagram showing exemplary transform coefficients within a 4×4 block.

FIG. 5 shows an example of transform coefficients in a 4×4 block.

The 4×4 block of FIG. 5 represents an example of quantized coefficients. The block of FIG. 5 may be a 4×4 transform block, or a 4×4 sub-block of an 8×8, 16×16, 32×32, or 64×64 transform block. The 4×4 block of FIG. 5 may represent a luma block or a chroma block.

For example, an encoding result for inversely diagonal scanned coefficients of FIG. 5 may be as shown in the following table.

TABLE 12

| scan_pos | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| coefficients | 0 | 0 | 0 | 0 | 1 | −1 | 0 | 2 | 0 | 3 | −2 | −3 | 4 | 6 | −7 | 10 |
| sig_coeff_flag | 0 | 0 | 0 | 0 | 1 | 1 | 0 | 1 | 0 | 1 | 1 | 1 | 1 | 1 | | |
| abs_level_gt1_flag | | | | | | 0 | 0 | | 1 | | 1 | 1 | 1 | 1 | | |
| par_level_flag | | | | | | 0 | | 1 | 0 | | 1 | 0 | 0 | | | |
| abs_level_gt3_flag | | | | | | | | | | | | | 1 | 1 | | |
| abs_remainder | | | | | | | | | | | | | 0 | 1 | | |
| dec_abs_level | | | | | | | | | | | | | | | 1 | 10 |
| coeff_sign_flag | 0 | 0 | 0 | 0 | 0 | 1 | 0 | 0 | 0 | 0 | 1 | 1 | 0 | 0 | 1 | 0 |

In Table 12 above, scan_pos indicates a position of coefficients based on an inverse diagonal scan. scan_pos 15 may be a transform coefficient to be scanned first in a 4×4 block, i.e., at a bottom-right corner, and scan_pos 0 may be a transform coefficient to be scanned last, i.e., at a top-left corner. Meanwhile, in an embodiment, the scan_pos may be referred to as a scan position. For example, the scan_pos 0 will be referred to as a scan position 0.

Meanwhile, as described above, when an input signal is not a binary value but a syntax element, the encoding apparatus may transform the input signal into a binary value by binarizing a value of the input signal. In addition, the decoding apparatus may decode the syntax element to derive a binarized value (e.g., a binarized bin) of the syntax element, and may de-binarize the binarized value to derive a value of the syntax element. The binarization process may be performed as a truncated rice (TR) binarization process, a k-th order Exp-Golomb (EGk) binarization process, a limited k-th order Exp-Golomb (limited EGk), a fixed-length (FL) binarization process, or the like. In addition, the de-binarization process may represent a process performed based on the TR binarization process, the EGk binarization process, or the FL binarization process to derive the value of the syntax element.

For example, the TR binarization process may be performed as follows.

An input of the TR binarization process may be cMax and cRiceParam for a syntax element and a request for TR binarization. In addition, an output of the TR binarization process may be TR binarization for symbolVal which is a value corresponding to a bin string.

Specifically, for example, in the presence of a suffix bin string for a syntax element, a TR bin string for the syntax element may be concatenation of a prefix bin string and the suffix bin string, and in the absence of the suffix bin string, the TR bin string for the syntax element may be the prefix bin string. For example, the prefix bin string may be derived as described below.

A prefix value of the symbolVal for the syntax element may be derived as shown in the following equation.

prefixVal=symbolVal>>cRiceParam    [Equation 7]

Herein, prefixVal may denote a prefix value of the symbolVal. A prefix (i.e., a prefix bin string) of the TR bin string of the syntax element may be derived as described below.

For example, if the prefixVal is less than cMax>>cRiceParam, the prefix bin string may be a bit string of length prefixVal+1, indexed by binIdx. That is, if the prefixVal is less than cMax>>cRiceParam, the prefix bin string may be a bit string of which the number of bits is prefixVal+1, indicated by binIdx. A bin for binIdx less than prefixVal may be equal to 1. In addition, a bin for the same binIdx as the prefixVal may be equal to 0.

For example, a bin string derived through unary binarization for the prefixVal may be as shown in the following table.

TABLE 13

| prefixVal | Bin string | | | | | |
|---|---|---|---|---|---|---|
| 0 | 0 | | | | | |
| 1 | 1 | 0 | | | | |
| 2 | 1 | 1 | 0 | | | |
| 3 | 1 | 1 | 1 | 0 | | |
| 4 | 1 | 1 | 1 | 1 | 0 | |
| 5 | 1 | 1 | 1 | 1 | 1 | 0 |
| ... | | | | | | |
| binIdx | 0 | 1 | 2 | 3 | 4 | 5 |

Meanwhile, if the prefixVal is not less than cMax>>cRiceParam, the prefix bin string may be a bit string in which a length is cMax>>cRiceParam and all bits are 1.

In addition, if cMax is greater than symbolVal and if cRiceParam is greater than 0, a bin suffix bin string of a TR bin string may be present. For example, the suffix bin string may be derived as described below.

A suffix value of the symbolVal for the syntax element may be derived as shown in the following equation.

suffixVal=symbolVal−((prefixVal)<<cRiceParam)    [Equation 8]

Herein, suffixVal may denote a suffix value of the symbolVal.

A suffix of a TR bin string (i.e., a suffix bin string) may be derived based on an FL binarization process for suffixVal of which a value cMax is (1<<cRiceParam)−1.

Meanwhile, if a value of an input parameter, i.e., cRiceParam, is 0, the TR binarization may be precisely truncated unary binarization, and may always use the same value cMax as a possible maximum value of a syntax element to be decoded.

In addition, for example, the EGk binarization process may be performed as follows. A syntax element coded with ue(v) may be a syntax element subjected to Exp-Golomb coding.

For example, a 0-th order Exp-Golomb (EG0) binarization process may be performed as follows.

A parsing process for the syntax element may begin with reading a bit including a first non-zero bit starting at a current position of a bitstream and counting the number of leading bits equal to 0. The process may be represented as shown in the following table.

TABLE 14 leadingZeroBits = −1
for( b = 0; !b; leadingZeroBits++ )
    b = read_bits( 1 )

In addition, a variable 'codeNum' may be derived as shown in the following equation.

codeNum=$2^{leadingZeroBits}$−1+read_bits(leadingZeroBits)    [Equation 9]

Herein, a value returned from read bits(leadingZeroBits), that is, a value indicated by read bits(leadingZeroBits), may be interpreted as binary representation of an unsigned integer for a most significant bit recorded first.

A structure of an Exp-Golomb code in which a bit string is divided into a "prefix" bit and a "suffix" bit may be represented as shown in the following table.

TABLE 15

| Bit string form | Range of codeNum |
|---|---|
| 1 | 0 |
| 0 1 $x_0$ | 1 ... 2 |
| 0 0 1 $x_1$ $x_0$ | 3 ... 6 |
| 0 0 0 1 $x_2$ $x_1$ $x_0$ | 7 ... 14 |
| 0 0 0 0 1 $x_3$ $x_2$ $x_1$ $x_0$ | 15 ... 30 |
| 0 0 0 0 0 1 $x_4$ $x_3$ $x_2$ $x_1$ $x_0$ | 31 ... 62 |
| ... | ... |

The "prefix" bit may be a bit parsed as described above to calculate leadingZeroBits, and may be represented by 0 or 1 of a bit string in Table 15. That is, the bit string disclosed by 0 or 1 in Table 15 above may represent a prefix bit string. The "suffix" bit may be a bit parsed in the computation of codeNum, and may be represented by xi in Table 15 above. That is, a bit string disclosed as xi in Table 15 above may represent a suffix bit string. Herein, i may be a value in the range of LeadingZeroBits−1. In addition, each xi may be equal to 0 or 1.

A bit string assigned to the codeNum may be as shown in the following table.

TABLE 16

| Bit string | codeNum |
|---|---|
| 1 | 0 |
| 0 1 0 | 1 |
| 0 1 1 | 2 |
| 0 0 1 0 0 | 3 |
| 0 0 1 0 1 | 4 |
| 0 0 1 1 0 | 5 |
| 0 0 1 1 1 | 6 |
| 0 0 0 1 0 0 0 | 7 |
| 0 0 0 1 0 0 1 | 8 |
| 0 0 0 1 0 1 0 | 9 |
| ... | ... |

If a descriptor of the syntax element is ue(v), that is, if the syntax element is coded with ue(v), a value of the syntax element may be equal to codeNum.

In addition, for example, the EGk binarization process may be performed as follows.

An input of the EGk binarization process may be a request for EGk binarization. In addition, the output of the EGk binarization process may be EGk binarization for symbolVal, i.e., a value corresponding to a bin string.

A bit string of the EGk binarization process for symbolVal may be derived as follows.

TABLE 17

```
absV = Abs( symbolVal)
stopLoop = 0
do
    if( absV >= (1 << k ) ) {
        put( 1 )
        absV = absV - ( 1 << k )
        k++
    } else {
        put( 0 )
        while( k- - )
            put( ( absV >> k) & 1 )
        stopLoop = 1
    }
while( !stopLoop )
```

Referring to Table 17 above, a binary value X may be added to an end of a bin string through each call of put(X). Herein, X may be 0 or 1.

In addition, for example, the limited EGk binarization process may be performed as follows.

An input of the limited EGk binarization process may be a request for limited EGk binarization, a rice parameter riceParam, log 2TransformRange as a variable representing a binary logarithm of a maximum value, and maxPreExtLen as a variable representing a maximum prefix extension length. In addition, an output of the limited EGk binarization process may be limited EGk binarization for symbolVal as a value corresponding to an empty string.

A bit string of the limited EGk binarization process for the symbolVal may be derived as follows.

TABLE 18

```
codeValue = symbolVal >> riceParam
PrefixExtensionLength = 0
while( ( PrefixExtensionLength < maxPrefixExtensionLength) &&
    (codeValue > (( 2 << PrefixExtensionLength ) - 2 ))) {
    PrefixExtensionLength++
    put( 1 )
}
if( PrefixExtensionLength = = maxPrefixExtensionLength )
    escapeLength = log2TransformRange
else {
    escapeLength = PrefixExtensionLength + riceParam
    put( 0 )
}
symbolVal = symbolVal - ( ( ( 1 << PrefixExtensionLength) - 1) <<
riceParam )
while( (escapeLength- - ) > 0 )
    put( ( symbolVal >> escapeLength) & 1)
```

In addition, for example, the FL binarization process may be performed as follows.

An input of the FL binarization process may be a request for FL binarization and cMax for the syntax element. In addition, an output of the FL binarization process may be FL binarization for symbolVal as a value corresponding to a bin string.

FL binarization may be configured by using a bit string of which the number of bits has a fixed length of symbolVal. Herein, the fixed-length bit may be an unsigned integer bit string. That is, a bit string for symbolVal as a symbol value may be derived through FL binarization, and a bit length (i.e., the number of bits) of the bit string may be a fixed length.

For example, the fixed length may be derived as shown in the following equation.

$$\text{fixedLength} = \text{Ceil}(\text{Log } 2(c\text{Max}+1)) \quad \text{[Equation 10]}$$

Indexing of bins for FL binarization may be a method using a value which increases orderly from a most significant bit to a least significant bit. For example, a bin index related to the most significant bit may be binIdx=0.

Meanwhile, for example, a binarization process for a syntax element abs_remainder in the residual information may be performed as follows.

An input of the binarization process for the abs_remainder may be a request for binarization of a syntax element abs_remainder[n], a colour component cIdx, and a luma position (x0, y0). The luma position (x0, y0) may indicate a top-left sample of a current luma transform block based on the top-left luma sample of a picture.

An output of the binarization process for the abs_remainder may be binarization of the abs_remainder (i.e., a binarized bin string of the abs_remainder). Available bin strings for the abs_remainder may be derived through the binarization process.

First, lastAbsRemainder and lastRiceParam for abs_remainder[n] may be derived as follows. Herein, the lastAbsRemainder may denote a value of abs_remainder derived prior to the abs_remainder[n], and the lastRiceParam may denote a rice parameter cRiceParam for abs_remainder derived prior to the abs_remainder[n].

For example, if a process of deriving lastAbsRemainder and lastRiceParam for the abs_remainder[n] is first invoked for a current sub-block, that is, if a process of abs_remainder[n] for a transform coefficient of a first order on a scanning order is performed among transform coefficients of the current sub-block, both of the lastAbsRemainder and the lastRiceParam may be set to 0.

In addition, if not the above case, that is, if the process is not first invoked for the current sub-block, the lastAbsRemainder and the lastRiceParam may be set to be the same respectively as abs_remainder[n] and cRiceParam derived in the last invocation. That is, the lastAbsRemainder may be derived as the same value as abs_remainder[n] coded prior to abs_remainder[n] to be currently coded, and the lastRiceParam may be derived as the same value as cRiceParam for abs_remainder[n] coded prior to abs_remainder[n].

Thereafter, a rice parameter cRiceParam for abs_remainder[n] to be currently coded may be derived based on the lastAbsRemainder and the lastRiceParam. For example, the rice parameter cRiceParam for the abs_remainder[n] to be currently coded may be derived as shown in the following equation.

$$c\text{RiceParam}=\text{Min}(\text{lastRiceParam}+((\text{lastAbsRemainder}>(3*(1<<\text{lastRiceParam})))?1:0),3)$$

In addition, for example, cMax for abs_remainder[n] to be currently coded may be derived based on the rice parameter cRiceParam. The cMax may be derived as shown in the following equation.

$$c\text{Max}=6<<c\text{RiceParam} \quad \text{[Equation 12]}$$

Alternatively, for example, the rice parameter cRiceParam may be determined based on whether a transform skip is applied to a current block. That is, if a transform is not applied to a current TB including a current CG, in other words, if the transform skip is applied to the current TB including the current CG, the rice parameter cRiceParam may be derived to be 1. Alternatively, if the transform is applied to the current TB including the current CG, in other words, if the transform skip is not applied to the current TB including the current CG, the rice parameter cRiceParam for the abs_remainder[n] to be currently coded as described above may be derived to be the same value as cRiceParam for abs_remainder[n] previously coded.

Meanwhile, binarization for the abs_remainder, that is, a bin string for the abs_remainder, may be concatenation of a prefix bin string and a suffix bin string in the presence of the suffix bin string. In addition, in the absence of the suffix bin string, the bin string for the abs_remainder may be the prefix bin string.

For example, the prefix bin string may be derived as described below.

A prefix value prefixVal of the abs_remainder[n] may be derived as shown in the following equation.

prefixVal=Min($c$Max,abs_remainder[$n$])  [Equation 13]

A prefix of the bin string (i.e., a prefix bin string) of the abs_remainder[n] may be derived through a TR binarization process for the prefixVal, in which the cMax and the cRiceParam are used as an input.

If the prefix bin string is identical to a bit string in which all bits are 1 and a bit length is 6, a suffix bin string of the bin string of the abs_remainder[n] may exist, and may be derived as described below.

A suffix value suffixVal of the abs_remainder may be derived as shown in the following equation.

suffixVal=abs_remainder[$n$]$c$Max  [Equation 14]

A suffix bin string of the bin string of the abs_remainder may be derived through a limited EGk binarization process for the suffixVal in which k is set to cRiceParam+1, riceParam is set to cRiceParam, and log 2TransformRange is set to 15, and maxPreExtLen is set to 11.

Meanwhile, for example, a binarization process for a syntax element dec_abs_level in the residual information may be performed as follows.

An input of the binarization process for the dec_abs_level may be a request for binarization of a syntax element dec_abs_level[n], a colour component cIdx, a luma position (x0, y0), a current coefficient scan position (xC, yC), log 2TbWidth as a binary logarithm of a width of a transform block, and log 2TbHeight as a binary logarithm of a height of the transform block. The luma position (x0, y0) may indicate a top-left sample of a current luma transform block based on a top-left luma sample of a picture.

An output of the binarization process for the dec_abs_level may be binarization of the dec_abs_level (i.e., a binarized bin string of the dec_abs_level). Available bin strings for the dec_abs_level may be derived through the binarization process.

A rice parameter cRiceParam for dec_abs_level[n] may be derived through a rice parameter deriving process performed with an input of the colour component cIdx, the luma position (x0, y0), the current coefficient scan position (xC, yC), the log 2TbWidth as the binary logarithm of the width of the transform block, and the log 2TbHeight as the binary logarithm of the height of the transform block. The rice parameter deriving process will be described below in detail.

In addition, for example, cMax for the dec_abs_level[n] may be derived based on the rice parameter cRiceParam. The cMax may be derived as shown in the following table.

$c$Max=6<<$c$RiceParam  [Equation 15]

Meanwhile, binarization for the dec_abs_level[n], that is, a bin string for the dec_abs_level[n], may be concatenation of a prefix bin string and a suffix bin string in the presence of the suffix bin string. In addition, in the absence of the suffix bin string, the bin string for the dec_abs_level[n] may be the prefix bin string.

For example, the prefix bin string may be derived as described below.

A prefix value prefixVal of the dec_abs_level[n] may be derived as shown in the following equation.

prefixVal=Min($c$Max,dec_abs_level[$n$])  [Equation 16]

A prefix of the bin string (i.e., a prefix bin string) of the dec_abs_level[n] may be derived through a TR binarization process for the prefixVal, in which the cMax and the cRiceParam are used as an input.

If the prefix bin string is identical to a bit string in which all bits are 1 and a bit length is 6, a suffix bin string of the bin string of the dec_abs_level[n] may exist, and may be derived as described below.

The rice parameter deriving process for the dec_abs_level [n] may be as follows.

An input of the rice parameter deriving process may be a colour component index cIdx, a luma position (x0, y0), a current coefficient scan position (xC, yC), log 2TbWidth as a binary logarithm of a width of a transform block, and log 2TbHeight as a binary logarithm of a height of the transform block. The luma position (x0, y0) may indicate a top-left sample of a current luma transform block based on a top-left luma sample of a picture. In addition, an output of the rice parameter deriving process may be the rice parameter cRiceParam.

For example, a variable locSumAbs may be derived similarly to a pseudo code disclosed in the following table, based on given syntax elements sig_coeff_flag[x] [y] and an array AbsLevel[x] [y] for a transform block having the component index cIdx and the top-left luma position (x0, y0).

TABLE 19

```
locSumAbs = 0
if xC < (1 <<log2TbWidth) - 1) {
    locSumAbs += AbsLevel[ xC + 1 ][yC ] - sig_coeff_flag[ xC + 1 ][ yC ]
    if xC < (1 <<log2TbWidth) - 2)
        locSumAbs += AbsLevel[ xC + 2 ] [ yC ] - sig_coeff_flag[ xC + 2 ] [ yC ]
    if yC < (1 <<log2TbHeight) - 1)
        locSumAbs += AbsLevel[ xC + 1 ][ yC + 1 ] - sig_coeff_flag[ xC + 1 ][ yC +
1 ]
}
if( yC < (1 <<log2TbHeight) - 1) {
    locSumAbs +- AbsLevel[ xC ][ yC + 1 ] - sig_coeff_flag[ xC ][ yC + 1 ]
```

TABLE 19-continued

```
  if yC < (1 << log2TbHeight) − 2)
      locSumAbs + AbsLevelPass1 [ xC ][ yC+ 2 ] − sig coeff flag[ xC ][ yC + 2]
}
if( locSumAbs >31)
    locSumAbs = 31
```

The rice parameter cRiceParam may be derived as follows.

For example, the rice parameter cRiceParam may be derived based on the derived variable locSumAbs and variable s. The variable s may be set to Max(0, QState−1). That is, the variable s may be set to a maximum value between 0 and QState−1.

ZeroPos[n] and the rice parameter cRiceParam derived based on the variable locSumAbs and the variable s may be as shown in the following table.

TABLE 20

| s | locSumAbs | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|---|
|   | cRiceParam | 0 | 0 | 0 | 0 | 0 | 0 | 0 | 1 | 1 | 1 | 1 | 1 | 1 | 1 | 2 | 2 | 2 | 2 | 2 | 2 | 2 | 2 | 2 | 2 | 2 | 2 | 2 | 2 | 3 | 3 | 3 | 3 |
| 0 | ZeroPos n ] | 0 | 0 | 0 | 0 | 0 | 1 | 2 | 2 | 2 | 2 | 2 | 2 | 4 | 4 | 4 | 4 | 4 | 4 | 4 | 4 | 4 | 4 | 4 | 4 | 8 | 8 | 8 | 8 | 8 | 16 | 16 | 16 | 16 |
| 1 | ZeroPos n ] | 1 | 1 | 1 | 1 | 2 | 3 | 4 | 4 | 4 | 4 | 6 | 6 | 6 | 8 | 8 | 8 | 8 | 4 | 4 | 12 | 12 | 12 | 12 | 12 | 12 | 12 | 12 | 16 | 16 | 16 | 16 | 16 | 16 |
| 2 | ZeroPos n ] | 1 | 1 | 2 | 2 | 2 | 3 | 4 | 4 | 4 | 6 | 6 | 6 | 8 | 8 | 8 | 8 | 8 | 8 | 12 | 12 | 12 | 12 | 12 | 12 | 12 | 16 | 16 | 16 | 16 | 16 | 16 | 16 |

For example, referring to Table 20 above, if locSumAbs is less than or equal to 6, the cRiceParam may be set to 0. If the locSumAbs is greater than or equal to 7 and less than or equal to 13, the cRiceParam may be set to 1. If the locSumAbs is greater than or equal to 14 and less than or equal to 27, the cRiceParam may be set to 2. If the locSumAbs is greater than or equal to 28, the cRiceParam may be set to 3.

In addition, referring to Table 20 above, if the s is 0 and the locSumAbs is less than or equal to 4, the ZeroPos[n] may be set to 0. If the s is 0 and the locSumAbs is 5, the ZeroPos[n] may be set to 1. If the s is 0 and the locSumAbs is greater than or equal to 6 and less than or equal to 11, the ZeroPos[n] may be set to 2. If the s is 0 and the locSumAbs is greater than or equal to 12 and less than or equal to 22, the ZeroPos[n] may be set to 4. If the s is 0 and the locSumAbs is greater than or equal to 23 and less than or equal to 27, the ZeroPos[n] may be set to 8. If the s is 0 and the locSumAbs is greater than or equal to 28, the ZeroPos[n] may be set to 16. In addition, referring to Table 20 above, if the locSumAbs is less than or equal to 3, the ZeroPos[n] may be set to 1. If the s is 1 and the locSumAbs is 4, the ZeroPos[n] may be set to 2. If the s is 1 and the locSumAbs is 5, the ZeroPos[n] may be set to 3. If the s is 1 and the locSumAbs is greater than or equal to 6 and less than or equal to 8, the ZeroPos[n] may be set to 4. If the s is 1 and the locSumAbs is greater than or equal to 9 and less than or equal to 11, the ZeroPos[n] may be set to 6. If the s is 1 and the locSumAbs is greater than or equal to 12 and less than or equal to 15, the ZeroPos[n] may be set to 8. If the s is 1 and the locSumAbs is greater than or equal to 16 and less than or equal to 17, the ZeroPos[n] may be set to 4. If the s is 1 and the locSumAbs is greater than or equal to 18 and less than or equal to 25, the ZeroPos[n] may be set to 12. If the locSumAbs is greater than or equal to 26 and less than or equal to 31, the ZeroPos[n] may be set to 16. In addition, referring to Table 20 above, if the s is 2 and the locSumAbs is less than or equal to 1, the ZeroPos[n] may be set to 1. If the s is 2 and the locSumAbs is greater than or equal to 2 and less than or equal to 4, the ZeroPos[n] may be set to 2. If the s is 2 and the locSumAbs is 5, the ZeroPos[n] may be set to 3. If the s is 2 and the locSumAbs is greater than or equal to 6 and less than or equal to 8, the ZeroPos[n] may be set to 4. If the s is 2 and the locSumAbs is greater than or equal to 9 and less than or equal to 11, the ZeroPos[n] may be set to 6. If the s is 2 and the locSumAbs is greater than or equal to 12 and less than or equal to 17, the ZeroPos[n] may be set to 8. If the s is 2 and the locSumAbs is greater than or equal to 18 and less than or equal to 24, the ZeroPos[n] may be set to 12. If the s is 2 and the locSumAbs is greater than or equal to 25, the ZeroPos[n] may be set to 16.

A suffix value suffixVal of the dec_abs_level[n] may be derived as shown in the following equation.

$$suffixVal = dec\_abs\_level[n] - cMax \qquad [\text{Equation 17}]$$

A suffix bin string of the bin string of the dec_abs_level[n] may be derived through a limited EGk binarization process for the suffixVal in which k is set to cRiceParam+1, riceParam is set to cRiceParam, log 2TransformRange is set to 15, and maxPreExtLen is set to 11.

In addition, the present disclosure proposes a method of modifying content described below in the existing residual coding method so that statistics and signal characteristics of a transform skip level (i.e., a residual in a spatial domain) indicating a quantized prediction residual are adapted to residual coding.

Scanning order: For example, a scanning order for sub-blocks in a TB block and residual coefficients in the sub-blocks may be a diagonal scan order moving from bottom right to top left. That is, the scanning order for the sub-block in the TB block and the residual coefficient in the sub-block may be a diagonal scan order for scanning from bottom right to top left. Alternatively, for example, the scanning order for the sub-block in the TB block and the residual coefficient in the sub-block may be a diagonal scan order moving from top left to bottom right. That is, the scanning order for the sub-block in the TB block and the residual coefficient in the sub-block may be a diagonal scan order for scanning from top left to bottom right.

There is no position of a last non-zero transform coefficient: After prediction, since a spatial residual is applied and energy compression based on a transform is not performed with a transform skip, a residual signal (i.e., a residual sample) may no longer have a high probability for a subsequent zero or a non-significant level at a bottom right of a transform block. Therefore, in this case, signaling of information on a scanning position of a last non-zero transform coefficient may be skipped. Instead, a first sub-block to be coded first may be a top left sub-block in the transform block. Meanwhile, the non-zero residual coefficient may also be called a significant coefficient.

Sub-block CBF: A member of signaling of information on the scanning position of the last non-zero transform coefficient shall modify CBF signaling of a sub-block to which a transform skip is applied and which has coded_sub_block_flag, as described below.

Due to quantization, the aforementioned sequence of the non-significant level may be still generated locally within the transform block. Therefore, information on the scanning position of the last non-zero transform coefficient may be removed as described above, and coded_sub_block_flag may be coded for all sub-blocks.

In addition, coded_sub_block_flag for a sub-block (a top left sub-block) for a DC frequency position may represent a special case. For example, in VVC Draft 3, the coded_ub_block_flag for the top left sub-block may not be signaled and may be derived to be always equal to 1. When the scanning position of the last non-zero transform coefficient is located at a sub-block other than the top left sub-block, it may represent that there is at least one significant level outside a DC sub-block (i.e., the top left sub-block). As a result, the coded_sub_block_flag for the DC sub-block may be derived to be 1, but may include only 0/non-significant level. If the transform skip is applied to the current block and there is no information on the scanning position of the last non-zero transform coefficient as described above, the coded_sub_block_flag for each sub-block may be signaled. Herein, the coded_sub_block_flag for the DC sub-block may also be included except for a case where the coded_sub_block_flag for all sub-blocks other than the DC sub0block is already 0. Meanwhile, for example, when a diagonal scan order moving from bottom right to top left is applied as the scanning order of the transform block and the coded_sub_block_flag for the DC sub-block is not signaled, the coded_sub_block_flag for the DC sub-block may be derived to be equal to 1 (inferDcSbCbf=1). Therefore, since the DC sub-block shall have at least one significant level, if all sig_coeff_flags other than sig_coeff_flag for a first position of (0,0) in the DC sub-block are 0, the sig_coeff_flag for the first position of (0,0) may not be signaled, and may be derived to be equal to 1 (inferSbDcSigCoeffFlag=1).

In addition, there may be a change in context modeling of coded_sub_block_flag. For example, a context model index may be calculated as a sum of coded_sub_block_flag of a left sub-block of a current sub-block and coded_sub_block_flag of a top sub-block of the current sub-block and logical disjunction of the coded_sub_block_flags.

sig_coeff_flag context modeling: A local template of sig_coeff_flag context modeling may be modified to include only a left position NB0 and top position NB1 of a current scanning position. A context model offset may be derived as a value, i.e., sig_coeff_flag [NB0]+sig_coeff_flag [NB1], of a significant neighboring position. Therefore, selection of different context sets depending on a diagonal d of the current transform block may be removed. As a result, three context models and a single context model may be set to code the sig_coeff_flag.

abs_level_gt1_flag and par_level_flag context modeling: A single context model may be used for abs_level_gt1_flag and par_level_flag.

abs_remainder coding: Although an empirical distribution of a transform skip residual absolute level still fits a Laplacian or Geometrical distribution, there may be a greater instability than a transform coefficient absolute level. In particular, a variance within a window of consecutive realization may be higher for the residual absolute level. Accordingly, context modeling and binarization of abs_remainder may be modified as follows.

For example, a higher cutoff value may be used in binarization of abs_remainder. Accordingly, higher compression efficiency may be provided to a dedicated context model for each bin position and a transition point from coding with sig_coeff_flag, abs_level_gt1_flag, par_level_flag, and abs_level_gt3_flag to a rice code for abs_remainder. Increasing the cutoff may result in more "greater than X" flags (e.g., abs_level_gt5_flag, abs_level_gt7_flag, etc.) until the cutoff is reached. The cutoff may be fixed to 5 (numGtFlags=5).

In addition, a template for deriving the rice parameter may be modified. That is, only a right neighboring position and bottom neighboring position of the current scanning position may be considered as a local template of sig_coeff_flag context modeling.

coeff_sign_flag context modeling: Even if a global empirical distribution is almost uniformly distributed due to instability inside a sign sequence and the fact that a prediction residual is often biased, information related to a sign may be coded using a context model. A single dedicated context model may be used in coding of the information related to the sign, and the information related to the sign may be parsed after sig_coeff_flag to keep all context coded bins together.

Decrease in context coded bins: Transmission of syntax elements for a first scanning pass, that is, sig_coeff_flag, abs_level_gt1_flag, and par_level_flag, may not be modified. However, a constraint of a maximum value of context coded bins per sample (CCBs) may be removed, and may be adjusted differently. A decrease in the CCB may be derived by specifying a non-significant mode when CCB>k. Herein, k may be a positive integer. For example, in case of a regular level coding mode, k may be 2. The aforementioned constraint may correspond to a decrease in a quantization space.

Syntax elements related to residual data coded by applying the aforementioned modifications may be represented as shown in the following table.

TABLE 21

| | Descriptor |
|---|---|
| residual ts coding( x0, y0, log2TbWidth, log2TbHeight, cIdx ) { | |
|   log2SbSize = ( Min( log2TbWidth, log2TbHeight )< 2 ? 1 : 2 ) | |
|   numSbCoeff = 1 << ( log2SbSize << 1 ) | |
|   lastSubBlock = ( 1 << (log2TbWidth + log2TbHeight − 2 * log2SbSize ) ) − 1 | |
|   /* Loop over subblocks from last to the too-left (DC) subblock */ | |
|   inferDcSbCbf = 1 | |

TABLE 21-continued

|  | Descriptor |
|---|---|
| for( i = lastSubBlock; i >= 0; i− − ) { | |
|   xS = DiagScanOrder[ log2TbWidth − log2SbSize ][ log2TbHeight − log2SbSize ][ lastSubBlock ][ 0 ] | |
| ] | |
|   yS = DiagScanOrder[ log2TbWidth − log2SbSize ][ log2TbHeight − log2SbSize ][ lastSbSize ][ lastSubBlock ][ 1 ] | |
| ] | |
|   if( ( i > 0 \|\| !inferDcSbCbf ) | |
|     coded sub block flag[ xs ][ ys ] | ae(v) |
|   if( coded sub block flag[ xS ][ yS ] && i > 0 ) | |
|     inferDcSbCbf = 0 | |
|   } | |
| /* First scan pass */ | |
|   inferSbDcSigCoeffFlag = 1 | |
|   for( n = ( i = = numSbCoeff − 1; n >= 0; n− − ) { | |
|     xC = ( xS << log2SbSize ) + DiagScanOrder log2SbSize ][ log2SbSize ][ n ][ 0 ] | |
|     yC = ( yS << log2SbSize ) + DiagScanOrder log2SbSize ][ log2SbSize ][ n ][ 1 ] | |
|     if( coded sub block flag[ xS ][ yS ] && ( n > 0 \|\| !inferSbDcSisCoeffFlag ) ) { | |
|       sig coeff flag[ xC ][ yC ] | ae(v) |
|       if( sig coeff flag[ xC ][ yC ] ) | |
|         inferSbDcSigCoeffFlag = 0 | |
|     } | |
|     if( sig coeff flag[ xC ][ yC ] ) { | |
|       coeff sign flag[ n ] | ae(v) |
|       abs level gtX flag[ n ][ 0 ] | ae(v) |
|       if( abs level gtX flag[ n ][ 0 ] ) | |
|         par level flag[ n ] | ae(v) |
|     } | |
|     AbsLevelPassX[ xC ][ yC ] = | |
|       sig coeff flag[ xC ][ yC ] + par level flag[ n ] − abs level gtX flag[ n ][ 0 ] | |
|   } | |
| /* Greater than X scan passes (numGtXFlags=5) */ | |
|   for( i = 1; i <= numGtXFlags − 1 && abs level gtX flag[ n ][ i − 1 ] ; i++ ) { | |
|     for( n − numSbCoeff − 1; n >− 0; n− − ) { | |
|       xC = ( xS << log2SbSize ) + DiagScanOrder[ log2SbSize ][ log2SbSize ][ n ][ 0 ] | |
|       yC = ( yS << log2SbSize ) + DiagScanOrder[ log2SbSize ][ log2SbSize ][ n ][ 1 ] | |
|       abs level gtX flag[ n ][ i ] | ae(v) |
|       AbsLevelPassX[ xC ][ yC ] + = 2 * abs level gtX flag[ n ][ i ] | |
|     } | |
|   } | |
| /* remainder scan pass */ | |
|   for( n = numSbCoeff − 1; n >= 0; n− − ) { | |
|     xC = ( xS << log2SbSize ) + DiagScanOrder[ log2SbSize ][ log2SbSize ][ n ][ 0 ] | |
|     yC = ( yS << log2SbSize ) + DiagScanOrder[ log2SbSize ][ log2SbSize ][ n ][ 1 ] | |
|     if( abs level gtX flag[ n ][ numGtXFlags − 1 ] ) | |
|       abs remainder[ n ] | ae(v) |
|     TransCoeffLevel[ x0 ][ y0 ][ cIdx ][ xC ][ yC ] = ( 1 − 2 * coeff_sign_flag[ n ] ) * | |
|         ( AbsLevelPassX[ xC ][ yC ] + abs_remainder[ n ] ) | |
|   } | |
| } | |
| } | |

Meanwhile, a context index ctxIdx indicating a context model of a syntax element coded based on context included in the aforementioned residual information may be derived as described below.

For example, an input of a process of deriving the context index for the syntax element may be binIdx indicating a position of a current bin in a bin string for the syntax element, and ctxTable, ctxIdx, and bypassFlag may be derived as an output.

First, ctxInc for a current bin for the syntax element may be derived. That is, binIdx may be derived based on binIdx indicating a position of the current bin for the syntax element. The ctxInc may be expressed by a context increment parameter.

ctxInc derived based on binIdx for the syntax element may be as shown in the following table.

TABLE 22

| | binIdx | | | | | |
|---|---|---|---|---|---|---|
| Syntax element | 0 | 1 | 2 | 3 | 4 | >= 5 |
| end of tile group flag | terminate | na | na | na | na | na |
| alf_ctb_flag[ ][ ][ ] | 0..8 (clause 9.5.4.2.2) | na | na | na | na | na |
| sao merge left flag | 0 | na | na | na | na | na |
| sao merge up flag | 0 | na | na | na | na | na |
| sao type idx luma | 0 | bypass | na | na | na | na |
| sao type idx chroma | 0 | bypass | na | na | na | na |
| sao offset abs [ ][ ][ ][ ] | bypass | bypass | bypass | bypass | bypass | na |

TABLE 22-continued

| Syntax element | binIdx | | | | | |
|---|---|---|---|---|---|---|
| | 0 | 1 | 2 | 3 | 4 | >= 5 |
| sao offset sign [ ][ ][ ] | bypass | na | na | na | na | na |
| sao band position[ ][ ][ ] | bypass | bypass | bypass | bypass | bypass | bypass |
| sao eo class luma | bypass | bypass | na | na | na | na |
| sao eo class chroma | bypass | bypass | na | na | na | na |
| qt_split_cu_flag[ ][ ] | 0..5 (clause 9.5.4.2.21) | na | na | na | na | na |
| mtt split cu flag | 0..12 (clause 9.5.4.2.21) | na | na | na | na | na |
| mtt_split_cu_vertical_flag | ( cbWidth == cbHeight ) ? 0 : ((cbWidth > cbHeight) ? 1 : 2 ) | na | na | na | na | na |
| mtt split cu binary flag | 0 | na | na | na | na | na |
| cu_skip_flag[ ][ ] | 0,1,2 (clause 9.5.4.2.2) | na | na | na | na | na |
| pred mode flag | 0 | na | na | na | na | na |
| pcm flag[ ][ [ | terminate | na | na | na | na | na |
| intra luma ref idx[ ][ ] | 0 | 1 | 2 | na | na | na |
| intra subpartitions mode flag | 0 | na | na | na | na | na |
| intra subpartition split flag | 0 | na | na | na | na | na |
| intra luma mpm flag[ ][ ] | 0 | na | na | na | na | na |
| intra luma mpm idx[ ][ ] | bypass | bypass | bypass | bypass | bypass | na |
| intra_luma_mpm_remainder[ ][ ] | bypass | bypass | bypass | bypass | bypass | bypass |
| intra_chroma_pred_mode[ ][ ] sps cclm enabled flag == 0 | 0 | bypass | bypass | na | na | na |
| intra_chroma_pred_mode[ ][ ] sps_cclm_enabled_flag == 1 && bin at binIdx equal to 2 == 0 | 0 | 1 | 2 | bypass | bypass | na |
| intra_chroma_pred_mode[ ][ ] sps_cclm_enabled_flag == 1 && bin at binIdx equal to 2 == 1 | 0 | 1 | 2 | 2 | na | na |
| merge subblock flag [ ][ ] | 0,1,2 (clause 9.5.4.2.2) | na | na | na | na | na |
| merge_subblock_idx[ ][ ] sps sbtmvp enabled flag == 0 | 0 | bypass | bypass | bypass | bypass | bypass |
| merge_subblock_idx[ ][ ] sps sbtmvp enabled flag == 1 | 0 | 1 | 2 | 3 | 4 | 4 |
| merge flag[ ][ ] | 0 | na | na | na | na | na |
| mmvd flag[ ][ ] | 0 | na | na | na | na | na |
| mmvd merge flag[ ][ ] | 0 | na | na | na | na | na |
| mmvd distance idx[ ][ ] | 0 | bypass | bypass | bypass | bypass | bypass |
| mmvd direction idx[ ][ ] | bypass | bypass | na | na | na | na |
| merge_triangle_flag[ ][ ] | 0,1,2 (clause 9.5.4.2.2) | na | na | na | na | na |
| merge triangle idx[ ][ ] | 0 | bypass | bypass | bypass | bypass | bypass |
| merge idx[ ][ ] | 0 | bypass | bypass | bypass | bypass | na |
| ciip flag[ ][ ] | 0 | na | na | na | na | na |
| ciip luma mpm flag[ ][ ] | 0 | na | na | na | na | na |
| ciip luma mpm idx[ ][ ] | bypass | bypass | na | na | na | na |
| inter_pred_idc[ x0 ][ y0 ] | (cbWidth + cbHeight )! = 8? 7-((1 + Log2( cbWidth ) + Log2( cbHeight))>>1) :4 | 4 | na | na | na | na |
| inter_affine_flag[ ][ ] | 0,1,2 (clause 9.5.4.2.2) | na | na | na | na | na |
| cu affine type flag[ ][ ] | 0 | na | na | na | na | na |
| ref idx l0[ ][ ] | 0 | 1 | bypass | bypass | bypass | bypass |
| ref idx l1[ ][ ] | 0 | 1 | bypass | bypass | bypass | bypass |
| mvp l0 flag[ ][ ] | 0 | na | na | na | na | na |
| mvp l1 flag[ ][ ] | 0 | na | na | na | na | na |
| amvr_flag[ ][ ] | 0,1,2 (clause 9.5.4.2.2) | na | na | na | na | na |
| amvr 4pel flag[ ][ ] | 0 | na | na | na | na | na |
| gbi_idx[ ][ ] NoBackwardPredFlag == 0 | 0 | 1 | na | na | na | na |
| gbi_idx[ ][ ] NoBackwardPredFlag == 1 | 0 | 1 | 2 | 3 | na | na |
| cu cbf | 0 | na | na | na | na | na |
| cu_sbt_flag | ( cbWidth * cbHeight < 256 ) ? 1 : 0 | na | na | na | na | na |

TABLE 22-continued

| Syntax element | binIdx 0 | 1 | 2 | 3 | 4 | >= 5 |
|---|---|---|---|---|---|---|
| cu sbt quad flag | 0 | na | na | na | na | na |
| cu_sbt_horizontal_flag | ( cbWidth = = cbHeight ) ? 0 : (cbWidth < cbHeight) ? 1:2 | na | na | na | na | na |
| cu sbt pos flag | 0 | na | na | na | na | na |
| abs mvd greater flag[ ] | 0 | na | na | na | na | na |
| abs mvd greaterl flag[ ] | 0 | na | na | na | na | na |
| abs mvd minus2[ ] | bypass | bypass | bypass | bypass | bypass | bypass |
| mvd sign flag[ ] | bypass | na | na | na | na | na |
| tu_cbf_luma[ ][ ][ ] | 0,1,2,3 (clause 9.5.4.2.4) | na | na | na | na | na |
| tu_cbf_cb[ ][ ][ ] | trDepth - - 0 ? 0:1 | na | na | na | na | na |
| tu cbf cri[ ][ ] | tu cbf cb[ ][ ][ ] | na | na | na | na | na |
| cu qp delta abs | 0 | 1 | 1 | 1 | 1 | bypass |
| cu qp delta sign flag | bypass | na | na | na | na | na |
| transform skip flag[ ][ ] | 0 | na | na | na | na | na |
| tu mts idx[ ][ ] | cqtDepth | 6 | 7 | 8 | na | na |
| last sis coeff x prefix | 0..23 (clause 9.5.4.2.3) | | | | | |
| last sig coeff y prefix | 0..23 (clause 9.5.4.2.3) | | | | | |
| last sig coeff x suffix | bypass | bypass | bypass | bypass | bypass | bypass |
| last sia coeff y suffix | bypass | bypass | bypass | bypass | bypass | bypass |
| coded_sub_block_flag[ ][ ] | 0..3 (clause 9.5,4.2.5) | na | na | na | na | na |
| sig_coef_flag[ ][ ] | 0..89 (clause 9.5.4.2.7) | na | na | na | na | na |
| par_level_flag[ ] | 0..32 (clause 9.5.4.2.8) | na | na | na | na | na |
| abs_level_gt1_flag[ ] | 0..32 (clause 9.5.4.2.8) | na | na | na | na | na |
| abs_level_gt3_flag[ ] | 0..32 (clause 9.5.4.2.8) | na | na | na | na | na |
| abs remainder[ ] | bypass | bypass | bypass | bypass | bypass | bypass |
| dec abs level[ ] | bypass | bypass | bypass | bypass | bypass | bypass |
| coeff sign flag[ ] | bypass | na | na | na | na | na |

In Table 22, a context index of a bin having a value which is not bypass", "terminate", or "na" may be derived as follows.

ctxInc for a current bin of the syntax element may be derived as a value specified as an item for the current bin in Table 22. In addition, if a plurality of values are specified as the item for the current bin, the ctxInc may be derived through a process of the clause given in parentheses in the item. The clause above may imply the clause disclosed in the VVC standard. Thereafter, a variable ctxIdxOffset may be specified as a lowest value of ctxIdx according to the current value of initType. In addition, a context index ctxIdx for the current bin of the syntax element may be set to be equal to a sum of ctxInc and ctxIdxOffset. That is, the context index may be set to the sum of ctxInc and ctxIdxOffset. In addition, bypassFlag may be set to 0.

Meanwhile, if the item for the current bin is "bypass" in Table 22, the context index of the bin may be derived as follows. For example, ctxTable for the current bin may be set to 0. In addition, the context index ctxIdx for the current bin may be set to 0. In addition, bypassFlag may be set to 1.

Meanwhile, if the item for the current bin is "terminate" in Table 22, the context index of the bin may be derived as follows. For example, ctxTable for the current bin may be set to 0. In addition, the context index ctxIdx for the current bin may be set to 0. In addition, bypassFlag may be set to 0.

Meanwhile, if the item for the current bin is "na" in Table 22, syntax elements for the bin, i.e., the context index for the bin, may be derived as follows. For example, ctxIdx, ctxTable, and/or bypassFlag may not occur for the current bin.

Processes of the clauses for deriving ctxInc for a bin having a value other than "bypass", "terminate", or "na" may be as described below.

For example, a process of deriving ctxInc based on the clause 9.5.4.2.2 may be as shown in the following table.

TABLE 23

9.5.4.2.2 Derivation process of ctxInc using left and above syntax elements
Input to this process is the luma location ( x0, y0 ) specifying the top-left luma sample of the
current luma block relative to the top-left sample of the current picture, the colour component
cIdx, the current coding quadtree depth cqDepth, and the width and the height of die current
coding block in luma samples cb Width and cb Height.
Output of this process is ctxInc.
The location (xNbL, yNbL ) is set equal to ( x0 – 1, y0 ) and the variable availableL, specifying
the availability of the block located directly to the left of the current block, is derived by
invoking the availability derivation process for a block in z-scan order as specified in subclause
6.4 with the location (xCurr, yCurr ) set equal to (x0, y0 ) and the neighbouring location
(xNbY, yNbY) set equal to (xNbL, yNbL ) as inputs, and the output is assigned to availableL.

TABLE 23-continued

The location (xNbA, yNbA) is set equal to (x0, y0 − 1 ) and the variable availableA specifying
the availability of the coding block located directly above the current block, is derived by
invoking the availability derivation process for a block in z-scan order as specified in subclause
6.4 with the location ( xCurr, yCurr ) set equal to ( x0, y0 ) and the neighbouring location
( xNbY, yNbY ) set equal to ( xNbA, yNbA ) as inputs, and the output is assigned to availableA.
The variables sizeC, sizeTh2 and sizeTh are derived as follows:

sizeTh2 = ( MaxBtSizeY= = 128) ? 1024 : (( MaxBtSizeY= = 64) ? 512 : 256)     (9 19)
sizeTh1 − ( MaxBtSizeY= = 128) ? 128 : 64                                     (9 20)
sizeC = cbWidth * cbHeight                                                    (9 21)

The assignment of ctxInc is specified as follows with condL and condA for the syntax elements
alf_clb_flag[ x0 ][ y0 ][ cIdx], qt_split_cu_flag[ x0 ][ y0], mit_split_cu_flag[ x0 ][ y0 ],
cu_skip_flag[x0 ][ y0 ], amvr_flag[ x0 ][ y0 ], inter_affine_flag[x0 ] [ y0 ],
merge_triangle_flag[ x0 ] [ y0 ] and merge_subblock_flag[ x0 ] [ y0 ] specified in Table 9 11:

ctxInc = ( condL && availableL) + ( condA && availableA) + ctxSetIdx * 3      (9 22)

In addition, for example, a process of deriving ctxInc based on the clause 9.5.4.2.3 may be as shown in the following table.

TABLE 24

9.5.4.2.3 Derivation process of ctxInc for the syntax elements last_sig_coeff_x_prefix and
last_sig_coeff_y_ prefix
Inputs to this process are the variable binIdx, the colour component index cIdx, the binary
logarithm of the transform block width log2TbWidth and the transform block height
log2TbHeight.
Output of this process is the variable ctxInc.
The variable log2TbSize is derived as follows:
If the syntax element to be parsed is last sig cocff x prefix, log2TbSize is set equal to
1og2Tb Width.
Otherwise (the syntax element to be parsed is last_sig_coeff_y_prefix), log2TbSize is set
equal to log2TbHeight.
The variables ctxOffset and ctxShift are derived as follows:
If cIdx is equal to 0, ctxOffset is set equal to 3 * (log2TbSize − 2) + ( (log2TbSize − 1) >>
2 ) and ctxShift is set equal to (log2TbSize + 1) >> 2.
Otherwise (cIdx is greater than 0), ctxOffset is set equal to 21 and ctxShift is set equal to
Clip3( 0, 2, 2log2TbSize >> 3 ).
The variable ctxInc is derived as follows:

ctxInc = ( binIdx >> ctxShift) + ctxOffset                                    (9 23)

In addition, for example, a process of deriving ctxInc based on the clause 9.5.4.2.4 may be as shown in the following table.

TABLE 25

9.5.4.2.4 Derivation process of ctxInc for the syntax element tu_cbf_luma
Inputs to this process are the variable binIdx the colour component index cIdx, the binary
logarithm of the transform block width log2Tb Width and the transform block height
log2TbHeight and the current transform tree depth trDepth.
Output of this process is the variable ctxInc.
The variable ctxInc is derived as follows:
If IntraSubpartitionSplitType is equal to ISP_NO_SPLIT or cIdx is not equal to 0, the
following applies:

ctxInc = trDepth = = 0 ? 1 : 0                                                (9 24)

Otherwise (IntraSubpartitionSplitType is not equal to ISP_NO_SPLIT and cIdx is equal to
0 ), the following applies:
The variable prevTuCbfY is derived as follows:
If the current transform unit is the first one to be parsed in a coding unit, prevTuCbfY is set
equal to 0.
Otherwise, prevTuCbfY is set equal to the value of tu cbf luma of the previous luma
transform unit in the current coding unit.
The variable ctxInc is derived as follows:

ctxInc = 2 + prevTuCbfY                                                       (9 25)

In addition, for example, a process of deriving ctxInc based on the clause 9.5.4.2.5 may be as shown in the following table.

TABLE 26

9.5.4.2.5 Derivation process of ctxInc for the syntax element coded_sub_block_flag
inputs to this process are the colour component index cIdx, the current sub-block scan location
(xS, yS ), the previously decoded bins of the syntax element coded_sub_block_flag and the
binary logarithm of the transform block width log2Tb Width and the transform block height
log2TbHeight.
Output of this process is the variable ctxInc.
The variable csbfCtx is derived using the current location (xS, yS ), two previously decoded bins
of the syntax element coded_sub_block_flag in scan order, log2Tb Width and log2TbHeight, as
follows:
The variables log2Sb Width and log2SbHeight are dervied as follows:
log2SbWidth = ( Min( log2ThWidth, log2TbHeight) < 2 ? 1 : 2)   (9 26)
log2SbHeight = log2SbWidth   (9 27)
The variables log2Sb Width and log2SbHeight are modifed as follows:
If log2TbWidth is less than 2 and cIdx is equal to 0, the following applies
log2SbWidth = log2TbWidth   (9 28)
log2SbHeight = 4 - log2SbWidth   (9 29)
Otherwise, if log2TbHeight is less than 2 and cIdx is equal to 0, the following applies
log2SbHeight = log2TbHeight   (9 30)
log2Sb Width = 4 − log2SbHeight   (9 31)
csbfCtx is initialzed with 0 as follows:
csbfCtx = 0   (9 32)
When xS is less than (1 << (log2TbWidth − log2Sb Width)) − 1, csbfCtx is modified as
follows:
csbfCtx += coded_sub_block_flag[xS + 1 ][ yS ]   (9 33)
When yS is less than (1 << (log2TbHeight − log2SbHeight)) − 1, csbfCtx is modified as
follows:
csbfCtx += coded_sub_block_flag[xS ][ yS + 1 ]   (9 34)
The context index increment ctxInc is derived using the colour component index cIdx and
csbfCtx as follows:
If cIdx is equal to 0, ctxInc is derived as follows:
ctxInc = Min( csbfCtx, 1 )   (9 35)
Otherwise (cIdx is greater than 0), ctxInc is derived as follows:
ctxInc = 2 + Min( csbfCtx, 1 )   (9 36)

In addition, for example, a process of deriving ctxInc based on the clause 9.5.4.2.6 may be as shown in the following table.

TABLE 27

9.5.4.2.6 Derivation process for the variables locNumSig, locSumAbsPass1
Inputs to this process are the colour component index cIdx, the luma location ( x0, y0 )
specifying the top-left sample of the current transform block relative to the top-left sample of the
current picture, the current coefficient scan location (xC, yC), the binary logarithm of the
transform block width log2TbWidth, and the binary logarithm of the transform block height
log2TbHeight.
Outputs of this process are the variables locNumSig and locSumAbsPass1.
Given the syntax elements sig_coeff_flag[ x ] [ y ] and the array AbsLevelPass1 [ x ][ C ] for the
transform block with component index cIdx and the top-left luma location ( x0, y0 ), the
variables locNumSig and locSumAbsPassl are derived as specified by the following pseudo
code:
  locNumSig = 0
  locSumAbsPass1 = 0
    if( xC < (1 <<log2TbWidth) − 1) {
    locNumSig += sig_coeff_flag[ xC + 1 ] [ yC ]
    locSumAbsPassl += AbsLevelPass1[ xC + 1 ] [ yC ]
    if( xC < (1<< log2TbWidth) − 2 ) {
      locNumSig += sig_coeff_flag xC + 2 ] [ yC ]
      locSumAbsPass1 += AbsLevelPass1 [ xC + 2 ] [ yC ]
    if( yc < (1 << log2TbHeight) − 1) {
      locNumSig += sig_coeff_flag[ xC + 1 ][yC+ 1 ]   (937)
      locSumAbsPassl += AbsLevelPassl [ xC + 1 ] [ yC + 1 ]
    }
  }
  if( yC < (1<< log2TbHeight) − 1) {
    locNumSig += sig_coeff_flag xC ] [ yC + 1 ]
    locSumAbsPass1 += AbsLevelPass1 [ xC ] [ yC + 1 ]
    if( yC < (1<<loglTbHeight) - 2) {
      locNumSig += sig coeff flag[xC ][yC + 2 ]
      locSumAbsPass1 += AbsLevelPass1[xC][ yC+ 2 ]
    }
  }

In addition, for example, a process of deriving ctxInc based on the clause 9.5.4.2.7 may be as shown in the following table.

TABLE 28

9.5.4.2.7 Derivation process of ctxInc for the syntax element sigcoeff flag
Inputs to this process are the colour component index cIdx, the luma location ( x0, y0 )
specifying the top-left sample of the current transform block relative to the top-left sample of the
current picture, the current coefficient scan location ( xC, yC ), the binary logarithm of the
transform block width log2TbWidth, and the binary logarithm of the transform block height
log2TbHeight.
Output of this process is the variable ctxInc.
The variable locSumAbsPass1 is derived by invoking the derivation process for the variables
locNumSig and locSumAbsPassl specifies in clause 9.5.4.2.6 with colour component index cIdx,
the luma location ( x0, y0 ), the current coefficient scan location (xC, yC ), the binary logarithm
of the transform block width log2Tb Width, and the binary logarithm of the transform block
height log2TbHeiglit as input.
The variable d is set equal to xC + yC.
The variable ctxInc is derived as follows:
If cIdx is equal to 0, ctxInc is derived as follows:
ctxInc = 18 * Max( 0, QState − 1) + Min( locSumAbsPassl, 5) + (d < 2 ? 12 : (d < 5 ?
6 : 0))  (9 38)
Otherwise (cIdx is greater than 0), ctxInc is derived as follows:
ctxInc = 54 + 12 $^A$ Max(0, QState- 1) + Min(locSumAbsPassl,5) + (d<2 ? 6 : 0)  (9 39)

In addition, for example, a process of deriving ctxInc based on the clause 9.5.4.2.8 may be as shown in the following table.

TABLE 29

9.5.4.2.8 Derivation process of ctxInc for the syntax elements par level flag, abs level gtl flag,
and abs_level_gt3_flag
Inputs to this process arc the colour component index cIdx, the luma location ( x0, y0 )
specifying the top-left sample of the current transform block relative to the top-left sample of the
current picture, the current coefficient scan location (xC, yC), the binary logarithm of the
transform block width log2Tb Width, and the binary logarithm of the transform block height
log2TbHeight.
Output of this process is the variable ctxInc.
The variablea locNumSig and locSumAbsPass1 is derived by invoking the derivation process for
the variables locNumSig and locSum AbsPass1 specifies in clause 9.5.4.2.6 with colour
component index cldx, the luma location ( x0, y0), the current coefficient scan location (xC, yC ),
the binary logarithm of the transform block width log2TbWidth, and the binary logarithm of the
transform block height log2TbHeight as input.
The variable ctxOffset is set equal to Min( locSumAbsPass1 − locNumSig, 4 ).
The variable d is set equal to xC + yC.
Tire variable ctxInc is derived as follows:
If xC is equal to LastSignificantCoefX and yC is equal to LastSignificantCoefY, ctxInc is
derived as follows:
ctxInc = (cldx = = 0 ? 0 : 21)  (9 40)
Otherwise, if cldx is equal to 0, ctxInc is derived as follows:
ctxInc = 1 + ctxOffset + (d = = 0 ? 15 : (d < 3 ? 10 : (d < 10 ? 5 : 0 ) ) )  (9 41)
Otherwise (cIdx is greater than 0), ctxInc is derived as follows:
ctxInc = 22 + ctxOffset + (d = = 0 ? 5:0)  (9 42)

Meanwhile, as described above, since a block which is not subjected to transform encoding, that is, a transform block including residual coefficients to which a transform is not applied, has a characteristic different from that of a block subjected to typical transform encoding, there is a need for an effective residual data encoding method for the block not subjected to the transform encoding. Meanwhile, as described above, a transform skip flag indicating whether the transform is applied may be transmitted on a transform block basis, and a size of the transform block is not limited in the present disclosure. For example, if a value of the transform skip flag is 1, a residual information encoding/decoding method proposed in the present disclosure may be performed, and if the value of the transform skip flag is 0, the conventional residual information encoding/decoding method described in Table 1, Table 6, or Table 9 above may be performed. Alternatively, if the transform skip flag indicates that the transform is not applied to the current block (the transform is skipped), a residual information encoding/decoding method in a transform skip mode disclosed in Table 10 or Table 21 above may be performed.

Meanwhile, if the transform is not applied to the current block, a transform coefficient may be derived with a residual sample. Therefore, if the transform is skipped, the residual sample may also be called a coefficient or a residual coefficient.

As described in Table 1, Table 6, or Table 9 above, for residual encoding/decoding, a significant coefficient flag, a first transform coefficient level flag, a parity level flag, and a second transform level flag may be encoded/decoded, a syntax element for a remain level value, i.e., abs_remainder or dec_abs_level, may be encoded/decoded, and thereafter a sign flag for each residual coefficient may be encoded/decoded. Herein, the significant coefficient flag may be sig_coeff_flag, and the parity level flag may be par_level_flag, the first transform coefficient level flag may be abs_level_gt1_flag, and the second transform coefficient level flag may be abs_level_gt3_flag or abs_level_gtx_flag. In addition, the sign flag may be the aforementioned coef_f_sign_flag.

Meanwhile, the sign flag may be encoded/decoded as described in the method shown in Table 21 above. In this case, the sign flag may be encoded/decoded based on a context model, unlike in Table 1, Table 6, or Table 9 above in which the sign flag is subjected to bypass coding.

Herein, in case of a transform skip block (i.e., a block to which a transform is not applied), since the transform is not applied, there is a high possibility that a residual coefficient in the transform skip block has a sign similar to that of a residual coefficient neighboring thereto.

Therefore, the present embodiment of the present disclosure proposes a method in which a transform-skipped residual signal, i.e., a context table (ctxTable) of a sign flag of a residual coefficient of a transform-skipped block, is determined based on a sign flag of a residual coefficient encoded/decoded immediately prior to the residual coefficient and the sign flag of the residual coefficient is context-coded based on the determined context table. That is, the present embodiment proposes a method in which a context model for a sign flag of a residual coefficient in a current sub-block of a current block is determined based on a sign flag of a residual coefficient coded prior to the residual coefficient in the current sub-block, and the sign flag is coded based on the determined context model.

Unlike in the sign flag encoding/decoding disclosed in Table 1, Table 6, or Table 21 above in a coefficient group (CG) of a transform block, the sign flag may be context-encoded/decoded in the present embodiment to improve compression performance. The CG may also be expressed by a sub-block. In addition, the sign flag encoding/decoding disclosed in Table 21 above uses only one context model, which is different from the present embodiment in which coding is performed by using a context model determined based on a sign flag of a residual coefficient coded prior to the residual coefficient among a plurality of context models.

According to the present embodiment, a sign flag may be coded by considering a high correlation with an adjacent residual coefficient. Since sign flags of adjacent residual coefficients in a transform skip block tend to have similar values as described above, by considering the aforementioned aspect, the present embodiment proposes a method in which two context models (or context tables) are selected based on a value (e.g., 0 or 1) of a sign flag of an immediately previous residual coefficient according to a coefficient scanning order, when a sign flag of a residual coefficient in a current sub-block is encoded/decoded. Meanwhile, when the residual coefficient in the current sub-block is coded first among the residual coefficients of the current sub-block, a context model for the sign flag of the residual coefficient may be derived as a pre-defined context model (e.g., a context model 0). Compression performance for residual information can be improved through the aforementioned embodiment. Meanwhile, the context model may be indicated based on ctxidx or ctxinc, and the ctxidx may be derived based on the ctxinc.

In addition, as another embodiment, the present disclosure may propose a method of selecting one of M context models by using any N (N>=1) sign flags encoded/decoded immediately prior to a residual coefficient in a current sub-block. For example, a context model for a sign flag of a current residual may be derived as one of three context models, based on sign flags of two residual coefficients encoded/decoded prior to the current residual coefficient in the current sub-block. Alternatively, for example, the context model for the sign flag of the current residual may be derived as one of six context models, based on sign flags of two residual coefficients encoded/decoded prior to the current residual coefficient in the current sub-block. Meanwhile, when the residual coefficient in the current sub-block is coded first among residual coefficients of the current sub-block, a context model for a sign flag of the residual coefficient may be derived as a pre-defined context model (e.g., a context model 0).

For example, when the current sub-block includes five non-zero residual coefficients, if a value of sign flags of the non-zero residual coefficients is (0, 0, 0, 1, 0), context model values for the sign flags of the non-zero residual coefficients may be defined as (0, 0, 0, 0, 1). Herein, the context model value may indicate a context model. That is, if the context model value is 0, the context model value may indicate a context model 0, and if the context model value is 1, the context model value may indicate a context model 1. In the present embodiment, a pseudo code may be as shown in the following table.

TABLE 30 sign Pattern = 00010 (Herein, signPattern represents successive values of sign flags)
lastSignFlag = 0
numNonZeroCoeff = 5
shiftNum = numNonZeroCoeff -1
while (numNonZeroCoeff> 0)
  {
  currSignFlag = signPattern & (1 << shiftNum)
  ctxModel = lastSign
encodeBin(currSignFlag, ctxModel)
lastSignFlag = currSignFlag
signPattern <<= 1
numNonZeroCoeff -- 1
}

Meanwhile, embodiments of deriving a context model of a sign flag proposed in the present disclosure may be defined as shown in the following table.

TABLE 31

| | binIdx | | | | | |
|---|---|---|---|---|---|---|
| Syntax element | 0 | 1 | 2 | 3 | 4 | >= 5 |
| coeff_sign_flag[ ][ ] | 0, 1 (see the following derivation process) | na | na | na | na | na |

A ctxInc deriving process disclosed in Table 31 above may be as follows.
1. A last sign flag (a sign flag encoded/decoded immediately prior to a sign flag to be coded) is input.
2. The last sign flag is output as ctxInc. That is, a value of the last sign flag is output as ctxInc.

Alternatively, embodiments of deriving a context model of a sign flag proposed in the present disclosure may be defined as shown in the following table.

TABLE 32

| | binIdx | | | | | |
|---|---|---|---|---|---|---|
| Syntax element | 0 | 1 | 2 | 3 | 4 | >= 5 |
| coeff_sign_flag[ ][ ] | Lastcoeffsignflag = 0 ? 0 : 1 | na | na | na | na | na |

Referring to Table 32 above, a context model for a bin of a syntax element coeff_sign_flag (i.e., a sign flag) for a current residual coefficient may be determined based on lastcoeffsignflag. Specifically, for example, the context model for the bin of the syntax element coeff_sign_flag for the current residual coefficient may be determined based on ctxinc, and the ctxinc may be derived as 0 if a value of lastcoeffsignflag is 0, and may be derived as 1 if the value of lastcoeffsignflag is 1. Herein, lastcoeffsignflag may be the same as a value of coeff_sign_flag for a residual coefficient immediately prior to the current residual coefficient according to a coefficient scanning order in a current CG (i.e., a current sub-block). Meanwhile, if the current residual coefficient is a first residual coefficient in the current CG, the lastcoeffsignflag may be set to 0. That is, an initial value of the lastcoeffsignflag may be set to 0.

That is, according to the embodiment, a context model for a bin of coeff_sign_flag of a current residual coefficient may be adaptively determined based on a value of coeff_sign_flag of a previous residual coefficient of the current residual coefficient in the order of coefficient scanning among residual coefficients in a current CG. Therefore, the bin of coeff_sign_flag of the current residual coefficient may be decoded, and a value of coeff_sign_flag of the current residual coefficient may be derived. Accordingly, correlation of adjacent residual coefficients may be considered, and a coding gain may be increased. A sign of the current residual sample may be derived as described above, by using the value of coeff_sign_flag of the current residual coefficient.

Meanwhile, after the ctxinc for coeff_sign_flag of the current residual coefficient is derived as described above, a process of deriving a context model based on the coeff_sign_flag may be performed as described above.

Specifically, ctxIdxOffset for the sign flag may be derived as a smallest value among possible values of the ctxIdx for the sign flag. For example, in the above description, since the ctxIdx (a context model index indicating a context model) may be derived as either 0 (i.e., a context model 0) or 1 (i.e., a context model 1), the ctxIdxOffset may be derived as 0. Thereafter, the ctxIdx for the sign flag may be derived as a sum of the ctxIdxOffset and the ctxinc. Since the ctxIdxOffset is derived as 0, the ctxIdx for the sign flag may be the same as the ctxinc.

Meanwhile, the aforementioned embodiments may be applied to all transform skip blocks. Alternatively, since the sign flag is encoded/decoded only for a non-zero residual coefficient, it may be more preferable to apply the aforementioned embodiments only when the number of non-zero residual coefficients to be subjected to sign flag encoding/decoding is greater than or equal to a specific value. Accordingly, when the residual coding method described in Table 1 to Table 6 is used, the number of previously coded non-zero residual coefficients may be derived, and whether the sign flag will be subjected to context coding or bypass coding may be determined according to the number of non-zero residual coefficients. That is, for example, if the number of non-zero residual coefficients of the current sub-block is greater than or equal to a specific value, the sign flag may be coded based on a context model, and if the number of non-zero residual coefficients of the current sub-block is less than the specific value, the sign flag may be subjected to bypass coding. For example, the specific value may be 5. Specifically, for example, if the number of non-zero residual coefficients of the current sub-block is greater than or equal to 5, the sign flag may be coded based on the context model, and if the number of non-zero residual coefficients of the current sub-block may be less than 5, the sign flag may be subjected to bypass coding. Meanwhile, if the current sub-block is a block of a 4×4 size, the number of non-zero residual coefficients may be one of values in the range of 0 to 16, and if the current sub-block is a block of a 2×2 size, the number of non-zero residual coefficients may be one of values in the range of 0 to 4. The present disclosure does not limit an order of coding the sign flag, and may apply to any step after determining a presence/absence of the non-zero residual coefficient of the current sub-block.

Alternatively, an embodiment of determining whether to perform context coding/bypass coding on a sign flag may be proposed based on the number of non-zero residual coefficients and a specific value derived depending on a size of the current block. Herein, the number of non-zero residual coefficients used as a threshold, that is, the specific value, may be one of values in the range of 0 to the number of samples of the current block (a block including the current sub-block), or may be controlled on a sub-block basis and thus may be one of values in the range of 0 to 16 in case of a 4×4 sub-block and one of values in the range of 0 to 4 in case of a 2×2 sub-block. That is, the specific value may be derived based on the current block or a size of the current block, and if the number of non-zero residual coefficients of the current sub-block is greater than or equal to the specific value, the sign flag may be coded based on the context mode, and if the number of non-zero residual coefficients of the current sub-block is less than the specific value, the sign flag may be subjected to bypass coding.

For example, when the size of the current block is an 8×8 size, the specific value may be derived as 5, and if the number of non-zero residual coefficients of the current sub-block is greater than or equal to 5, the sign flag may be coded based on the context model, and if the number of non-zero residual coefficients of the current sub-block is less than 5, the sign flag may be subjected to bypass coding. In addition, when the size of the current block is a 4×4 size, the specific value may be derived as 4, and if the number of non-zero residual coefficients of the current sub-block is greater than or equal to 4, the sign flag may be coded based on the context model, and if the number of non-zero residual coefficients of the current sub-block is less than 4, the sign flag may be subjected to bypass coding.

Alternatively, an embodiment of determining whether the sign flag will be subjected to context coding/bypass coding may be proposed based on the size of the current block, the specific value derived depending on a position of the current sub-block, and the number of non-zero residual coefficients. Herein, the number of non-zero residual coefficients used as a threshold, that is, the specific value, may be one of values in the range of 0 to the number of samples of the current block (a block including the current sub-block), or may be controlled on a sub-block basis and thus may be one of values in the range of 0 to 16 in case of a 4×4 sub-block and one of values in the range of 0 to 4 in case of a 2×2 sub-block. That is, the specific value may be derived based on the current block or a size of the current block and a position of the current sub-block, and if the number of non-zero residual coefficients of the current sub-block is greater than or equal to the specific value, the sign flag may be coded based on the context mode, and if the number of non-zero residual coefficients of the current sub-block is less than the specific value, the sign flag may be subjected to bypass coding.

For example, when the size of the current block is an 8×8 size and the current sub-block is a CG #3 which is encoded in a first order among orders determined by a diagonal scan order, the specific value may be derived as 5, and if the number of non-zero residual coefficients of the current sub-block is greater than or equal to 5, the sign flag may be coded based on the context model, and if the number of non-zero residual coefficients of the current sub-block is less than 5, the sign flag may be subjected to bypass coding. Herein, the CG #3 may be a bottom right sub-block. In addition, when the size of the current block is an 8×8 size and the current sub-block is a CG #0 among orders determined by the diagonal scan order, the sign flag may be coded based on a context model irrespective of the number of non-zero residual coefficients of the current sub-block. That is, the specific value may be derived as 0. Herein, the CG #0 may be a top left sub-block.

Alternatively, an embodiment of determining whether the sign flag will be subjected to context coding/bypass coding may be proposed based on the size of the current block, the specific value derived depending on a position of the current sub-block and a prediction mode of the current block, and the number of non-zero residual coefficients. Herein, the number of non-zero residual coefficients used as a threshold, that is, the specific value, may be one of values in the range of 0 to the number of samples of the current block (a block including the current sub-block), or may be controlled on a sub-block basis and thus may be one of values in the range of 0 to 16 in case of a 4×4 sub-block and one of values in the range of 0 to 4 in case of a 2×2 sub-block. That is, the specific value may be derived based on the current block or a size of the current block, and a position of the current sub-block and a prediction mode of the current block, and if the number of non-zero residual coefficients of the current sub-block is greater than or equal to the specific value, the sign flag may be coded based on the context mode, and if the number of non-zero residual coefficients of the current sub-block is less than the specific value, the sign flag may be subjected to bypass coding.

For example, when the size of the current block is an 8×8 size and the current sub-block is a CG #3 which is encoded in a first order among orders determined by a diagonal scan order and if a prediction mode of the current block is an intra prediction mode, the specific value may be derived as 5, and if the number of non-zero residual coefficients of the current sub-block is greater than or equal to 5, the sign flag may be coded based on the context model, and if the number of non-zero residual coefficients of the current sub-block is less than 5, the sign flag may be subjected to bypass coding. Herein, the CG #3 may be a bottom right sub-block. In addition, if the current sub-block is a CG #0 among orders determined by the diagonal scan order, the sign flag may be coded based on a context model irrespective of the number of non-zero residual coefficients of the current sub-block. That is, the specific value may be derived as 0. Herein, the CG #0 may be a top left sub-block.

Alternatively, whether the sign flag will be coded based on the context model or will be bypass-coded may be determined based on whether the transform is applied to the current block.

Figure 6:
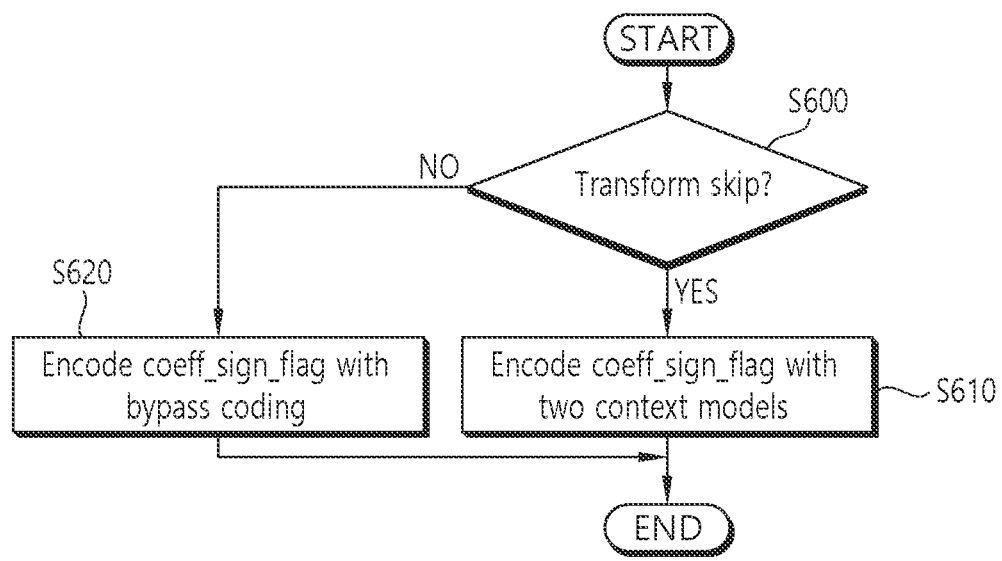
FIG. 6 shows an example of performing encoding by determining a method of coding a sign flag, based on whether a transform is applied to a current block.

FIG. 6 shows an example of performing encoding by determining a method of coding a sign flag, based on whether a transform is applied to a current block.

Referring to FIG. 6, an encoding apparatus may determine whether the transform is applied to the current block (S600).

If the transform is applied to the current block, the encoding apparatus may encode a sign flag for a current residual coefficient of a current sub-block, based on two context models (S610). As described above, the encoding apparatus may determine one of the context models as a context model of the sign flag of the current residual coefficient, based on a sign flag for a residual coefficient encoded prior to the current residual coefficient in the current sub-block. For example, when a value of the sign flag for the residual coefficient encoded prior to the current residual coefficient is 0, a context model 0 may be selected as the context model of the sign flag, and if the value of the sign flag for the residual coefficient encoded prior to the current residual coefficient is 1, a context model 1 may be selected as the context model of the sign flag. The encoding apparatus may encode the sign flag for the current residual coefficient, based on the determined context model.

If the transform is not applied to the current block, the encoding apparatus may bypass-encode the sign flag for the current residual coefficient of the current sub-block (S620).

Figure 7:
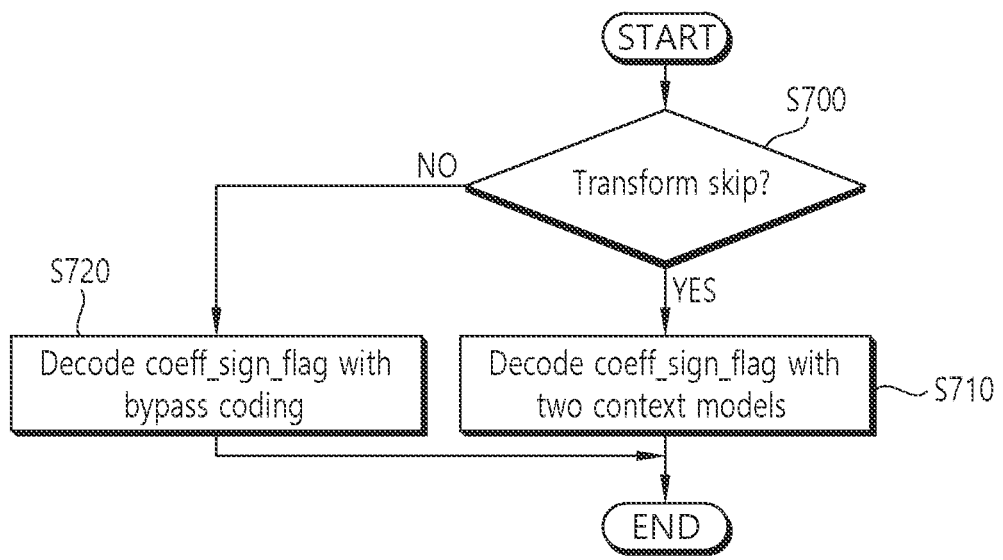
FIG. 7 shows an example of performing decoding by determining a method of coding a sign flag, based on whether a transform is applied to a current block.

FIG. 7 shows an example of performing decoding by determining a method of coding a sign flag, based on whether a transform is applied to a current block.

Referring to FIG. 7, a decoding apparatus may determine whether the transform is applied to the current block (S700). The decoding apparatus may determine whether the transform is applied to the current block, based on a transform skip flag of the current block.

If the transform is applied to the current block, the decoding apparatus may decode a sign flag for a current residual coefficient of a current sub-block, based on two context models (S710). As described above, the decoding apparatus may determine one of the context models as a context model of the sign flag of the current residual coefficient, based on a sign flag for a residual coefficient decoded prior to the current residual coefficient in the current sub-block. For example, when a value of the sign flag for the residual coefficient decoded prior to the current residual coefficient is 0, a context model 0 may be selected as the context model of the sign flag, and if the value of the sign flag for the residual coefficient decoded prior to the current residual coefficient is 1, a context model 1 may be selected as the context model of the sign flag. The decoding apparatus may decode the sign flag for the current residual coefficient, based on the determined context model.

If the transform is not applied to the current block, the decoding apparatus may bypass-decode the sign flag for the current residual coefficient of the current sub-block (S720).

Figure 8:
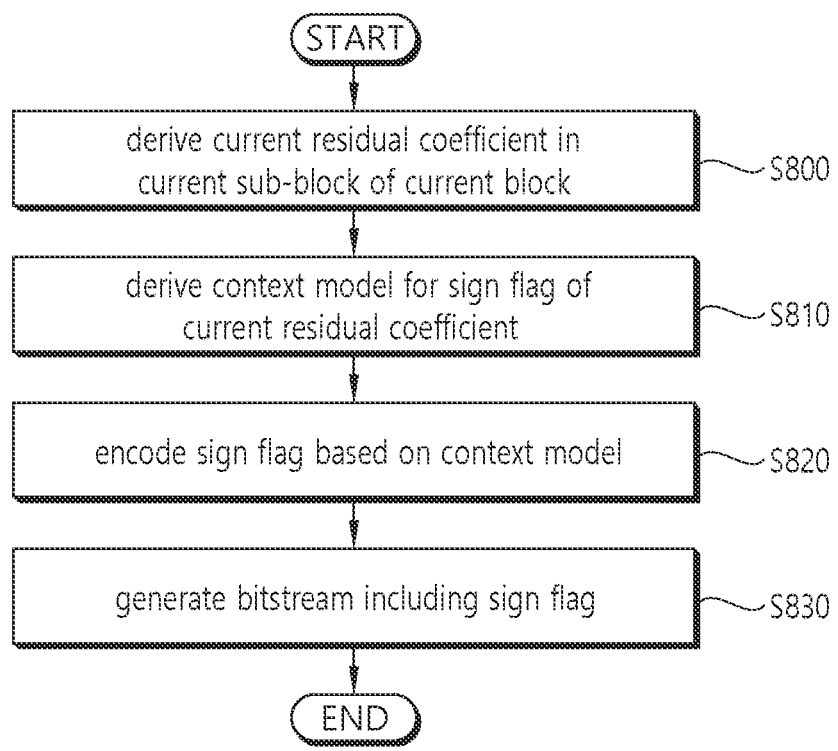
FIG. 8 briefly illustrates an image encoding method performed by an encoding apparatus according to the present disclosure.

FIG. 8 briefly illustrates an image encoding method performed by an encoding apparatus according to the present disclosure. The method disclosed in FIG. 8 may be performed by the encoding apparatus disclosed in FIG. 2. Specifically, for example, S800 of FIG. 8 may be performed by a residual processor of the encoding apparatus, and S810 to S830 may be performed by an entropy encoder of the encoding apparatus. In addition, although not shown, a process of deriving a prediction sample may be performed by a predictor of the encoding apparatus, a process of deriving a residual sample for the current block, based on an original sample and prediction sample for the current block, may be performed by a subtractor of the encoding apparatus, and a process of generating the reconstructed sample and reconstructed picture for the current block, based on the residual sample and prediction sample for the current block, may be performed by an entropy encoder of the encoding apparatus.

The encoding apparatus derives a current residual coefficient in a current sub-block of a current block (S800). The encoding apparatus may determine whether to perform inter prediction or intra prediction in the current block, and may determine a specific inter prediction mode or a specific intra prediction mode, based on RD cost. The encoding apparatus may derive a prediction sample for the current block, based on the determined mode, and may derive the residual sample through subtraction of the prediction sample and the original sample for the current block.

Thereafter, the encoding apparatus may determine whether a transform is applied to the current block. That is, the encoding apparatus may determine whether the transform is applied to the residual sample of the current block. The encoding apparatus may determine whether to apply the transform to the current block by considering coding efficiency. For example, the encoding apparatus may determine that the transform is not applied to the current block.

If the transform is not applied to the current block, that is, if the transform is not applied to the residual sample, the encoding apparatus may derive the derived residual sample as the current residual coefficient. In addition, if the transform is applied to the current block, that is, if the transform is applied to the residual sample, the encoding apparatus may derive the current residual coefficient by performing the transform on the derived residual sample. The current residual coefficient may be included in a current sub-block of the current block. The current sub-block may be called a current coefficient group (CG). In addition, the size of the current sub-block of the current block may be a 4×4 size or a 2×2 size. That is, the current sub-block of the current block may include up to 16 non-zero residual coefficients or up to 4 non-zero residual coefficients.

Meanwhile, the encoding apparatus may generate and encode a transform skip flag indicating whether the transform is applied to the residual coefficients of the current block. Residual information may include the transform skip flag for the current block. The transform skip flag may indicate whether the transform is applied to the residual coefficients of the current block. That is, the transform skip flag may indicate whether the transform is applied to the residual coefficients. Syntax elements indicating the transform skip flag may be the aforementioned transform_skip_flag.

The encoding apparatus derives a context model for a sign flag of the current residual coefficient (S810).

For example, the encoding apparatus may derive the context model for the sign flag of the current residual coefficient among the plurality of context models.

For example, the context model for the sign flag may be derived based on a sign flag of a residual coefficient encoded prior to the current residual coefficient in the current sub-block. That is, it may be derived based on a sign flag of a residual coefficient encoded (or scanned) prior to the current residual coefficient in a coefficient scanning order among residual coefficients in the current sub-block. For example, when a value of the sign flag of the residual coefficient encoded prior to the current residual coefficient is 0, a value of a context index indicating a context model for the sign flag of the current residual coefficient may be derived as 0, and when the value of the sign flag of the residual coefficient encoded prior to the current residual coefficient is 1, the value of the context index indicating the context model for the sign flag of the current residual coefficient may be derived as 1. That is, when the value of the sign flag of the residual coefficient encoded prior to the current residual coefficient is 0, a context model for the sign flag of the current residual coefficient may be derived as a context model 0, and when the value of the sign flag of the residual coefficient encoded prior to the current residual coefficient is 1, the context model for the sign flag of the current residual coefficient may be derived as a context model 1. Meanwhile, when the current residual coefficient is a residual coefficient encoded first in the current sub-block, the value of the context index indicating the context model for the sign flag of the current residual coefficient may be derived as 0. That is, when the current residual coefficient is a residual coefficient encoded first in the current sub-block, the context model for the sign flag of the current residual coefficient may be derived as the context model 0.

Alternatively, in another example, the context model for the sign flag may be derived based on sign flags of a plurality of residual coefficients encoded prior to the current residual coefficient in the current sub-block. The context model for the sign flag may be derived as one of a plurality of context models, based on the sign flags of the plurality of residual coefficients encoded prior to the current residual coefficient in the current sub-block. For example, the context model for the sign flag may be derived as one of three context models, based on sign flags of two residual coefficients encoded prior to the current residual coefficient in the current sub-block. Alternatively, for example, the context model for the sign flag may be derived as one of six context models, based on signal flags of two residual coefficients encoded prior to the current residual coefficient in the current sub-block.

Meanwhile, the encoding apparatus may determine whether the sign flag is encoded based on the context model, and may derive the context model for the sign flag when it is determined that the sign flag is encoded based on the context model.

For example, based on a transform skip flag for the current block, the encoding apparatus may determine whether the sign flag is encoded based on the context model. That is, based on whether the transform is applied to the current block, the encoding apparatus may determine whether the sign flag is encoded based on the context model. The transform skip flag may indicate whether the transform is applied to the current block. That is, the transform skip flag may indicate whether the transform is applied to residual coefficients of the current block. The residual information for the current block may include the transform skip flag. If a value of the transform skip flag is 0, the sign flag may not be encoded based on the context model (that is, the sign flag may be bypass-decoded), and if the value of the transform skip flag is 1, the sign flag may be encoded based on the context model. That is, if the value of the transform skip flag is 1, it may be determined that the sign flag is encoded based on the context mode, and the encoding apparatus may derive the context model for the sign flag, and may encode the sign flag based on the context model.

Alternatively, for example, the encoding apparatus may determine whether the sign flag is encoded based on the context model, by comparing a specific value and the number of non-zero residual coefficients in the current sub-block. When the number of non-zero residual coefficients is less than the specific value, the sign flag may not be encoded based on the context model (that is, the sign flag may be bypass-decoded), and when the number of non-zero residual coefficients is greater than or equal to the specific value, the sign flag may be encoded based on the context model. In other words, when the number of non-zero residual coefficients is greater than or equal to the specific value, the encoding apparatus may determine that the sign flag is encoded based on the context model, and the encoding apparatus may derive the context model for the sign flag, and may encode the sign flag based on the context model. The specific value may also be represented by a threshold.

Herein, for example, the specific value may be one of values in the range of 0 to the number of samples of the current block. For example, the specific value may be one of values in the range of 0 to 64. Alternatively, for example, the specific value may be one of values in the range of 0 to the number of current sub-blocks. That is, for example, if the size of the current sub-block is a 4×4 size, the specific value may be one of values in the range of 0 to 16, and if the size of the current sub-block is a 2×2 size, the specific value may be one of values in the range of 0 to 4. For example, the specific value may be 5.

Alternatively, for example, the specific value may be derived based on the size of the current block. For example, the specific value may be derived as 5 when the size of the current block is an 8×8 size, and the specific value may be derived as 5 when the size of the current block is a 4×4 size.

Alternatively, for example, the specific value may be derived based on a size of the current block and a position of the current sub-block in the current block.

For example, the specific value may be derived as 5 when the size of the current block is an 8×8 size and the current sub-block is a bottom-right sub-block of the current block. Herein, a bottom-right sub-block may be a sub-block #3 (i.e., a CG #3) in an order determined by a diagonal scan order.

In addition, for example, the specific value may be derived as 4 when the size of the current block is the 8×8 size and the current sub-block is a top-left block of the current block. Herein, a top-left sub-block may be a sub-block #0 (or a CG #0) in the order determined by the diagonal scan order.

Alternatively, for example, the specific value may be derived based on a size of the current block, a position of the sub-block in the current block, and a prediction mode of the current block.

For example, the specific value may be derived as 5 when the size of the current block is the 8×8 size, the current sub-block is a bottom-right sub-block of the current block, and the prediction mode of the current block is an intra prediction mode. That is, the specific value may be derived as 5 when the size of the current block is the 8×8 size, the current sub-block is a bottom-right sub-block of the current block, and the prediction mode applied to the current block is an intra prediction mode.

In addition, for example, the specific value may be derived as 0 when the size of the current block is the 8×8 size, the current sub-block is a top-left sub-block of the current block, and the prediction mode of the current block is the intra prediction mode. That is, the specific value may be derived as 0 when the size of the current block is the 8×8 size, the current sub-block is a top-left sub-block of the current block, and the prediction mode applied to the current block is the intra prediction mode. Accordingly, it may be determined that the sign flag is encoded based on the context model irrespective of the number of non-zero residual coefficients.

The encoding apparatus encodes the sign flag, based on the context model (S820). The encoding apparatus may encode the sign flag, based on the context model. That is, the encoding apparatus may encode the sign flag in a context-based manner, based on the context model. The sign flag may indicate a sign of the current residual coefficient. When a value of the sign flag is 0, the sign flag may indicate that the current residual coefficient is a positive value, and if the value of the sign flag is 1, the sign flag may indicate that the current residual coefficient is a negative value. That is, if the value of the sign flag is 0, the current residual coefficient may be a positive value, and if the value of the sign flag is 1, the current residual coefficient may be a negative value.

In addition, the encoding apparatus may encode residual information for the current block.

The residual information may include syntax elements for a residual coefficient in a current sub-block of the current block. The residual information may include syntax elements for the current residual coefficient in the current sub-block of the current block. Herein, the syntax elements may include syntax elements coded based on a context and syntax elements which are bypass-coded (i.e., syntax elements coded based on uniform probability distribution).

For example, the residual information may include syntax elements such as transform_skip_flag, last_sig_coeff_x_prefix, last_sig_coeff_y_prefix, last_sig_coeff_x_suffix, last_sig_coeff_y_suffix, coded_sub_block_flag, sig_coeff_flag, par_level_flag, abs_level_gt1_flag, abs_level_gtX_flag, abs_remainder, coeff_sign_flag, dec_abs_level, and/or mts_idx.

Specifically, for example, the residual information may include a transform skip flag for the current block. The transform skip flag may indicate whether to apply the transform of the current block. That is, the transform skip flag may indicate whether the transform is applied to the residual coefficients of the current block. A syntax element indicating the transform skip flag may be the aforementioned transform_skip_flag.

In addition, for example, the residual information may include position information indicating a position of a last non-zero residual coefficient in a residual coefficient array of the current block. That is, the residual information may include position information indicating a position of a last non-zero residual coefficient in a scanning order of the current block. The position information may include information indicating a prefix of a column position of the last non-zero residual coefficient, information indicating a prefix of a row position of the last non-zero residual coefficient, information indicating a suffix of the column position of the last non-zero residual coefficient, and information indicating a suffix of the row position of the last non-zero residual coefficient. Syntax elements for the position information may be last_sig_coeff_x_prefix, last_sig_coeff_y_prefix, last_sig_coeff_x_suffix, and last_sig_coeff_y_suffix. Meanwhile, the non-zero residual coefficient may also be called a significant coefficient.

In addition, for example, the residual information may include syntax elements coded based on a context for a current residual coefficient in a current sub-block of the current block. The syntax elements may include a significant coefficient flag indicating whether the current residual coefficient is a non-zero residual coefficient, a parity level flag for a priority of a coefficient level for the current residual coefficient, a first coefficient level flag for whether the coefficient level is greater than a first threshold, and a second coefficient level flag for whether the coefficient level of the current residual coefficient is greater than a second threshold. Herein, the significant coefficient flag may be sig_coeff_flag, the parity level flag may be par_level_flag, the first coefficient level flag may be abs_level_gt1_flag, and the second coefficient level flag may be abs_level_gt3_flag or abs_level_gtx_flag.

In addition, for example, syntax elements coded based on a context for a current residual coefficient may include a sign flag indicating a sign of the current residual coefficient. For example, if the transform is not applied to the current block (that is, if a value of a transform skip flag is 1), the syntax elements coded based on the context may include the sign flag. That is, if the transform is not applied to the current block (that is, if the value of the transform skip flag is 1), the sign flag may be encoded based on a context model.

In addition, for example, the residual information may include a syntax element coded based on a bypass for a current residual coefficient in the current sub-block of the current block. The bypass-coded syntax element may include information related to a coefficient value for a value of the current residual coefficient. The information related to the coefficient value may be abs_remainder and/or dec_abs_level. In addition, for example, if the transform is applied to the current block (that is, if the value of the transform skip flag is 0), the bypass-coded syntax element may include the sign flag. That is, if the transform is applied to the current block (that is, if the value of the transform skip flag is 0), the sign flag may be bypass-encoded (that is, the sign flag may be encoded based on uniform probability distribution).

The encoding apparatus generates a bitstream including the sign flag (S830). For example, the encoding apparatus may output image information including residual information including the sign flag as the bitstream. The bitstream may include the residual information.

Meanwhile, the bitstream may include prediction information for the current block. The prediction information may include information on an inter prediction mode or intra prediction mode performed in the current block. The encoding apparatus may generate and encode the prediction information for the current block.

Meanwhile, the bitstream may be transmitted to the decoding apparatus through a network or a (digital) storage medium. Herein, the network may include a broadcasting network and/or a communication network, and the digital storage medium may include various storage media such as a universal serial bus (USB), an SD, a compact disc (CD), a digital versatile disc (DVD), a Blu-ray, a hard disk drive (HDD), a solid state drive (SSD), or the like.

Figure 9:
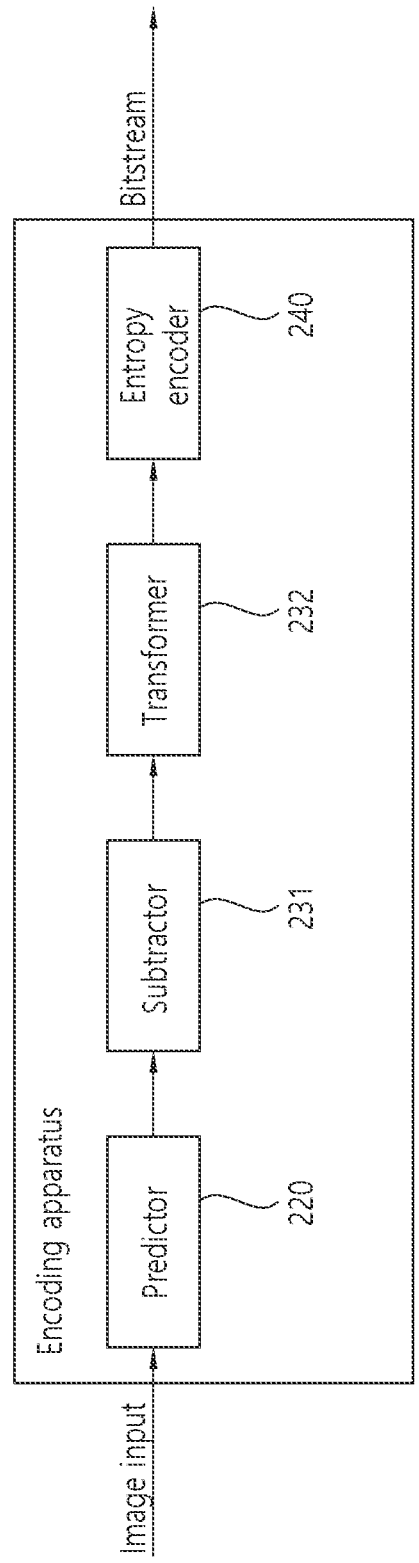
FIG. 9 briefly illustrates an encoding apparatus for performing an image encoding method according to the present disclosure.

FIG. 9 briefly illustrates an encoding apparatus for performing an image encoding method according to the present disclosure. The method disclosed in FIG. 8 may be performed by the encoding apparatus disclosed in FIG. 9. Specifically, for example, a residual process of the encoding apparatus of FIG. 9 may perform S800 of FIG. 8, and an entropy encoder of the encoding apparatus of FIG. 9 may perform S810 to S830 of FIG. 8. In addition, although not shown, a process of deriving a prediction sample may be performed by a predictor of the encoding apparatus, a process of deriving reconstructed sample for the current block, based on the prediction sample and residual sample for the current block may be performed by an adder of the encoding apparatus, and a process of encoding prediction information for the current block may be performed by an entropy encoder of the encoding apparatus.

Figure 10:
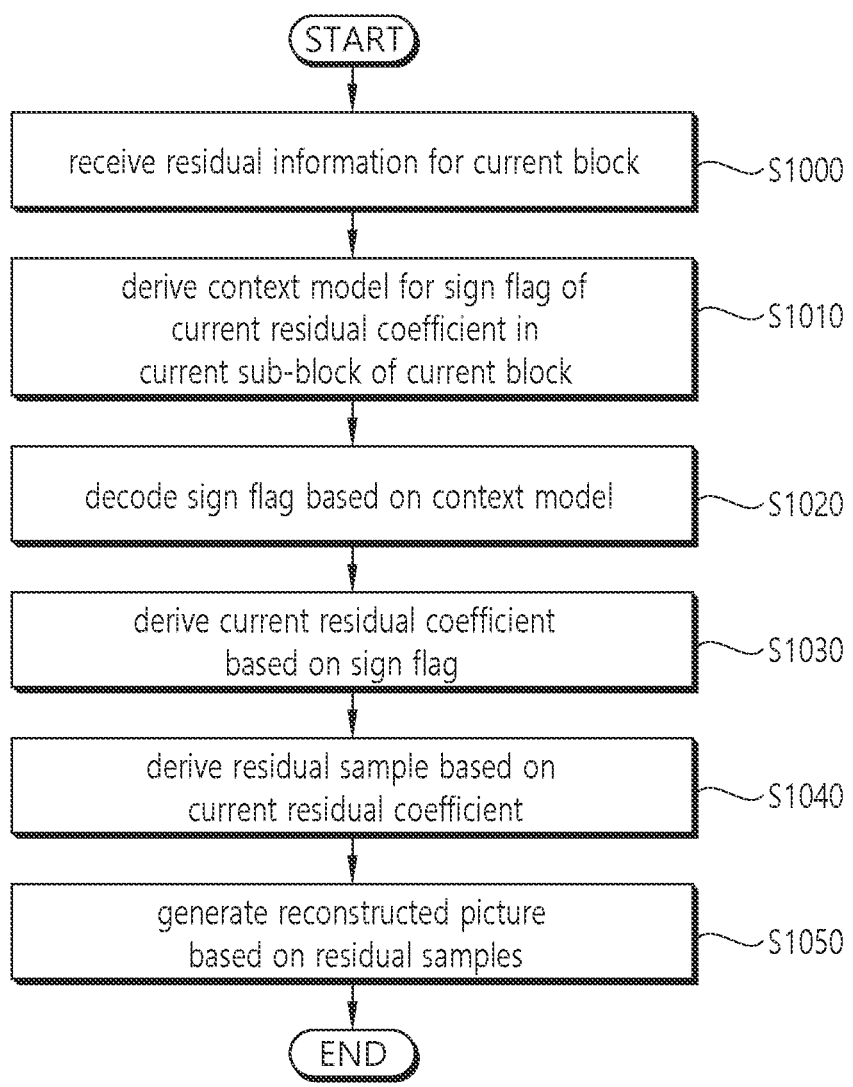
FIG. 10 briefly illustrates an image decoding method performed by a decoding apparatus according to the present disclosure.

FIG. 10 briefly illustrates an image decoding method performed by a decoding apparatus according to the present disclosure. The method disclosed in FIG. 10 may be performed by the decoding apparatus disclosed in FIG. 3. Specifically, for example, S1000 to S1030 of FIG. 10 may be performed by an entropy decoder of the decoding apparatus, S1040 may be performed by a residual processor of the decoding apparatus, and S1050 may be performed by an adder of the decoding apparatus. In addition, although not shown, a process of deriving a prediction sample may be performed by a predictor of the decoding apparatus.

The decoding apparatus receives residual information for a current block (S1000). The decoding apparatus may receive image information including the residual information for the current block through a bitstream. Herein, the current block may be a coding block (CB) or a transform block (TB). The residual information may include syntax elements for a residual coefficient in a current sub-block of the current block. The residual information may include syntax elements for the current residual coefficient in the current sub-block of the current block. Herein, the syntax elements may include syntax elements coded based on a context and syntax elements which are bypass-coded (i.e., syntax elements coded based on uniform probability distribution).

For example, the residual information may include syntax elements such as transform_skip_flag, last_sig_coeff_x_prefix, last_sig_coeff_y_prefix, last_sig_coeff_x_suffix, last_sig_coeff_y_suffix, coded_sub_block_flag, sig_coeff_flag, par_level_flag, abs_level_gt1_flag, abs_level_gtX_flag, abs_remainder, coeff_sign_flag, dec_abs_level, and/or mts_idx.

Specifically, for example, the residual information may include a transform skip flag for the current block. The transform skip flag may indicate whether to apply the transform of the current block. That is, the transform skip flag may indicate whether the transform is applied to the residual coefficients of the current block. A syntax element indicating the transform skip flag may be the aforementioned transform_skip_flag.

In addition, for example, the residual information may include position information indicating a position of a last non-zero residual coefficient in a residual coefficient array of the current block. That is, the residual information may include position information indicating a position of a last non-zero residual coefficient in a scanning order of the current block. The position information may include information indicating a prefix of a column position of the last non-zero residual coefficient, information indicating a prefix of a row position of the last non-zero residual coefficient, information indicating a suffix of the column position of the last non-zero residual coefficient, and information indicating a suffix of the row position of the last non-zero residual coefficient. Syntax elements for the position information may be last_sig_coeff_x_prefix, last_sig_coeff_y_prefix, last_sig_coeff_x_suffix, and last_sig_coeff_y_suffix. Meanwhile, the non-zero residual coefficient may also be called a significant coefficient.

In addition, for example, the residual information may include syntax elements coded based on a context for a current residual coefficient in a current sub-block of the current block. The syntax elements may include a significant coefficient flag indicating whether the current residual coefficient is a non-zero residual coefficient, a parity level flag for a priority of a coefficient level for the current residual coefficient, a first coefficient level flag for whether the coefficient level is greater than a first threshold, and a second coefficient level flag for whether the coefficient level of the current residual coefficient is greater than a second threshold. Herein, the significant coefficient flag may be sig_coeff_flag, the parity level flag may be par_level_flag, the first coefficient level flag may be abs_level_gt1_flag, and the second coefficient level flag may be abs_level_gt3_flag or abs_level_gtx_flag.

In addition, for example, syntax elements coded based on a context for a current residual coefficient may include a sign flag indicating a sign of the current residual coefficient. For example, if the transform is not applied to the current block (that is, if a value of a transform skip flag is 1), the syntax elements coded based on the context may include the sign flag. That is, if the transform is not applied to the current block (that is, if the value of the transform skip flag is 1), the sign flag may be decoded based on a context model.

In addition, for example, the residual information may include a syntax element coded based on a bypass for a current residual coefficient in the current sub-block of the current block. The bypass-coded syntax element may include information related to a coefficient value for a value of the current residual coefficient. The information related to the coefficient value may be abs_remainder and/or dec_abs_level. In addition, for example, if the transform is applied to the current block (that is, if the value of the transform skip flag is 0), the bypass-coded syntax element may include the sign flag. That is, if the transform is applied to the current block (that is, if the value of the transform skip flag is 0), the sign flag may be bypass-decoded (that is, the sign flag may be decoded based on uniform probability distribution).

Meanwhile, the bitstream may include prediction information for the current block. The prediction information may include information on an inter prediction mode or intra prediction mode performed in the current block. The decoding apparatus may perform inter prediction or intra prediction for the current block, based on the prediction information received through the bitstream, and may derive prediction samples of the current block.

The decoding apparatus derives a context model for a sign flag of a current residual coefficient in a current sub-block of the current block (S1010).

For example, the decoding apparatus may derive a context model for the sign flag of the current residual coefficient among a plurality of context models.

For example, the context model for the sign flag may be derived based on a sign flag of a residual coefficient decoded prior to the current residual coefficient in the current sub-block. That is, it may be derived based on a sign flag of a residual coefficient decoded (or scanned) prior to the current residual coefficient in a coefficient scanning order among residual coefficients in the current sub-block. For example, when a value of the sign flag of the residual coefficient decoded prior to the current residual coefficient is 0, a value of a context index indicating a context model for the sign flag of the current residual coefficient may be derived as 0, and when the value of the sign flag of the residual coefficient decoded prior to the current residual coefficient is 1, the value of the context index indicating the context model for the sign flag of the current residual coefficient may be derived as 1. That is, when the value of the sign flag of the residual coefficient decoded prior to the current residual coefficient is 0, a context model for the sign flag of the current residual coefficient may be derived as a context model 0, and when the value of the sign flag of the residual coefficient decoded prior to the current residual coefficient is 1, the context model for the sign flag of the current residual coefficient may be derived as a context model 1. Meanwhile, when the current residual coefficient is a residual coefficient decoded first in the current sub-block, the value of the context index indicating the context model for the sign flag of the current residual coefficient may be derived as 0. That is, when the current residual coefficient is a residual coefficient decoded first in the current sub-block, the context model for the sign flag of the current residual coefficient may be derived as the context model 0.

Alternatively, in another example, the context model for the sign flag may be derived based on sign flags of a plurality of residual coefficients decoded prior to the current residual coefficient in the current sub-block. The context model for the sign flag may be derived as one of a plurality of context models, based on the sign flags of the plurality of residual coefficients decoded prior to the current residual coefficient in the current sub-block. For example, the context model for the sign flag may be derived as one of three context models, based on sign flags of two residual coefficients decoded prior to the current residual coefficient in the current sub-block. Alternatively, for example, the context model for the sign flag may be derived as one of six context models, based on signal flags of two residual coefficients decoded prior to the current residual coefficient in the current sub-block.

Meanwhile, the decoding apparatus may determine whether the sign flag is decoded based on the context model, and may derive the context model for the sign flag when it is determined that the sign flag is decoded based on the context model.

For example, based on a transform skip flag for the current block, the decoding apparatus may determine whether the sign flag is decoded based on the context model. That is, based on whether the transform is applied to the current block, the decoding apparatus may determine whether the sign flag is decoded based on the context model. The transform skip flag may indicate whether the transform is applied to the current block. That is, the transform skip flag may indicate whether the transform is applied to residual coefficients of the current block. The residual information for the current block may include the transform skip flag. If a value of the transform skip flag is 0, the sign flag may not be decoded based on the context model (that is, the sign flag may be bypass-decoded), and if the value of the transform skip flag is 1, the sign flag may be decoded based on the context model. That is, if the value of the transform skip flag is 1, it may be determined that the sign flag is decoded based on the context mode, and the decoding apparatus may derive the context model for the sign flag, and may decode the sign flag based on the context model.

Alternatively, for example, the decoding apparatus may determine whether the sign flag is decoded based on the context model, by comparing a specific value and the number of non-zero residual coefficients in the current sub-block. When the number of non-zero residual coefficients is less than the specific value, the sign flag may not be decoded based on the context model (that is, the sign flag may be bypass-decoded), and when the number of non-zero residual coefficients is greater than or equal to the specific value, the sign flag may be decoded based on the context model. In other words, when the number of non-zero residual coefficients is greater than or equal to the specific value, the decoding apparatus may determine that the sign flag is decoded based on the context model, and the decoding apparatus may derive the context model for the sign flag, and may decode the sign flag based on the context model. The specific value may also be represented by a threshold.

Herein, for example, the specific value may be one of values in the range of 0 to the number of samples of the current block. For example, the specific value may be one of values in the range of 0 to 64. Alternatively, for example, the specific value may be one of values in the range of 0 to the number of current sub-blocks. That is, for example, if the size of the current sub-block is a 4×4 size, the specific value may be one of values in the range of 0 to 16, and if the size of the current sub-block is a 2×2 size, the specific value may be one of values in the range of 0 to 4. For example, the specific value may be 5.

Alternatively, for example, the specific value may be derived based on the size of the current block. For example, the specific value may be derived as 5 when the size of the current block is an 8×8 size, and the specific value may be derived as 5 when the size of the current block is a 4×4 size.

Alternatively, for example, the specific value may be derived based on a size of the current block and a position of the current sub-block in the current block.

For example, the specific value may be derived as 5 when the size of the current block is an 8×8 size and the current sub-block is a bottom-right sub-block of the current block.

Herein, a bottom-right sub-block may be a sub-block #3 (i.e., a CG #3) in an order determined by a diagonal scan order.

In addition, for example, the specific value may be derived as 4 when the size of the current block is the 8×8 size and the current sub-block is a top-left block of the current block. Herein, a top-left sub-block may be a sub-block #0 (or a CG #0) in the order determined by the diagonal scan order.

Alternatively, for example, the specific value may be derived based on a size of the current block, a position of the sub-block in the current block, and a prediction mode of the current block.

For example, the specific value may be derived as 5 when the size of the current block is the 8×8 size, the current sub-block is a bottom-right sub-block of the current block, and the prediction mode of the current block is an intra prediction mode. That is, the specific value may be derived as 5 when the size of the current block is the 8×8 size, the current sub-block is a bottom-right sub-block of the current block, and the prediction mode applied to the current block is an intra prediction mode.

In addition, for example, the specific value may be derived as 0 when the size of the current block is the 8×8 size, the current sub-block is a top-left sub-block of the current block, and the prediction mode of the current block is the intra prediction mode. That is, the specific value may be derived as 0 when the size of the current block is the 8×8 size, the current sub-block is a top-left sub-block of the current block, and the prediction mode applied to the current block is the intra prediction mode. Accordingly, it may be determined that the sign flag is decoded based on the context model irrespective of the number of non-zero residual coefficients.

The decoding apparatus decodes the sign flag, based on the context model (S1020). The decoding apparatus may decode the sign flag, based on the context model. The sign flag may indicate a sign of the current residual coefficient. When a value of the sign flag is 0, the sign flag may indicate that the current residual coefficient is a positive value, and if the value of the sign flag is 1, the sign flag may indicate that the current residual coefficient is a negative value. That is, if the value of the sign flag is 0, the current residual coefficient may be a positive value, and if the value of the sign flag is 1, the current residual coefficient may be a negative value.

The decoding apparatus derives the current residual coefficient, based on the sign flag (S1030). The decoding apparatus may derive a size (i.e., a level value) of the current residual coefficient, based on the residual information (e.g., size-related information on the current residual coefficient), and may derive the current residual coefficient in the current sub-block by using the size of the current residual coefficient and the sign of current residual coefficient derived based on the sign flag. That is, the decoding apparatus may derive the current residual coefficient in the current sub-block, based on the residual information (e.g., syntax elements for the current residual coefficient) and the sign flag for the current residual coefficient.

The decoding apparatus derives a residual sample, based on the current residual coefficient (S1040).

The decoding apparatus may derive a residual sample of the current block, based on the current residual coefficient. That is, the decoding apparatus may derive the residual sample in the current sub-block of the current block, based on the current residual coefficient. For example, if it is derived that the transform is not applied to the current block based on the transform_skip_flag, that is, if a value of the transform skip flag is 1, the decoding apparatus may derive the current residual coefficient as the residual sample of the current block. Alternatively, for example, if it is derived that the transform is not applied to the current block based on the transform skip flag, that is, if the value of the transform skip flag is 1, the decoding apparatus may derive the residual sample of the current block by de-quantizing the current residual coefficient. Alternatively, if it is derived that the transform is applied to the current block based on the transform skip flag, that is, if the value of the transform skip flag is 0, the decoding apparatus may derive the residual sample of the current block by inverse-transforming the current residual coefficient. Alternatively, for example, if it is derived that the transform is applied to the current block based on the transform skip flag, that is, if the value of the transform skip flag is 0, the decoding apparatus may derive the residual sample by de-quantizing the current residual coefficient and by inverse-transforming the de-quantized coefficient.

The decoding apparatus generates a reconstructed picture, based on the residual sample (S1050).

For example, the decoding apparatus may derive a prediction sample by performing inter prediction mode or intra prediction mode for the current block, based on prediction information received through a bitstream, and may generate the reconstructed picture by adding the prediction sample and the residual sample. In addition, for example, the prediction information may include information indicating the intra prediction mode of the current block. The decoding apparatus may derive the intra prediction mode of the current block, based on information indicating the intra prediction mode, and may derive a prediction sample of the current block, based on the intra prediction mode and reference samples of the current block. The reference samples may include top reference samples and left reference samples of the current block. For example, if the current block has a size of N×N and an x-component and y-component of a top-left sample position of the current block are 0, the left reference samples may be p[−1][0] to p[−1][2N−1], and the top reference samples may be p[0][4] to p[2N−1][−1].

Thereafter, optionally, an in-loop filtering procedure such as deblocking filtering, SAO, and/or ALF procedures may be applied to the reconstructed picture as described above in order to improve subjective/objective picture quality.

Figure 11:
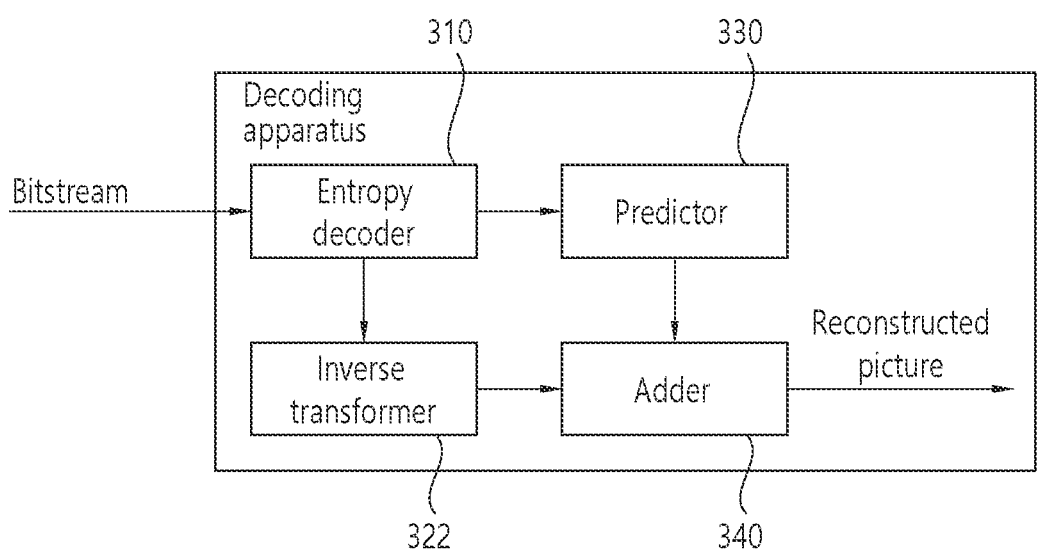
FIG. 11 briefly illustrates a decoding apparatus for performing an image decoding method according to the present disclosure.

FIG. 11 briefly illustrates a decoding apparatus for performing an image decoding method according to the present disclosure. The method disclosed in FIG. 10 may be performed by the decoding apparatus disclosed in FIG. 11. Specifically, for example, an entropy decoder of the decoding apparatus of FIG. 11 may perform S1000 to S1030 of FIG. 10, a residual processor of the decoding apparatus of FIG. 11 may perform S1040 of FIG. 10, and an adder of the decoding apparatus of FIG. 11 may perform S1050 of FIG. 10. In addition, although not shown, a process of deriving a prediction sample may be performed by a predictor of the decoding apparatus of FIG. 11.

According to the aforementioned present disclosure, efficiency of residual coding can be improved.

In addition, according to the present disclosure, a sign flag indicating a sign of a residual coefficient can be coded based on a context model, thereby saving an amount of bits assigned to the sign flag for the residual coefficient and improving overall residual coding efficiency.

In addition, according to the present disclosure, a context model for a sign flag indicating a sign of a residual coefficient is derived based on a sign flag of a residual coefficient coded prior to the residual coefficient, and thus the sign flag is coded by considering correlation between adjacent residual coefficients, thereby saving an amount of bits assigned to the sign flag and improving overall residual coding efficiency.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The embodiments described in this specification may be performed by being implemented on a processor, a microprocessor, a controller or a chip. For example, the functional units shown in each drawing may be performed by being implemented on a computer, a processor, a microprocessor, a controller or a chip. In this case, information for implementation (e.g., information on instructions) or algorithm may be stored in a digital storage medium.

In addition, the decoding apparatus and the encoding apparatus to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VoD service providing apparatus, an Over the top (OTT) video apparatus, an Internet streaming service providing apparatus, a three-dimensional (3D) video apparatus, a teleconference video apparatus, a transportation user equipment (e.g., vehicle user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the present disclosure is applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (e.g., transmission through the Internet). In addition, a bit stream generated by the encoding method may be stored in a computer-readable recording medium or may be transmitted over wired/wireless communication networks.

In addition, the embodiments of the present disclosure may be implemented with a computer program product according to program codes, and the program codes may be performed in a computer by the embodiments of the present disclosure. The program codes may be stored on a carrier which is readable by a computer.

Figure 12:
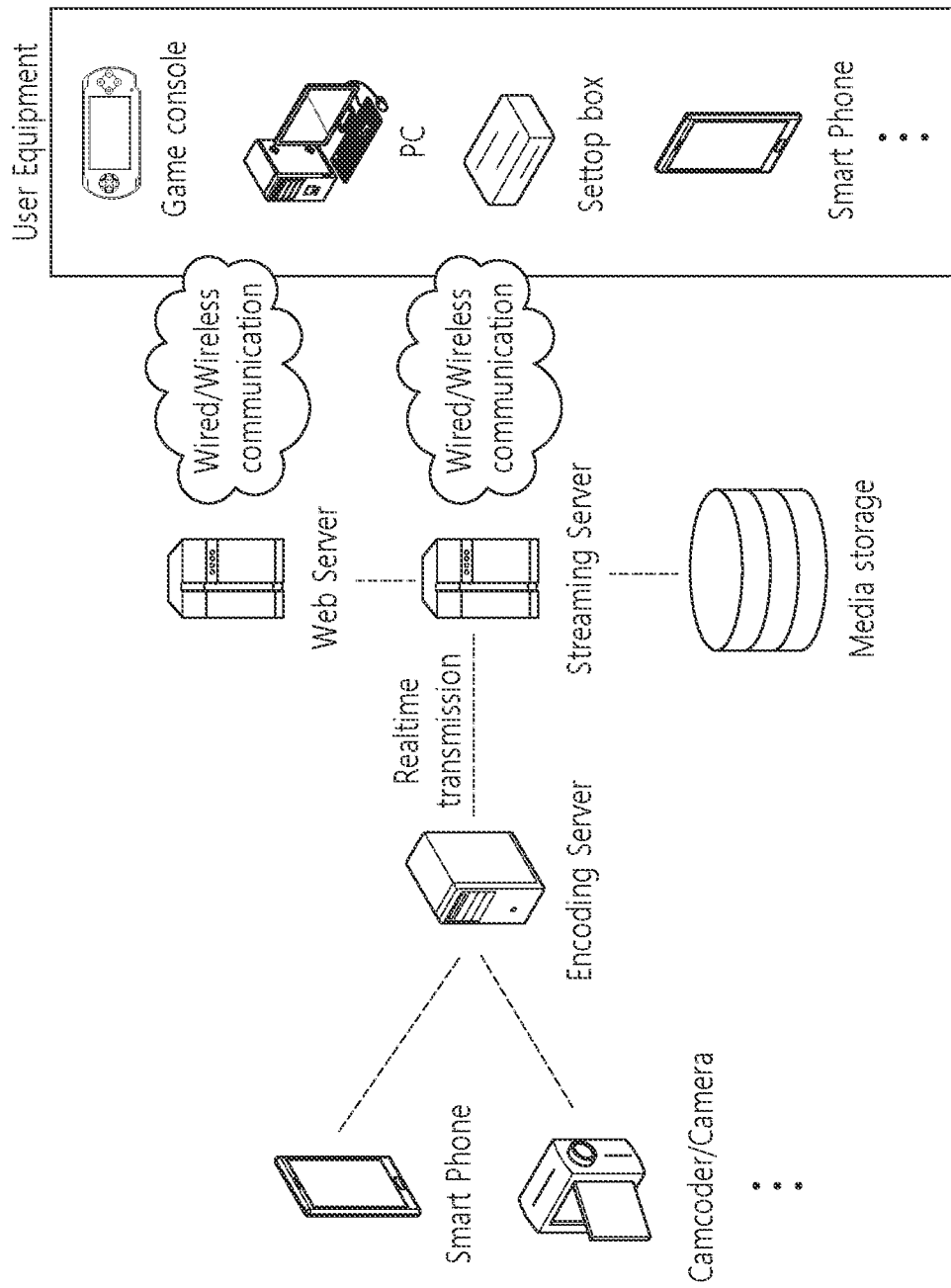
FIG. 12 illustrates a structural diagram of a contents streaming system to which the present disclosure is applied.

FIG. 12 illustrates a structural diagram of a contents streaming system to which the present disclosure is applied.

The content streaming system to which the embodiment(s) of the present disclosure is applied may largely include an encoding server, a streaming server, a web server, a media storage, a user device, and a multimedia input device.

The encoding server compresses content input from multimedia input devices such as a smartphone, a camera, a camcorder, etc. Into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. Smartwatches, smart glasses, head mounted displays), digital TVs, desktops computer, digital signage, and the like. Each server in the content streaming system may be operated as a distributed server, in which case data received from each server may be distributed.

What is claimed is:

1. An image decoding method performed by a decoding apparatus, the image decoding method comprising:
obtaining image information including a transform skip flag and residual information for a current block, wherein the transform skip flag represents whether the current block is a transform skip block;
determining whether the current block is the transform skip block based on the transform skip flag;
based on the current block being the transform skip block, deriving a context model for a sign flag of a current residual coefficient in a current sub-block of the current block based on a sign flag of a residual coefficient decoded prior to the current residual coefficient in the current sub-block;
decoding the sign flag based on the context model;
deriving the current residual coefficient based on the sign flag;
deriving a residual sample based on the current residual coefficient; and
generating a reconstructed picture based on the residual sample.

2. The image decoding method of claim 1,
wherein, when a value of the sign flag of the residual coefficient decoded prior to the current residual coefficient is 0, the context model for the sign flag of the current residual coefficient is derived as a context model 0, and
wherein, when the value of the sign flag of the residual coefficient decoded prior to the current residual coefficient is 1, the context model for the sign flag of the current residual coefficient is derived as a context model 1.

3. The image decoding method of claim 1, further comprising determining whether the sign flag is decoded based on the context model, by comparing a specific value and a number of non-zero residual coefficients in the current sub-block.

4. The image decoding method of claim 3,
wherein the sign flag is bypass-decoded when the number of non-zero residual coefficients is less than the specific value, and
wherein the sign flag is decoded based on the context model when the number of non-zero residual coefficients is greater than or equal to the specific value.

5. The image decoding method of claim 3, wherein the specific value is derived based on a size of the current block.

6. The image decoding method of claim 5,
wherein the specific value is derived as 5 when the size of the current block is an 8×8 size, and
wherein the specific value is derived as 4 when the size of the current block is a 4×4 size.

7. The image decoding method of claim 3, wherein the specific value is derived based on a size of the current block and a position of the current sub-block in the current block.

8. The image decoding method of claim 7,
wherein the specific value is derived as 5 when the size of the current block is an 8×8 size and the current sub-block is a bottom-right sub-block of the current block, and
wherein the specific value is derived as 4 when the size of the current block is the 8×8 size and the current sub-block is a top-left block of the current block.

9. The image decoding method of claim 3, wherein the specific value is derived based on a size of the current block, a position of the current sub-block in the current block, and a prediction mode of the current block.

10. The image decoding method of claim 9,
wherein the specific value is derived as 5 when the size of the current block is the 8×8 size, the current sub-block is a bottom-right sub-block of the current block, and the prediction mode of the current block is an intra prediction mode, and
wherein the specific value is derived as 0 when the size of the current block is the 8×8 size, the current sub-block is a top-left sub-block of the current block, and the prediction mode of the current block is the intra prediction mode.

11. The image decoding method of claim 1, wherein the context model for the sign flag is derived as one of a plurality of context models based on sign flags of a plurality of residual coefficients decoded prior to the current residual coefficient in the current sub-block.

12. An image encoding method performed by an encoding apparatus, the image encoding method comprising:
determining whether a current block is a transform skip block;
deriving a current residual coefficient in a current sub-block of the current block;
based on the current block being the transform skip block, deriving a context model for a sign flag of the current residual coefficient based on a sign flag of a residual coefficient encoded prior to the current residual coefficient in the current sub-block;
encoding the sign flag based on the context model;
encoding the transform skip flag representing whether the current block is the transform skip block; and
generating a bitstream including image information including the transform skip flag and residual information for the current block,
wherein the residual information includes the sign flag of the current residual coefficient.

13. The image encoding method of claim 12,
wherein, when a value of the sign flag of the residual coefficient encoded prior to the current residual coefficient is 0, the context model for the sign flag of the current residual coefficient is derived as a context model 0, and
wherein, when the value of the sign flag of the residual coefficient encoded prior to the current residual coefficient is 1, the context model for the sign flag of the current residual coefficient is derived as a context model 1.

14. The image encoding method of claim 12, further comprising determining whether the sign flag is encoded based on the context model, by comparing a specific value and a number of non-zero residual coefficients in the current sub-block.

15. The image encoding method of claim 14,
wherein the sign flag is bypass-encoded when the number of non-zero residual coefficients is less than the specific value, and
wherein the sign flag is encoded based on the context model when the number of non-zero residual coefficients is greater than or equal to the specific value.

16. A non-transitory computer-readable storage medium storing a bitstream generated by a method, the method comprising:
determining whether a current block is a transform skip block;
deriving a current residual coefficient in a current sub-block of the current block;
based on the current block being the transform skip block, deriving a context model for a sign flag of the current residual coefficient based on a sign flag of a residual coefficient encoded prior to the current residual coefficient in the current sub-block;
encoding the sign flag based on the context model;
encoding the transform skip flag representing whether the current block is the transform skip block; and
generating the bitstream including image information including the transform skip flag and residual information for the current block,
wherein the residual information includes the sign flag of the current residual coefficient.

17. A transmission method of data for image, the method comprising:
obtaining a bitstream of image information including a transform skip flag and residual information for a current block, wherein the transform skip flag represents whether the current block is a transform skip block; and
transmitting the data including the bitstream of the image information including the transform skip flag and residual information, wherein it is determined whether the current block is the transform skip block based on the transform skip flag, wherein based on the current block being the transform skip block, a context model for a sign flag of a current residual coefficient in a current sub-block of the current block is derived based on a sign flag of a residual coefficient encoded prior to the current residual coefficient in the current sub-block, wherein the sign flag of the current residual coefficient is encoded based on the context model for the sign flag, and wherein the residual information includes the sign flag of the current residual coefficient.

\* \* \* \* \*